United States Patent [19]
Arlton

[11] Patent Number: 5,749,540
[45] Date of Patent: *May 12, 1998

[54] SYSTEM FOR CONTROLLING AND AUTOMATICALLY STABILIZING THE ROTATIONAL MOTION OF A ROTARY WING AIRCRAFT

[76] Inventor: Paul E. Arlton, 1132 Anthrop Dr., West Lafayette, Ind. 47906

[21] Appl. No.: 687,649

[22] Filed: Jul. 26, 1996

Related U.S. Application Data

[60] Provisional application No. 60/001558 Jul. 27, 1995 and provisional application No. 60/007079 Oct. 24, 1995.

[51] Int. Cl.[6] .................................................. B64C 27/82
[52] U.S. Cl. ................................. 244/17.13; 244/17.19; 244/79; 416/52; 416/147
[58] Field of Search ........................... 244/17.11, 17.13, 244/17.19, 17.21, 17.29; 416/52, 147

[56] References Cited

U.S. PATENT DOCUMENTS

| | | |
|---|---|---|
| 1,781,883 | 11/1930 | Reed . |
| 2,250,826 | 7/1941 | Everts . |
| 2,384,516 | 9/1945 | Young . |
| 2,689,099 | 9/1954 | Lightfoot . |
| 3,004,736 | 10/1961 | Culver et al. . |
| 3,027,948 | 4/1962 | Goland et al. . |
| 3,211,235 | 10/1965 | Bretl . |
| 3,528,633 | 9/1970 | Knemeyer . |
| 3,532,302 | 10/1970 | Dean . |
| 4,028,003 | 6/1977 | Krauss . |
| 4,118,143 | 10/1978 | Kavan . |
| 4,272,041 | 6/1981 | Mabuchi et al. . |
| 4,427,344 | 1/1984 | Perry . |
| 4,759,514 | 7/1988 | Burkam . |
| 4,790,724 | 12/1988 | Bousquet et al. . |
| 5,305,968 | 4/1994 | Arlton . |
| 5,332,362 | 7/1994 | Toulmay et al. . |

FOREIGN PATENT DOCUMENTS 28 34 786  2/1980  Germany .

OTHER PUBLICATIONS

Robinson, Frank. *Increasing Tail Rotor Thrust and Comments on Other Yaw Control Devices, Journal of the American Helicopter Society*, pp. 46–52, 1970.

Prouty, Raymond W., *Helicopter Performance, Stability, and Control*, Title page and pp. 187,188, and 191, 1990.

Rock, Gene, *SSP–5, American Aircraft Modeler*, Mar., 1973, pp. 41–45 and 76–79.

Information concerning the Graupner Heim helicopter contained in Neuheiten 91, pp. 22–23. Illustrations show the structure of the helicopter including the main rotor, frame, and landing gear.

Building Instructions for the Champion model helicopter produced by Hubschrauber Schluter. Two pages. Date unknown.

Building Plans for X–Cell thirty and forty series model helicopter produced by Miniature Aircraft USA, 1989, two pages.

Sales brochure for the Petit Helicopter, Sports Flight Helicopter, and helicopter accessories contained in the sales catalog for Hirobo Limited. Three pages. Date unknown.

Sales brochure for the Whisper Electric helicopter distributed by Hobby Dynamics Distributors. One page. Date unknown.

*Rotary Modeler*, May/Jun., 1992. One page.

Primary Examiner—Galen L. Barefoot
Attorney, Agent, or Firm—Barnes & Thornburg

[57] ABSTRACT

In a helicopter having a device for stabilizing yaw motion through the use of a tail rotor with a plurality of rotor blades extending radially from a hollow rotor shaft which is mounted for rotation about a transverse rotor axis. The tail rotor is provided with a device for varying the thrust by a pilot input to the blades of the tail rotor and through the use of a gyro rotor for automatic control of the tail rotor. The invention further comprises a three point mixing linkage that permits the control of the tail rotor through both the pilot inputs and the gyro rotor inputs.

47 Claims, 31 Drawing Sheets

SYSTEM FOR CONTROLLING AND AUTOMATICALLY STABILIZING THE ROTATIONAL MOTION OF A ROTARY WING AIRCRAFT

BACKGROUND AND SUMMARY OF THE INVENTION

This application is a continuation of Provisional Patent Application No. 60/001558, filed Jul. 27, 1995 and Provisional Patent Application No. 60/007079, filed Oct. 24, 1995.

This invention relates to flight-direction control systems for both model and full-size rotary wing aircraft, and particularly to a helicopter tail rotor and a helicopter yaw (right-left heading) stabilizer system. More particularly, the invention relates to a gyroscope mounted on a helicopter tail rotor assembly and configured to cause the tail rotor to produce a yaw moment or torque stabilizing the helicopter in flight so that the helicopter is able to fly in a direction (heading) selected by the pilot, whether the pilot is onboard a full-size helicopter or commanding a model helicopter by remote control. While this invention can be applied to many types of aircraft, both full-size and models, it will be described herein primarily for use on helicopters for clarity.

Helicopters are flying machines having the ability to hover and fly forwards, backwards, and sideways. This agility stems from the multiple capabilities of the main rotor system. Since the invention of helicopters in the 1930's, considerable effort has been spent advancing helicopter technology, with a substantial percentage of that effort concentrated on main rotor systems. Less effort has been applied to develop better tail rotor systems.

All helicopters having one main rotor require some sort of yaw stabilizer or yaw-control system in order to counteract torque generated by the main rotor during flight so as to maintain directional control of the helicopter. The main rotor system of a helicopter is typically mounted to lie above the helicopter cabin and rotate about a vertical axis extending through the cabin so as to provide a controllable motive force for lifting the helicopter into the air and propelling the helicopter in any direction. A main rotor system typically includes rotor blades for producing aerodynamic lift and other blades that act to augment control and stability of the main rotor. A main rotor system also includes a swashplate assembly and various linkages for transmitting pilot control commands to the rotating rotor blades.

Several different yaw-control devices have been developed for helicopters to counteract torque generated by main rotor systems or changing wind gusts. These yaw-control devices include, for example, blown tail booms and shrouded fans. Nevertheless, traditional helicopter tail rotor and yaw-control systems have remained essentially unchanged for twenty-five years.

In general, maintaining the stable yaw orientation (right-left heading) of a helicopter in hover or low-speed flight can be difficult for a helicopter pilot. To counterbalance the constantly changing torques on the helicopter fuselage produced by the main rotor blades and atmospheric conditions such as lateral wind gusts, helicopter pilots must continually manipulate the yaw controls of their aircraft. This is especially true for pilots of model helicopters because of the small size and low mass of model helicopters, and the resulting tendency of a model helicopter to react rapidly to disturbances. Other types of aircraft, such as tilt-rotor aircraft (which operate at some times like an airplane and at other times like a helicopter), can have similar control problems along a different rotation axis (such as the roll axis).

Many helicopter yaw-control systems for controlling a helicopter tail rotor to maintain directional control of the helicopter in flight use gyroscopes to sense the constantly changing torques applied to the helicopter in flight and use various mechanisms to adjust the pitch of the tail rotor blades in response to movement of the gyroscope onboard the helicopter. These helicopter yaw-control systems are referred to generally as gyro-stabilizer systems and can be classified, for example, as electronic-, single rotor-, and dual rotor-gyro-stabilizer systems. A discussion of each of these three gyro-stabilizer systems is provided below.

Electronic gyro-stabilizer systems are now widely available for use in controlling the tail rotor of both model and full-size helicopters to help pilots cope with yaw instability of a helicopter during flight. These electronic systems, however, are typically heavy and expensive. On model helicopters, they often require an additional or expanded electric power supply to power the requisite amplifier electronics and to drive the electromechanical gyroscope associated with an electronic gyro-stabilizer system. On man-carrying helicopters, electronic gyro-stabilizer systems are practical only in helicopters having control systems with electric or hydraulic servo actuators. The pilots of small man-carrying helicopters, who typically must actuate the controls of their aircraft directly, cannot take advantage of these electronic gyro-stabilizer systems.

Ideally, in many applications, the gyroscope that lies onboard a helicopter and senses the yaw motion of the helicopter should be driven directly from the power produced by an engine or power plant of the helicopter instead of by an auxiliary power supply (such as a battery). It should also accommodate a variety of helicopter tail rotor configurations to be useful on as many different types of aircraft as possible.

To date, most attempts to develop practical mechanical helicopter yaw control and stabilization systems have met with limited success because designers generally have not understood the basic operational elements of such systems, nor have they had practical mechanical means with which to implement these elements. As a result, almost every system currently available has one or more deficiencies or disadvantages serious enough to make it impractical for actual use.

Single rotor gyro-stabilizer systems are known. In U.S. Pat. No. 4,759,514, John E. Burkam describes a single rotor control and stabilization system having a tail rotor that tilts in the process of performing as a yaw stabilizer. According to Burkam, tilt of the tail rotor tends to move the tail rotor axially relative to a slider, whose position is fixed relative to the pivot point by a collective pitch transfer lever connected to the fuselage of the helicopter. This motion of the tail rotor relative to a fixed pitch-linkage is meant to cause the tail rotor blades to change pitch and generate a stabilizing thrust force opposing the yaw motion. It should be noted that the collective pitch transfer lever of Burkam is not a three-point mixing arm as described herein, but acts as one side of a parallelogram of linkages designed to hold a pitch slider in a fixed position.

Unfortunately, the center of mass of the tail rotor in Burkam's system is unavoidably offset from the tail rotor pivot axis. In operation, this offset center of mass leads to a vertical swinging motion of the entire tail rotor that is operationally and structurally unsound. In practice, a spring or other device is required to compensate for the weight of the tail rotor assembly to keep the tail rotor from drooping downward. Vertical accelerations of the aircraft, such as those generated during climbing or descending maneuvers, will cause the tail rotor to swing upward or downward. This swinging motion will operate exactly like a gyro input to the control system, and will cause the aircraft to yaw unexpectedly. In contrast, single-rotor systems in accordance with the present invention may be configured to tilt about an axis substantially coplanar with the gyro rotor without significant swinging motion and subsequent vertical displacement.

Tilt of the entire tail rotor can also unfavorably redirect the thrust force of the rotor in unwanted directions, and can cause unwanted rotation of the aircraft about a shifting axis of rotation. Generally, the gyroscopic mechanism in any type of mechanical aircraft yaw control and stabilization system must tilt enough to displace the linkages in the system to actuate effectively the pitch controls of the thrust-producing part (e.g., tail rotor blades) of the system. In practice, this tilt angle typically falls in the range of 10 to 20 degrees, and can be associated with the general concept of "bandwidth" in control systems. Mechanical systems usually have some free-play and friction between linkages, so high bandwidth (high degree of tilt) is desirable to increase the signal-to-noise ratio of the aircraft yaw control and stabilization system. In single rotor gyro-stabilizer systems, however, tilt of the thrust-producing part by 10 to 20 degrees can generate an undesirable transverse (destabilizing) component of thrust equal to 17% to 34% of the total thrust. This makes application of such single rotor gyro-stabilizer systems impractical. Some stabilization systems, such as that disclosed in U.S. Pat. No. 4,759,514 to Burkam, may require even greater tilt angles for effective stabilization because much of the linkage displacement occurs in directions transverse to the nominal rotor rotation axis. Such transverse displacement has no operational effect on the pitch of the tail rotor blades and so cannot affect the thrust produced by the tail rotor to control aircraft yaw motions. While single-rotor gyro-stabilizer systems have historically had several disadvantages that severely limit their practical application, recent advances in the art of control and stabilization systems for rotary wing aircraft disclosed herein have made certain single rotor gyro-stabilizer systems both practical and desirable.

In contrast to single rotor control and stabilization systems, dual-rotor gyro-stabilizer systems separate the primary thrust-producing part from the yaw-stabilizing part. Since the primary thrust-producing rotor need not tilt, the thrust it generates acts only in the desired direction. A dual rotor gyro-stabilizer system is described in U.S. Pat. No. 3,004,736 to Culver, and another is discussed on pages 41, 45, and 76–79 of the Mar. 1973 issue of American Aircraft Modeler magazine (originally located at 733 15th Street N.W., Washington, D.C. 20005). A basic shortcoming of both systems is that pilot control commands must physically override (tilt) the gyroscopic mechanism in order to control the directional heading of the aircraft. In these devices, control inputs from the pilot were not combined with aircraft yaw stabilizing inputs from the gyroscopic mechanism so that the aircraft yaw control and stabilizing functions could operate independently.

In U.S. Pat. No. 5,305,968 and U.S. patent application Ser. No. 08/292,719, Paul E. Arlton describes improved dual-rotor aircraft yaw control and stabilization systems in which the pilot control system and the yaw stabilization system operate independently. While practical and functional, this device requires a mounting structure not available on every aircraft.

What is needed is an improved rotation control and stabilization system that is simple, lightweight, inexpensive, requires little power to operate, does not unduly inhibit pilot control for normal maneuvering, and can be applied to aircraft having various mechanical configurations. Such a system would operate to stabilize yaw motion of a helicopter or other rotary wing aircraft in flight.

One objective of the present invention is to provide improved means for controlling and automatically stabilizing the rotational motion of a model or full-size rotary wing aircraft such as a helicopter. Another objective of the present invention is to provide practical means for implementing the improved device on aircraft having rotation-control systems with various mechanical configurations. Yet another objective of the present invention is to show how to interchange the various features in accordance with the invention for the best results.

According to the present invention, a device for stabilizing rotational motion of a rotary wing aircraft about an aircraft axis of rotation is provided. The rotary wing aircraft includes an aircraft body. The device includes a thrust-producing mechanism for generating a thrust force along a thrust axis that is substantially perpendicular to the aircraft axis of rotation and a thrust-varying mechanism for permitting a pilot to remotely control the thrust-producing mechanism to vary the magnitude of the thrust force produced by the thrust-producing mechanism. The device further includes a gyro rotor mechanism for automatically controlling the thrust-producing mechanism to vary the magnitude of the thrust force produced by the thrust-producing mechanism to oppose rotational motion of the rotary wing aircraft about the aircraft axis of rotation during flight. The gyro rotor mechanism is mounted to the aircraft body to maintain a fixed position relative to the thrust-producing mechanism. The device further includes a mechanism for independently connecting each of the gyro rotor mechanism and thrust-varying mechanism to the thrust-producing mechanism so that each of the thrust-varying mechanism and the gyro rotor mechanism operates independently to vary the thrust force generated by the thrust-producing mechanism and so that the gyro rotor remains in a fixed position relative to the thrust-producing mechanism when the pilot operates the thrust-varying mechanism to vary the magnitude of the thrust force produced by the thrust-producing mechanism.

In preferred embodiments, the thrust-producing mechanism is a tail rotor configured to rotate about a common axis of rotation with the gyro rotor mechanism. The gyro rotor mechanism is mounted on the helicopter body so that the gyro rotor mechanism is fixed relative to the tail rotor along the common axis of rotation. Thus, the gyro rotor mechanism does not move linearly along the common axis of rotation when the pilot changes the magnitude of the thrust force produced by the thrust-producing mechanism.

In accordance with the present invention, a system is provided for controlling and automatically stabilizing the rotational motion of a rotary wing aircraft in flight and particularly for stabilizing the yaw motion of a helicopter in flight. Such a system comprises a primary thrust-producing part such as a helicopter tail rotor that can direct a thrust force along an axis offset from, and substantially perpendicular to, the rotation axis of the aircraft and a yaw-stabilizing part. The tail rotor generally includes cambered blades which are aerodynamically and centrifugally balanced and suited for use with the yaw-stabilizing part. The thrust-producing part is controlled by inputs from a pilot control part if the aircraft has a pilot control system and from a gyroscope included in the yaw-stabilizing part. In operation, the yaw-stabilizing part senses rotational or yaw motion of the aircraft and actuates the thrust-producing part to slow or stop rotational or yaw motion of the aircraft. After the aircraft has stopped rotating, a centrifugal restoring mechanism included in the system restores the yaw-stabilizing part to a nominal condition in preparation for any subsequent aircraft rotation or yaw. Optionally, the yaw-stabilizing part may be adapted to produce a thrust force to augment the thrust force produced by the thrust-producing part.

In accordance with the present invention, the thrust-producing and yaw-stabilizing parts are mounted on an appendage of the aircraft and may be separate mechanisms located in mutual proximity to one another, separate mechanisms located at a remote distance from each other and connected through linkage means or electronic means, or a single combined mechanism performing both thrust-producing and yaw-stabilizing functions. The present invention may be applied in a wide variety of configurations to suit various aircraft types and configurations.

In preferred embodiments, the thrust-producing means includes a thrust-producing rotor having a plurality of rotor blades extending radially from a rotor shaft. The gyro rotor means is a weighted disk or plurality of weighted arms extending radially from a gyro hub. Rotation of the aircraft causes the gyro rotor means to tilt and to actuate linkages attached to the thrust-producing rotor thereby adjusting the amount of thrust created by the rotor and automatically stabilizing the aircraft. The gyro rotor rotates in a gyro rotor plane of rotation and the pivot axis is generally coplanar or nearly coplanar with the gyro rotor plane of rotation to minimize swinging motion of the gyro rotor means. The gyro rotor means may, in some embodiments, be adapted to produce a thrust force to augment the thrust generated by the thrust-producing means, or may be combined into one mechanism with the thrust-producing means.

Several types of drive linkages including, for instance, universal joints, sliders, and follower linkages, are provided to drive the gyro rotor means as it may tilt in response to rotation or yaw of the aircraft in flight. The gyro rotor means is restored to its nominal orientation by aerodynamic forces (such as those produced through cyclically pitching paddles or blades), rotational or gyroscopic forces (such as through flapping action or "coning" of the weighted arms), and/or by mechanical forces (such as through springs).

The present invention is adapted for use on a helicopter and includes a gyro rotor having a number of weighted arms or paddles extending radially from a gyro rotor hub, and driven by the power produced by the engine of the helicopter. The gyro rotor is mounted to pivot about a gyro pivot axis which is substantially perpendicular to the main rotor axis and to move linkages including push-pull rods, sliders, and mixing arms that actuate to the pitch-change elements of the tail rotor blades. Yaw motion of the helicopter causes the gyro rotor to pivot or tilt about the gyro pivot axis thereby displacing the gyro rotor linkages and changing the pitch of the tail rotor blades. This change in pitch alters the thrust produced by the tail rotor to oppose the original yaw motion.

The present invention provides a restoring mechanism that restores the gyro rotor to its nominal orientation after the gyro rotor has pivoted or tilted in response to yaw motion of the helicopter. In preferred embodiments, the gyro rotor includes a plurality of gyro arms pivotably connected at their base to a supporting mechanism. A weight is connected to each of the gyro arms so that centrifugal forces acting on the gyro arms orients the gyro arms radially from the supporting mechanism. Thus, after the gyro arms have pivoted or tilted in response to yaw motion of the helicopter, the centrifugal forces acting on the gyro arms will restore the gyro arms to their nominal orientation.

In certain configurations in accordance with the present invention, the gyro rotor is adapted to produce a thrust force that augments the thrust force created by the tail rotor. Other configurations in accordance with the present invention combine the gyro rotor and the tail rotor into a single mechanism. Each configuration or preferred embodiment in accordance with the present invention has certain advantages over the others (such as greater simplicity or greater thrust producing potential), and selection of the appropriate configuration depends upon the specific application. It will be understood that the features of the various embodiments in accordance with the present invention may be recombined to form additional embodiments differing in appearance, but generally performing the same function.

One important feature of preferred embodiments of the present invention is that the yaw-stabilizing part is not functionally affected by pilot control inputs. Various means, such as three-point mixing arms, are provided to combine the stabilization features of the gyroscope in the yaw-stabilizing part with control inputs from the pilot so that pilot control is not inhibited. In some configurations, pilot control inputs may operate to move the gyro rotor linearly in space. Because such linear motion will not cause the gyroscope in the yaw-stabilizing part to tilt, these pilot inputs have no operational effect on the gyroscope. While the elements of the current invention will operate in applications in which pilot commands forcibly override the gyroscopic stabilization mechanism, independent control is more desirable and advantageous.

In some preferred embodiments, the gyro rotor is fixed relative to the fuselage of the helicopter. The mounting structure for a gyro rotor having a fixed pivot axis may be more simply and solidly constructed (for a given weight) than the mounting structure for a gyro rotor that must both pivot and translate relative to the fuselage. In addition, fixed mounting of the gyro rotor allows the gyro rotor to be more easily placed at different locations on the helicopter.

The present invention includes a gyro spindle that pivots in response to pivoting motion of the gyro arms due to yaw motion of the helicopter. In some preferred embodiments, the gyro arms are directly connected to and supported by the gyro spindle. In other preferred embodiments, the gyro arms are linked to the gyro spindle through gyro linkages so that pivotable movement of the gyro arms is transferred to the gyro spindle. In these other preferred embodiments, the gyro spindle does not support the gyro arms and thus the gyro spindle is not subjected to radial flight loads generated by the gyro arms and can be made of lighter construction.

Additional objects, features, and advantages of the invention will become apparent to those skilled in the art upon consideration of the following detailed description of preferred embodiments which illustrate the best mode for carrying out the invention as presently perceived.

BRIEF DESCRIPTION OF THE DRAWINGS

The following detailed description particularly refers to the accompanying figures in which:

FIG. 3 is an enlarged perspective view of the tail assembly of the helicopter illustrated in FIG. 1 fitted with the first embodiment of the improved yaw control and stabilization system of the present invention;

FIG. 8 is a top plan view of the fourth embodiment, showing the general configuration of the tail rotor gearbox and primary tail rotor of the current invention for the fourth through ninth embodiments shown in FIGS. 9 through 14, respectively, with elements of the gyro rotor mounting mechanism shown in cross-section, and with one end of the gyro pushrod, vertical tail fin, gyro rotor arms, and all elements of the helicopter forward of the tail rotor gearbox removed for clarity;

FIG. 9 is a rear-end elevation view of the fourth embodiment which has a hollow tail rotor shaft, a gyro rotor pivotably mounted to the gearbox, a three-point mixing arm for combining pilot control and gyro control inputs, universal drive means located at the center of the gyro rotor, and mechanical restoring means in the form of adjustable springs, with one tail rotor blade shown in cross-section, and with the vertical tail fin, blade-balancing weights and all elements of the helicopter forward of the tail rotor gearbox removed for clarity;

FIG. 10 is a rear-end elevation view of a fifth embodiment which has a hollow tail rotor shaft, a gyro rotor pivotably mounted to the gearbox, electronic means for combining pilot control and gyro control inputs, universal drive means located at the center of the gyro rotor, and mechanical restoring means in the form of adjustable springs, with one tail rotor blade shown in cross-section, and with the vertical tail fin, blade-balancing weights and all elements of the helicopter forward of the tail rotor gearbox removed for clarity;

FIG. 11 is a rear-end elevation view of a sixth embodiment which has a hollow tail rotor shaft, a thrust-producing gyro rotor pivotably mounted to the gearbox, universal drive means located at the center of the gyro rotor, a three-point mixing arm for combining pilot control and gyro control inputs, and aerodynamic restoring means in the form of gyro rotor blades, with one tail rotor blade shown in cross-section, and with the vertical tail fin, blade-balancing weights, and all elements of the helicopter forward of the gearbox removed for clarity;

FIG. 12 is a rear-end elevation view of a seventh embodiment which has a hollow tail rotor shaft, a gyro rotor pivotably mounted to the gearbox on an offset pivot axis, a three-point mixing arm for combining pilot control and gyro control inputs, follower-link drive means in the form of scissor linkages driving the gyro rotor, and mechanical restoring means in the form of springs, with one tail rotor blade shown in cross-section, and with the vertical tail fin, blade-balancing weights, and all elements of the helicopter forward of the gearbox removed for clarity;

FIG. 13 is a rear-end elevation view of an eighth embodiment which has a solid tail rotor shaft, a gyro rotor pivotably mounted to a slider and translatable in response to pilot control commands, follower-link drive means and mechanical restoring means in the form of semi-flexible drive bars, with one tail rotor blade shown in cross-section, and with the vertical tail fin, blade-balancing weights, and all elements of the helicopter forward of the gearbox removed for clarity;

FIG. 14 is a rear-end elevation view of a ninth embodiment which has a solid tail rotor shaft, a thrust-producing gyro rotor pivotably mounted to a slider and translatable in response to pilot control commands, three-point mixing arms for combining pilot control and gyro control inputs, follower-link drive means in the form of drive bars driving the gyro rotor, and aerodynamic restoring means in the form of gyro rotor blades, with one tail rotor blade shown in cross-section, and with the vertical tail fin, blade-balancing weights, and all elements of the helicopter forward of the gearbox removed for clarity;

FIG. 15 is a top plan view of a tenth embodiment which illustrates the general configuration of the gearbox and primary tail rotor of the current invention for the tenth through seventeenth embodiments shown in FIGS. 16 through 23 respectively, with elements of the gyro rotor mounting mechanism shown in cross-section, and with the vertical tail fin, gyro rotor arms, and all elements of the helicopter forward of the gearbox removed for clarity;

FIG. 16 is a rear-end elevation view of the tenth embodiment which has a solid tail rotor shaft, a gyro rotor pivotably mounted to the gearbox, a three-point mixing arm for combining pilot control and gyro control inputs, universal drive means located at the center of the gyro rotor, and mechanical restoring means in the form of springs, with one tail rotor blade shown in cross-section, and with the vertical tail fin, blade-balancing weights, and all elements of the helicopter forward of the gearbox removed for clarity;

FIG. 17 is a rear-end elevation view of an eleventh embodiment which has a solid tail rotor shaft, a gyro rotor pivotably mounted to the gearbox, a three-point mixing arm for combining pilot control and gyro control inputs, follower-link drive means in the form of drive bars driving the gyro rotor, and mechanical restoring means in the form of springs, with one tail rotor blade shown in cross-section, and with the vertical tail fin, blade-balancing weights, and all elements of the helicopter forward of the gearbox removed for clarity;

FIG. 18 is a rear-end elevation view of a twelfth embodiment which has a solid tail rotor shaft, a gyro rotor pivotably mounted to the tail rotor shaft and pivotably constrained by a tiltable gyro spindle, a three-point mixing arm for combining pilot control and gyro control inputs, follower-link drive means in the form of drive bars driving the gyro spindle, and centrifugal restoring means in the form of weighted gyro arms, with one tail rotor blade shown in cross-section, and with the vertical tail fin, blade-balancing weights, and all elements of the helicopter forward of the gearbox removed for clarity;

FIG. 19 is a rear-end elevation view of a thirteenth embodiment which has a solid tail rotor shaft, a gyro rotor pivotably mounted to the gearbox, a three-point mixing arm for combining pilot control and gyro control inputs, follower-link drive means in the form of drive bars driving the gyro rotor, and centrifugal restoring means in the form of weighted gyro arms, with one tail rotor blade shown in cross-section, and with the vertical tail fin, blade-balancing weights, and all elements of the helicopter forward of the gearbox removed for clarity;

FIG. 20 is a rear-end elevation view of the fourteenth embodiment which has a hollow tail rotor shaft, a thrust-producing gyro rotor pivotably mounted to the gearbox, a three-point mixing arm for combining pilot control and gyro control inputs, universal drive means located at the center of the gyro rotor, and aerodynamic restoring means in the form of gyro rotor blades, with one tail rotor blade shown in cross-section, and with the vertical tail fin, blade balancing-weights and all elements of the helicopter forward of the gearbox removed for clarity;

FIG. 21 is a rear-end elevation view of a fifteenth embodiment which has a solid tail rotor shaft, a gyro rotor pivotably mounted to the gearbox about an offset pivot axis, a three-point mixing arm for combining pilot control and gyro control inputs, follower-link drive means and mechanical restoring means in the form of semi-flexible drive bars driving the gyro rotor, with one tail rotor blade shown in cross-section, and with the vertical tail fin, blade-balancing weights, and all elements of the helicopter forward of the gearbox removed for clarity;

FIG. 22 is a rear-end elevation view of a sixteenth embodiment which has a solid tail rotor shaft, a thrust-producing gyro rotor pivotably mounted to the gearbox about an offset pivot axis, a three-point mixing arm for combining pilot control and gyro control inputs, follower-link drive means in the form of drive bars driving the gyro rotor, and aerodynamic restoring means in the form of gyro rotor blades, with one tail rotor blade shown in cross-section, and with the vertical tail fin, blade-balancing weights, and all elements of the helicopter forward of the gearbox removed for clarity; and FIG. 23 is a rear-end elevation view of a seventeenth embodiment which has a solid tail rotor shaft, a gyro rotor pivotably mounted to a slider and translatable in response to pilot control commands, follower-link drive means in the form of drive bars driving the gyro rotor, and aerodynamic restoring means in the form of gyro paddles, with one tail rotor blade shown in cross-section, and with the vertical tail fin, blade-ba lancing weights, and all elements of the helicopter forward of the gearbox removed for clarity.

FIG. 24 is a rear-end elevation view of the first single-rotor embodiment which has a hollow rotor shaft, a single thrust-producing gyro rotor pivotably mounted to the gearbox, a three-point mixing arm for combining pilot control and gyro control inputs, universal drive means located at the center of the gyro rotor, and aerodynamic restoring means in the form of cyclically-pitchable gyro rotor blades, with the vertical tail fin, blade balancing-weights and all elements of the helicopter forward of the gearbox removed for clarity;

FIG. 25 is a rear-end elevation view of the second single-rotor embodiment which has a hollow rotor shaft, a single thrust-producing gyro rotor pivotably mounted to the gearbox, electronic means for combining pilot control and gyro control inputs in the form a linkage moveable with respect to an electronic sensor mounted to the gearbox, universal drive means located at the center of the gyro rotor, and aerodynamic restoring means in the form of cyclically-pitchable gyro rotor blades, with the vertical tail fin, blade balancing-weights and all elements of the helicopter forward of the gearbox removed for clarity;

FIG. 26 is a rear-end elevation view of the third single-rotor embodiment which has a hollow rotor shaft, a single thrust-producing gyro rotor operably mounted to the rotor shaft to flap about a flapping axis and pivotably constrained by a tiltable gyro spindle mounted to the gearbox, follower-link drive means in the form of drive bars driving the gyro spindle, and aerodynamic restoring means in the form of cyclically-pitchable gyro rotor blades, with the vertical tail fin, blade balancing-weights and all elements of the helicopter forward of the gearbox removed for clarity;

FIG. 27 is a rear-end elevation view of the fourth single-rotor embodiment which has a hollow rotor shaft, a single thrust-producing gyro rotor appended to the end of a push-pull rod passing through the shaft and translatable in response to pilot control commands, follower-link drive means in the form of drive bars driving the gyro rotor, and aerodynamic restoring means in the form of cyclically-pitchable gyro rotor blades, with the vertical tail fin, blade balancing-weights and all elements of the helicopter forward of the gearbox removed for clarity;

FIGS. 28 and 9 illustrate universal drive means that may be advantageously employed with certain of the embodiments of the current invention;

FIG. 28 is an exploded isometric view of a representative pin-and-slot type universal drive means for use with the current invention, with all other elements of the invention and the helicopter removed for clarity.

DETAILED DESCRIPTION OF THE DRAWINGS

The present invention includes a gyro rotor mechanism mounted to the aircraft body to maintain a fixed position relative to the thrust-producing mechanism. The thrust-producing mechanism is a tail rotor configured to rotate about a common axis of rotation with the gyro rotor mechanism. The gyro rotor mechanism is mounted on the aircraft body so that the gyro rotor mechanism is fixed relative to the tail rotor along the common axis of rotation. Thus, the gyro rotor mechanism does not move linearly along the common axis of rotation when the pilot changes the magnitude of the thrust force produced by the thrust-producing mechanism.

The present invention includes a gyro spindle that pivots in response to pivoting motion of the gyro arms due to yaw motion of the helicopter. In some preferred embodiments, the gyro arms are directly connected to end support the gyro spindle. In other preferred embodiments, the gyro arms are linked to the gyro spindle through gyro linkages so that pivotable movement of the gyro arms is transferred to the gyro spindle. In these other preferred embodiments, the gyro spindle does not support the gyro arms and thus the gyro spindle is not subjected to radial flight loads generated by the gyro arms and can be made of lighter construction.

The present invention also provides a restoring mechanism that restores the gyro rotor to its nominal orientation after the gyro rotor has pivoted or tilted in response to yaw motion of the helicopter. In preferred embodiments, the gyro rotor includes a plurality of gyro arms pivotably connected at their base to a supporting mechanism. A weight is connected to each of the gyro arms so that centrifugal forces acting on the gyro arms orients the gyro arms radially from the supporting mechanism. Thus, after the gyro arms have pivoted or tilted in response to yaw motion of the helicopter, the centrifugal forces acting on the gyro arms will restore the gyro arms to their nominal orientation.

Another feature of the present invention is that the yaw-stabilizing part or gyro rotor mechanism is not functionally affected by pilot control inputs or the thrust-varying mechanism. Various means, such as three-point mixing arms, are provided to combine the stabilization features of the gyroscope in the yaw-stabilizing part with control inputs from the pilot so that pilot control is not inhibited. In some configurations, pilot control inputs may operate to move the gyro rotor linearly in space. Because such linear motion will not cause the gyroscope in the yaw-stabilizing part to tilt, these pilot inputs have no operational effect on the gyroscope.

Figure 1:
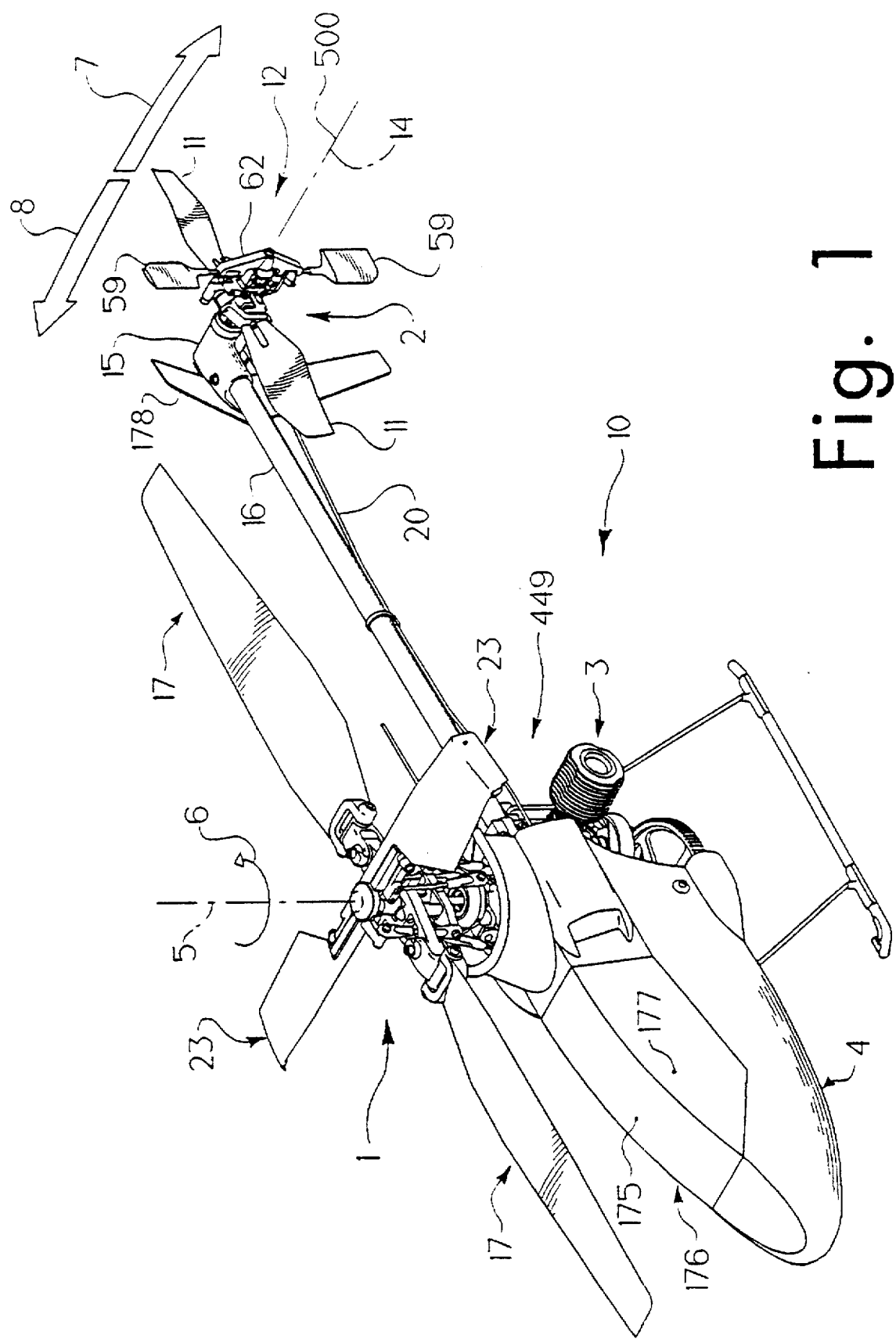
FIG. 1 is a perspective view of a representative helicopter including a tail assembly fitted with an improved yaw control and stabilization system in accordance with the present invention.
Figure 3:
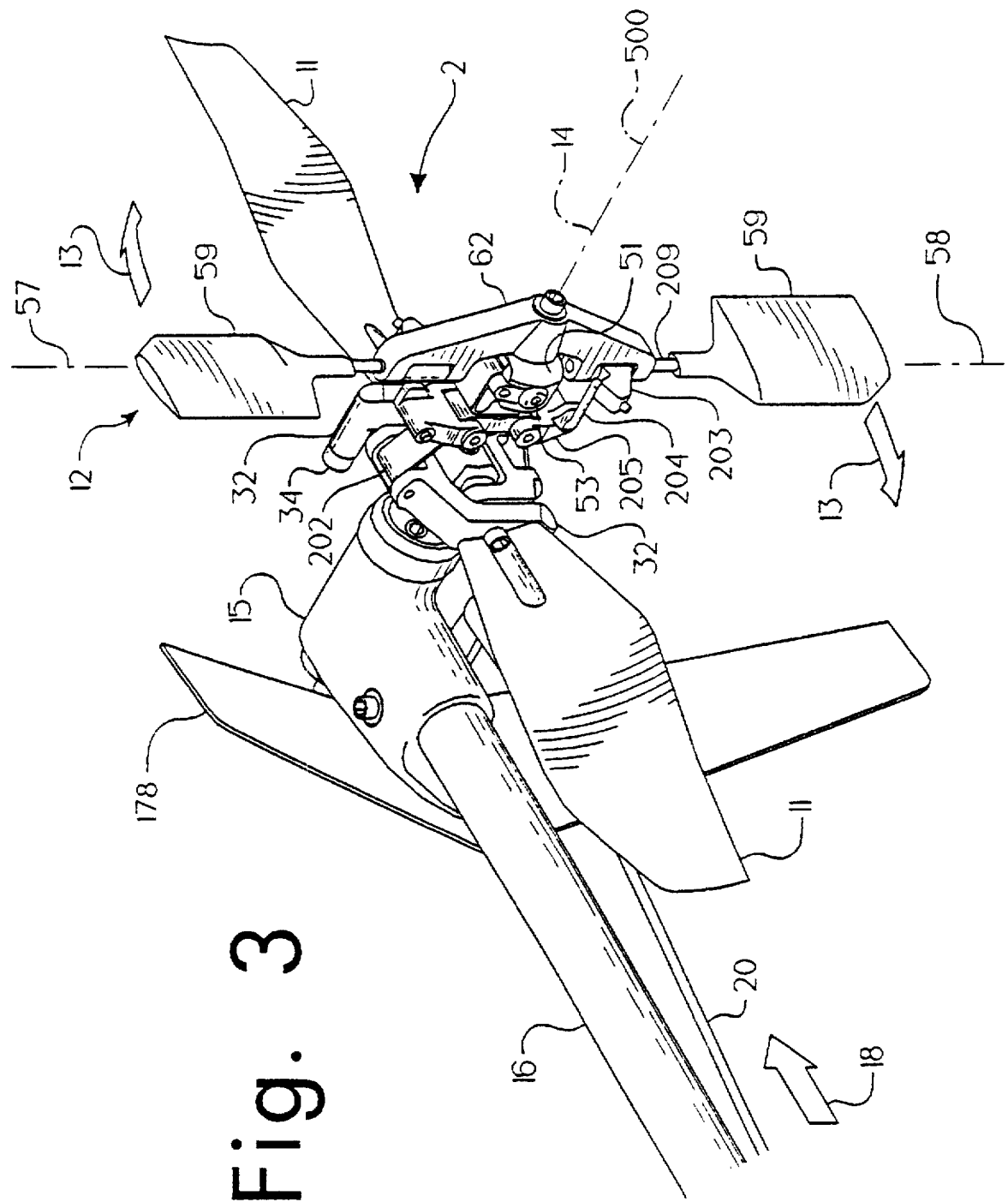
FIGS. 3 through illustrate in more detail first, second, and third embodiments of an improved yaw control and stabilization system of the present invention, each having a gyro rotor located outboard of a primary tail rotor and opposite the tail rotor gearbox.

Referring to FIG. 1, a helicopter 10 is designed to include a large main rotor 1 which rotates about a main rotor axis of rotation 5 to lift helicopter 10 into the air, and a smaller tail rotor 2 which rotates about a tail rotor axis of rotation 14 to counteract the torque produced by main rotor 1 and steer helicopter 10. Tail rotor 2 is mounted at the end of a tail boom 16 as shown in FIGS. 1 and 3. Generally, both main rotor 1 and tail rotor 2 of helicopter 10 are driven by a power plant such as engine 3 usually located within the helicopter fuselage (body) near the main rotor shaft (mostly hidden). A streamlined fuselage shell 4 covers the front of helicopter 10, but does not extend back to tail rotor 2. In alternative embodiments, the fuselage shell may extend back to the tail rotor.

Although helicopter 10, shown in FIG. 1, is a model helicopter, it will be understood that man-carrying helicopters (not shown) also have main rotors and tail rotors, and that other types of rotary wing aircraft (such as tilt rotor aircraft) use thrust-producing appendages that can operate in a similar fashion. A detailed description of a suitable model helicopter configuration and structure is disclosed by Paul E. Arlton et. al. in U.S. patent application Ser. No. 08/292,718, filed Aug. 18, 1994, which is hereby incorporated by reference herein. A detailed description of a suitable tail rotor system is disclosed by Paul E. Arlton in U.S. patent application Ser. No. 08/292,719, also filed Aug. 18, 1994, which is hereby incorporated by reference herein. A detailed description of a suitable helicopter main rotor system is disclosed by Paul E. Arlton et. al. in U.S. patent application Ser. No. 08/233,159, filed Apr. 25, 1994, which is hereby incorporated by reference herein.

Illustratively, main rotor 1 of helicopter 10 includes two rotor blades 17 and two shorter subrotor stabilizer blades 23 supported by a main rotor shaft (mostly hidden) aligned with main rotor axis of rotation 5. In operation, main rotor 1 rotates rapidly about main rotor axis of rotation 5 in rotation direction 6. As main rotor 1 rotates, main rotor blades 17 and subrotor blades 23 act like propellers or fans moving large amounts of air downward thereby creating a force that lifts helicopter 10 upward. The yaw torque (reaction force) created by rotating main rotor 1 in rotation direction 6 tends to cause helicopter 10 to swing about main rotor axis of rotation 5 in yaw direction 7 (angular motions of helicopter 10 about main rotor axis 5 are called "yaw motions", forces that tend to rotate helicopter 10 about main rotor axis 5 are called "yaw moments" or "yaw torques"). When trimmed for steady hovering flight, tail rotor 2 propels air in direction 7 creating enough thrust force in direction 8 to exactly cancel the yaw torque produced by main rotor 1 so that helicopter 10 maintains a constant heading in flight.

Decreasing or increasing the thrust force of tail rotor 2, as by decreasing or increasing the collective pitch of tail rotor blades 11, will cause helicopter 10 to turn in yaw directions 7 or 8 respectively. Conventionally, the pilot of a full-size helicopter (not shown) controls the collective pitch of tail rotor blades by manipulating foot pedals located within the cockpit. Cables, push-pull rods, mixing arms, and bellcranks connect the pedals to the pitch controls of the tail rotor blades. As the pilot adjusts the pedal position, the change in angle-of-attack (pitch) and associated thrust force of the rotating tail rotor blades results in a yaw moment about the main rotor axis. This yaw moment is directed to maneuver the helicopter, or to oppose any destabilizing yaw moment sensed by the pilot.

Tail rotors of radio-controlled model helicopters operate in a manner identical to full-size helicopters. The pilot manipulates small joysticks on a hand-held radio transmitter which in turn sends commands to electromechanical servo actuators located within the flying model. Push-pull rods, mixing arms and bellcranks connect the servos to the collective pitch controls of the tail rotor blades.

As shown in more detail in FIG. 3, which is an enlarged view of a tail assembly of helicopter 10 having a control and stabilization system in accordance with the present invention, tail rotor 2 illustratively includes two tail rotor blades 11, spider 202, gyroscopic mechanism 12 having gyro paddles 59, gyro paddle grips 203, delta-drive bars 204, and gyro hub 62 supported for rotation on gyro spindle 51 and rotating in rotation direction 13 about gyro rotor axis of rotation 500. Generally, with gyroscopic mechanism 12 in a nominal, untilted orientation, gyro rotor axis of rotation 500 coincides with tail rotor axis 14. Tail rotor blades 11 preferably have reach-around grips 32, timing weight bolts 34, and are of the aerodynamically balanced type described by Paul E. Arlton in U.S. patent application Ser. No. 08/292,719 which minimize or compensate for control link forces that might otherwise adversely affect gyroscopic mechanism 12.

Figure 4:
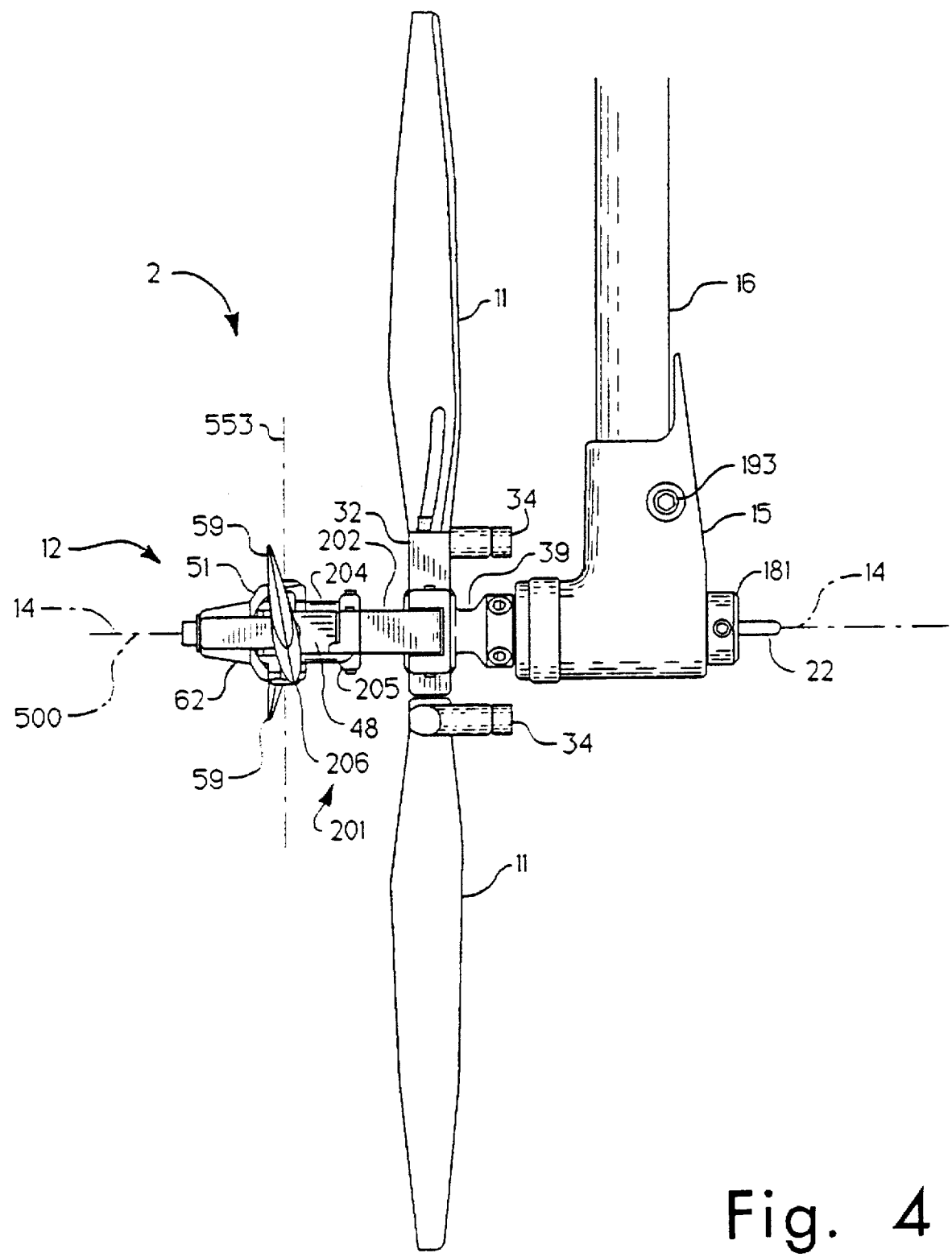
FIG. 4 is a top plan view of the first embodiment which illustrates the general configuration of the tail rotor gearbox and primary tail rotor of the current invention for the first, second, and third embodiments shown in FIGS. 3–7, with the vertical tail fin and all elements of the helicopter forward of the tail rotor gearbox removed for clarity.

In a preferred embodiment of the present invention shown in FIGS. 1 through 5, gyroscopic mechanism 12 is operably mounted outboard of tail rotor 2 to rotate with tail rotor 2 and pivot about a substantially horizontal gyro pivot axis 553, shown in FIG. 4, perpendicular to gyro rotor rotation axis 500. As seen best in FIG. 5, scissor-linkage 204, 205 transmits rotational motion of tail rotor 12 to gyroscopic mechanism 12 while gyroscopic mechanism 12 may tilt or translate relative to tail rotor 2. In operation, rotation of helicopter 10 in yaw directions 7 or 8 causes gyroscopic mechanism 12 to precess (tilt) about gyro pivot axis 553 and displace control linkages 476, 475, 48, 199, thereby adjusting the pitch of tail rotor blades 11, and the corresponding thrust force produced by tail rotor 2, to oppose the yaw motion.

CHARACTERISTICS AND FUNCTIONAL ELEMENTS

To understand the present invention as a whole, it is easiest to start with an understanding of the operation and application of its basic functional elements or characteristics. Improved control and stabilization systems in accordance with the present invention can generally be described by some combination of these five basic characteristics:

(1) The location of the gyro rotor relative to the tail rotor and gearbox;

(2) The method by which pilot and gyro rotor inputs are combined;

(3) The method by which the gyro rotor is driven;

(4) The method by which the gyro rotor is restored to a nominal, unpivoted orientation when the helicopter stops rotating; and (5) Whether or not the gyro rotor is adapted to produce thrust to augment thrust generated by the tail rotor.

The sections that follow describe these characteristics in more detail. Subsequent sections discuss each of the illustrated embodiments in terms of these basic characteristics.

Characteristic 1: The Location of the Gyro Rotor

The location of the gyroscopic mechanism in accordance with the present invention has little effect on the overall operation of the system, and is preferably chosen to suit the particular configuration of the aircraft. Tail rotors on most modern helicopters come in two common configurations: one has a hollow shaft (like tail rotor shaft 184 in FIG. 2) with a pushrod (like push-pull rod 22) passing through the center of the tail rotor shaft to control the pitch of the tail rotor blades, and the other configuration has a solid shaft (like tail rotor shaft 219 in FIG. 16) with a control slider (like slider 230) and linkages surrounding the tail rotor shaft to control the pitch of the tail rotor blades. Control and stabilization systems in accordance with the present invention can be generalized for use with either tail rotor configuration.

The gyroscopic mechanism of the present invention is located in one of three places: outboard of the tail rotor as shown in FIGS. 4 through 7, between the tail rotor and gearbox as shown in FIGS. 8 through 14, or beside (outboard of) the gearbox opposite the tail rotor as shown in FIGS. 15 through 23. It may also be located on the back end of the gearbox at an angle (such as 90 degrees) to the tail rotor shaft, or on some other part of the aircraft remote from the tail rotor such as near the power train mechanics in the forward section of the helicopter such as at a forward location 449 of helicopter 10 shown in FIG. 1.

Each location requires unique mounting structure, and has advantages in different applications. For instance, the mounting structure required for the location outboard of the tail rotor shown in FIGS. 4 through 7 is simple, and does not require ball bearings in model helicopter applications, but requires a relatively robust, non-rotating push-pull rod 22 to support the gyro rotor. When mounted next to either side of the gearbox as shown, for example, in FIGS. 9 and 16, the gyroscopic mechanism is supported by a relatively large ball bearing assembly (inside gyro spindle 222) that makes the mounting structure more bulky and complex. Since the gyroscopic mechanism may be mounted directly to the gearbox, however, the mounting structure may be built more solidly than when mounted to the push-pull rod, and any operating forces generated by the gyro rotor (such as by a gyro rotor adapted to produce a thrust force) can be transmitted directly to the structure of the helicopter. When mounted at a distance from the tail rotor such as at forward location 449 of helicopter 10 shown in FIG. 1, the gyro rotor cannot take advantage of the existing tail rotor mounting structure, but advantageously locates the weight of the gyroscopic mechanism forward in the aircraft thus possibly avoiding an undesirable tail-heavy condition.

Characteristic 2: The Method by Which Pilot and Gyro Rotor Inputs are Combined Some of the fundamental deficiencies of many of the mechanical stabilization systems currently available can be traced to the way in which gyroscopic stabilization and pilot control functions are combined. A unique and novel quality of the present invention is the way in which pilot control inputs can be combined with stabilizing inputs from the gyroscopic mechanism for mutually independent operation. To a large degree, mounting location dictates the method by which pilot control and stabilizing inputs are combined, but in operation each method produces similar results.

Figure 9:
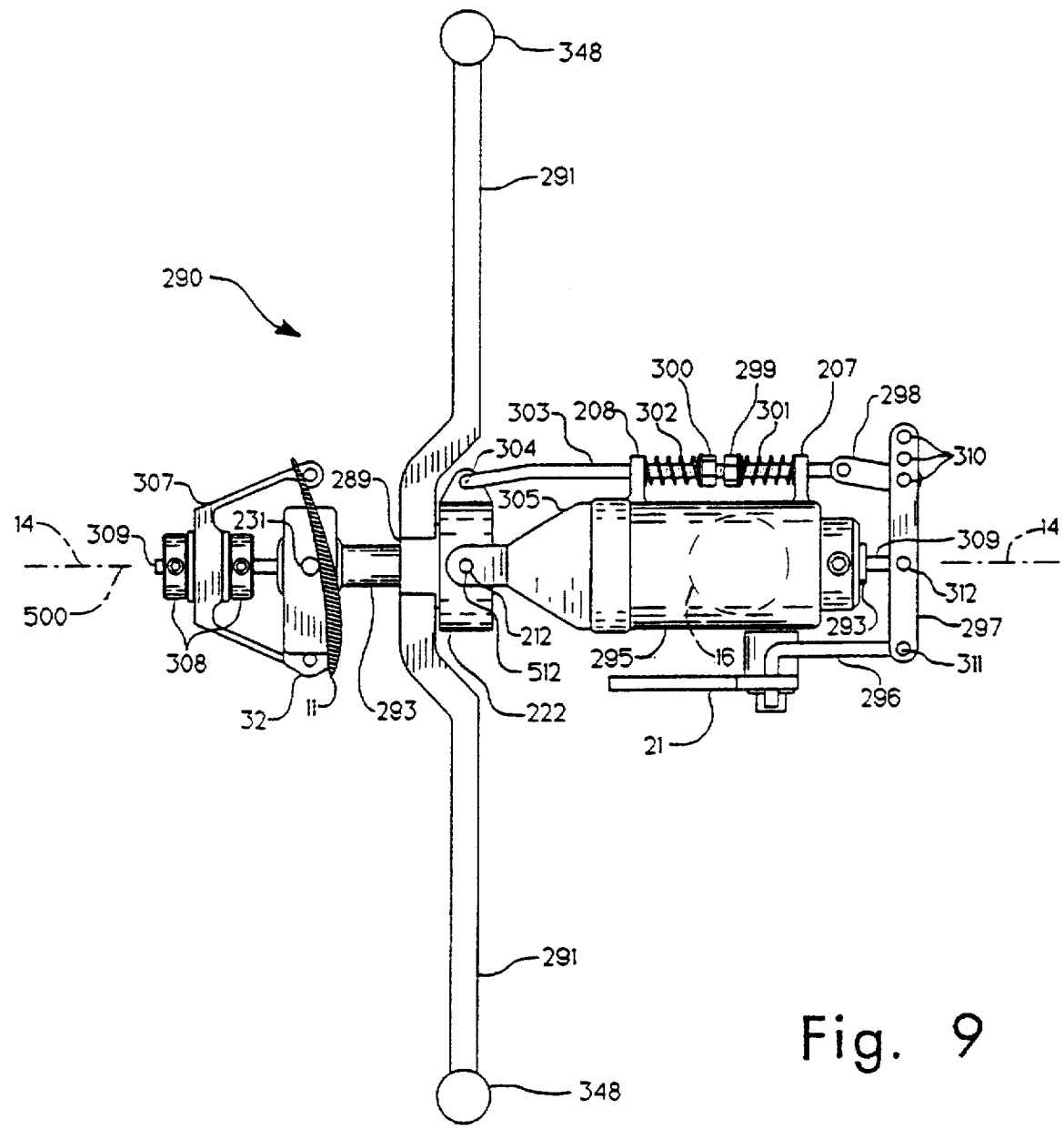

The two primary mechanical methods for combining pilot control inputs and stabilizing inputs are through mixing linkages, and by moving the gyroscopic mechanism linearly in space relative to the tail rotor. Straight or angled bellcranks or three-point mixing arms, such as mixing arm 297 shown in FIG. 9, are used in the present invention to combine two mechanical inputs into one mechanical output for controlling tail rotor thrust. These linkages can be configured to magnify or reduce the inputs. The linkages can also be configured to balance the inputs equally or emphasize one input over the other. For example, in FIG. 9, mixing arm 297 has multiple gyro-input pivots 310 receptive to adjustable link 298 for adjusting the input of gyro rotor 290 relative to pilot inputs transmitted through pilot pushrod 296 to pilot-input pivot 311 on mixing arm 297. Mixing arm 297 is connected to push-pull rod 309 at output pivot 312 and displaces push-pull rod 309 and spider 307 to vary the pitch of tail rotor blades 11.

Figure 5:
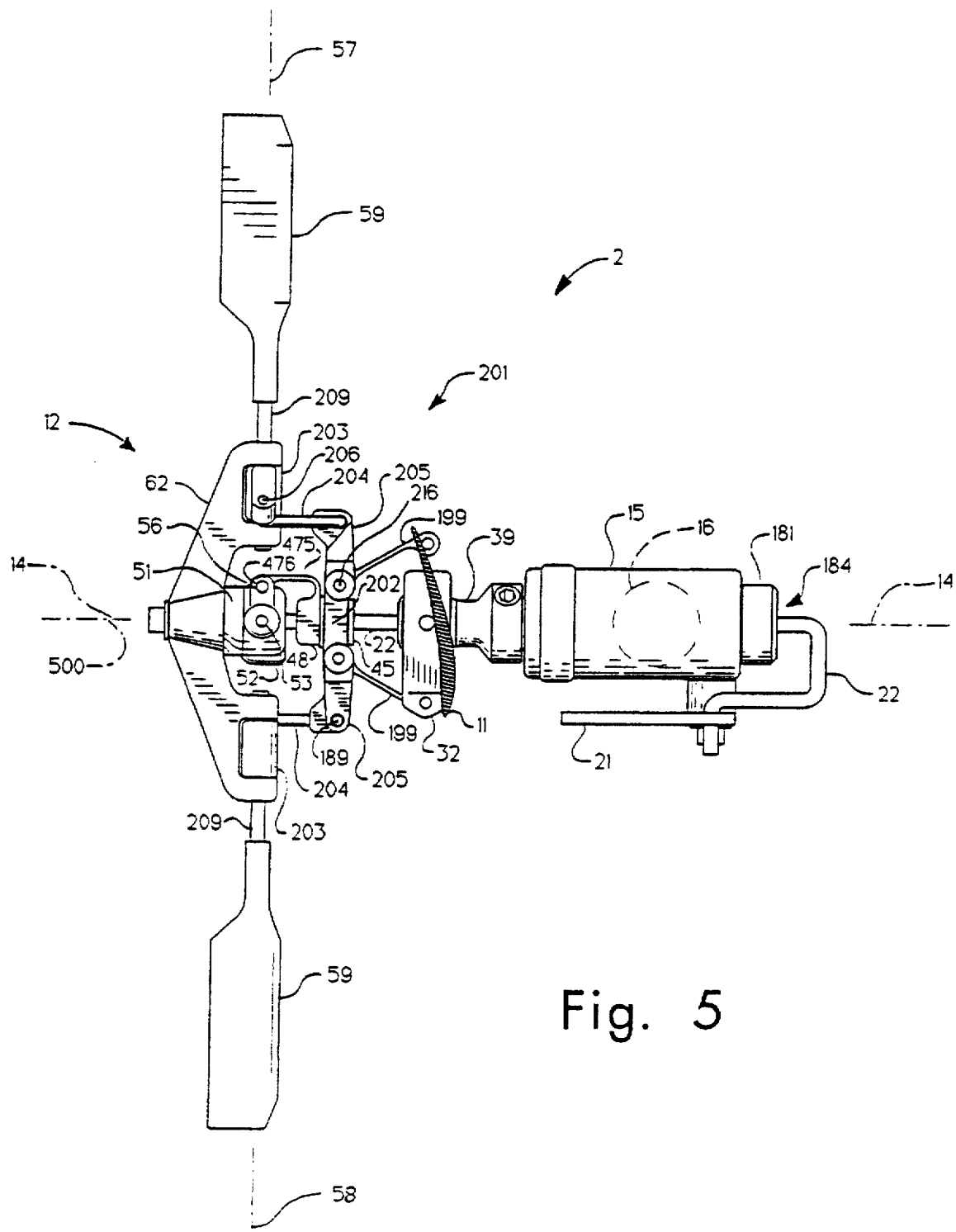
FIG. 5 is a rear-end elevation view of the first embodiment which has a hollow tail rotor shaft, a gyro rotor appended to the end of a push-pull rod and translatable in response to pilot control commands, follower-link drive means in the form of scissor linkages driving the gyro rotor, and aerodynamic restoring means in the form of gyro paddles, with one tail rotor blade shown in cross-section, and with the vertical tail fin, blade-balancing weights, and all elements of the helicopter forward of the tail rotor gearbox removed for clarity.

Several embodiments of the present invention as illustrated in FIGS. 4 through 7 cause the gyroscopic mechanism to move linearly in space relative to the tail rotor in response to pilot control commands (such as when gyro rotor 12 is displaced axially by push-pull rod 22 in FIG. 5). As described in detail in U.S. Pat. No. 5,305,968 to Paul Arlton, translating (non-pivoting) motion of the gyroscopic mechanism in any direction in space has no gyroscopic effect on the gyroscopic mechanism, and thus such movement will not cause the gyroscopic mechanism to tilt. In this way, pilot control commands are transmitted to the thrust control means of the tail rotor blades by linear displacement of the gyroscopic mechanism, while gyroscopic stabilization inputs are transmitted by angular displacement (tilt) of the gyroscopic mechanism.

Alternatively, the pilot can forcibly override the gyroscopic mechanism, but this places an undesirable load on the pilot's controls, and requires an override mechanism such as springs in the control system that do not permit direct control of the tail rotor blades. Although not ideal, such an override system would benefit from the other features of the present invention.

Figure 10:
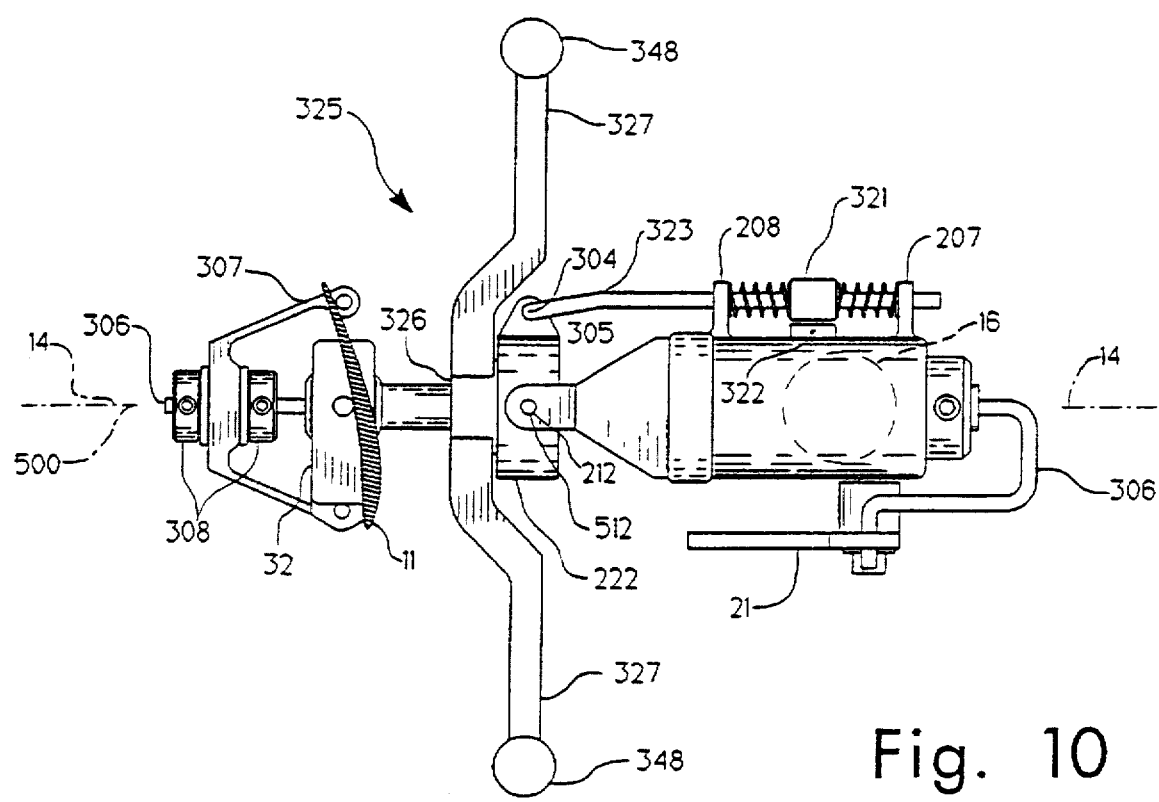

Hybrid electro-mechanical systems such as that shown in FIG. 10 offer a third method for combining pilot control and stabilization inputs. In these systems, the gyro linkage is electronic instead of mechanical, but performs the same function as mechanical linkages (to add a stabilizing input to the pilot's controls), and controls the tail rotor through a tail rotor control servo instead of by directly displacing the tail rotor pitch linkages.

In hybrid electro-mechanical systems, electronic means such as a Hall-effect switch 322, as shown in FIG. 10, or other type of electric or electronic switch or potentiometer is used to sense rotor tilt. The output signals from the switch are transmitted as by wires to an electronic servo control unit typically located in the body of the helicopter where they are electronically amplified and mixed with pilot control commands and directed to the tail rotor control servo. Electronic amplification and mixing is common on electronic gyro systems with electrically driven gyro rotors, but is entirely novel and disclosed herein for the first time for use on systems with mechanically driven gyro rotors.

Advantageously, the gyroscopic mechanism of a hybrid electromechanical system, such as gyro rotor 325 shown in FIG. 10, may be generally smaller than one designed for use on a purely mechanical system because it actuates only a small switch or potentiometer rather than directly actuating the tail rotor blades. In addition, being mechanical, no electrical power supply or electric motor is required to drive the gyroscopic mechanism. A drawback of any electromechanical system, however, is that the tail rotor control servo is in constant motion during flight. Such a condition can cause high wear on the servo, and can result in premature servo failure.

Characteristic 3: The Method by which the Gyro Rotor is Driven

The gyro rotor in various embodiments of the present invention may be driven through follower linkages, through a universal joint, or by a direct connection to a drive shaft. These gyro-rotor drive systems are discussed below.

The present invention makes new and novel uses of follower linkages. Follower links can generally be described as any link or combination of linkages that transmit rotational motion from one element in a rotating system to another element, and are characterized by their ability to transmit rotational motion around mechanical obstacles, across gaps, or between parts that must move or tilt in relation to one another. A good example of follower-linkages is found in FIG. 5 where scissor links 201 comprising inner drive link 205 and delta-drive bar 204 transmit rotational motion from spider 202 to gyro rotor 12 while gyro rotor 12 tilts about pivot axis 553 (shown in FIG. 4) and spider 202 slides along push-pull rod 22.

Follower links can also act as restoring means to return the elements of a rotating system to a nominal orientation or position by imparting a restoring force or control motion to the rotating elements. This contrasts universal joints (also called gimbals) which are generally located on the axis of rotation, and which typically do not impart significant restoring forces to the system.

Figure 18:
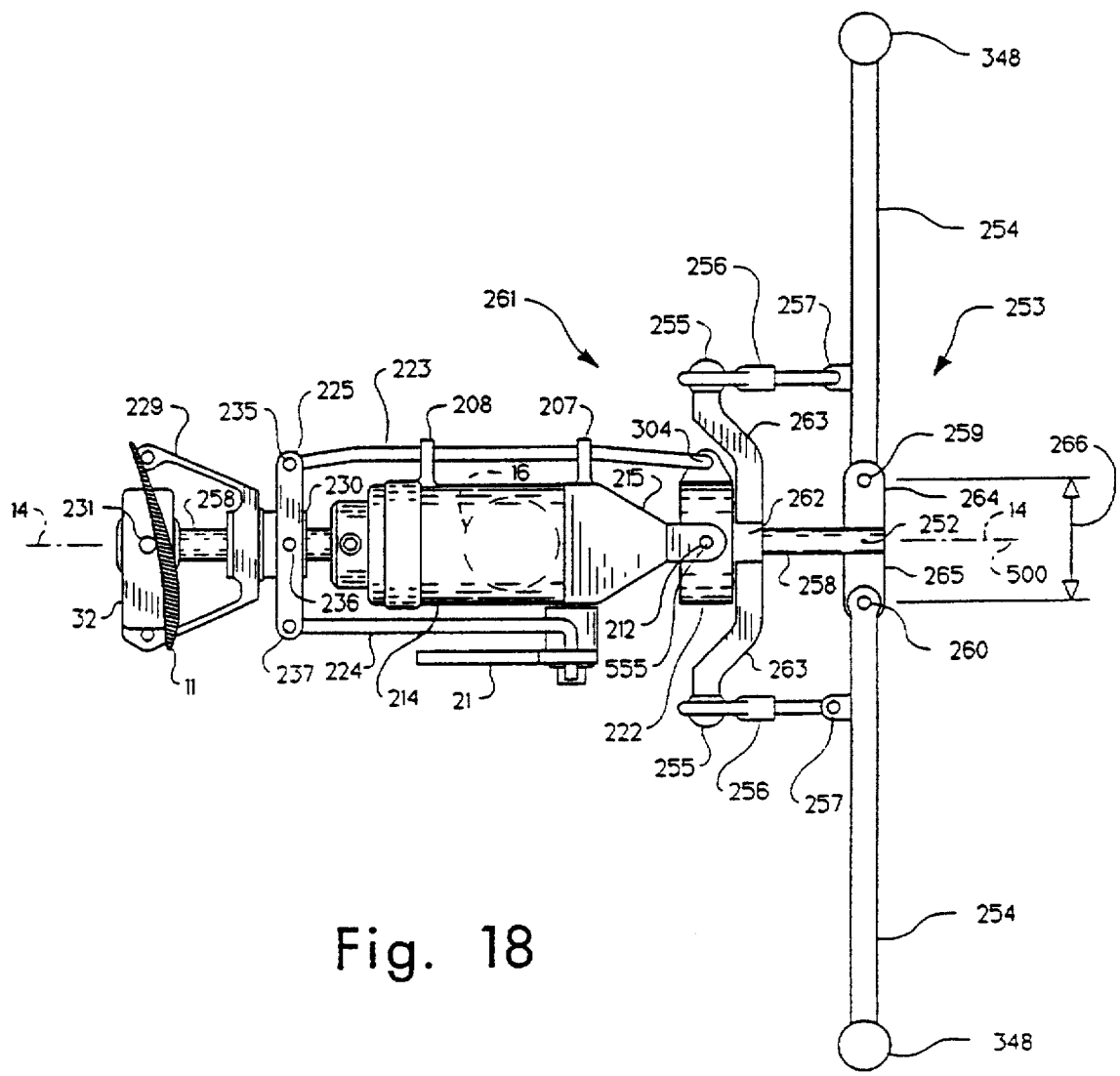

Direct drive systems, such as that shown in FIG. 18, generally have a gyro rotor 253 with gyro rotor arms 254 pivotably connected to a drive shaft 258 to pivot or flap about flapping axes 259,260 which are substantially perpendicular to the shaft. A remote gyro spindle 261 tilting about pivot pin 212 and connected to gyro rotor 253 by drive bars 256 typically constrains the spinning gyro rotor 253 to tilt about a single effective pivot axis located midway between flapping axes 259,260.

Characteristic 4: The Method by which the Gyro Rotor is Restored

The fourth way of characterizing the present invention is by the method in which the gyroscopic mechanism is restored to a nominal, unpivoted orientation when the helicopter stops rotating. Mechanical spring forces, centrifugal (rotational) forces, and aerodynamic forces are used in various embodiments to orient the gyroscopic mechanism. Each has advantages over the others in different applications.

Mechanical springs such as 301 and 302 in FIG. 9 are relatively compact and produce restoring forces that are dependent upon deflection, and independent of the operational speed of the system. Springs are well suited for systems operating at a constant rotational speed, because the restoring forces produced by the springs can be adjusted (tuned) to operate best within a small speed range. Constant speed rotor systems are common on full-size helicopters and model helicopters having collectively pitchable main rotor blades.

Figure 7:
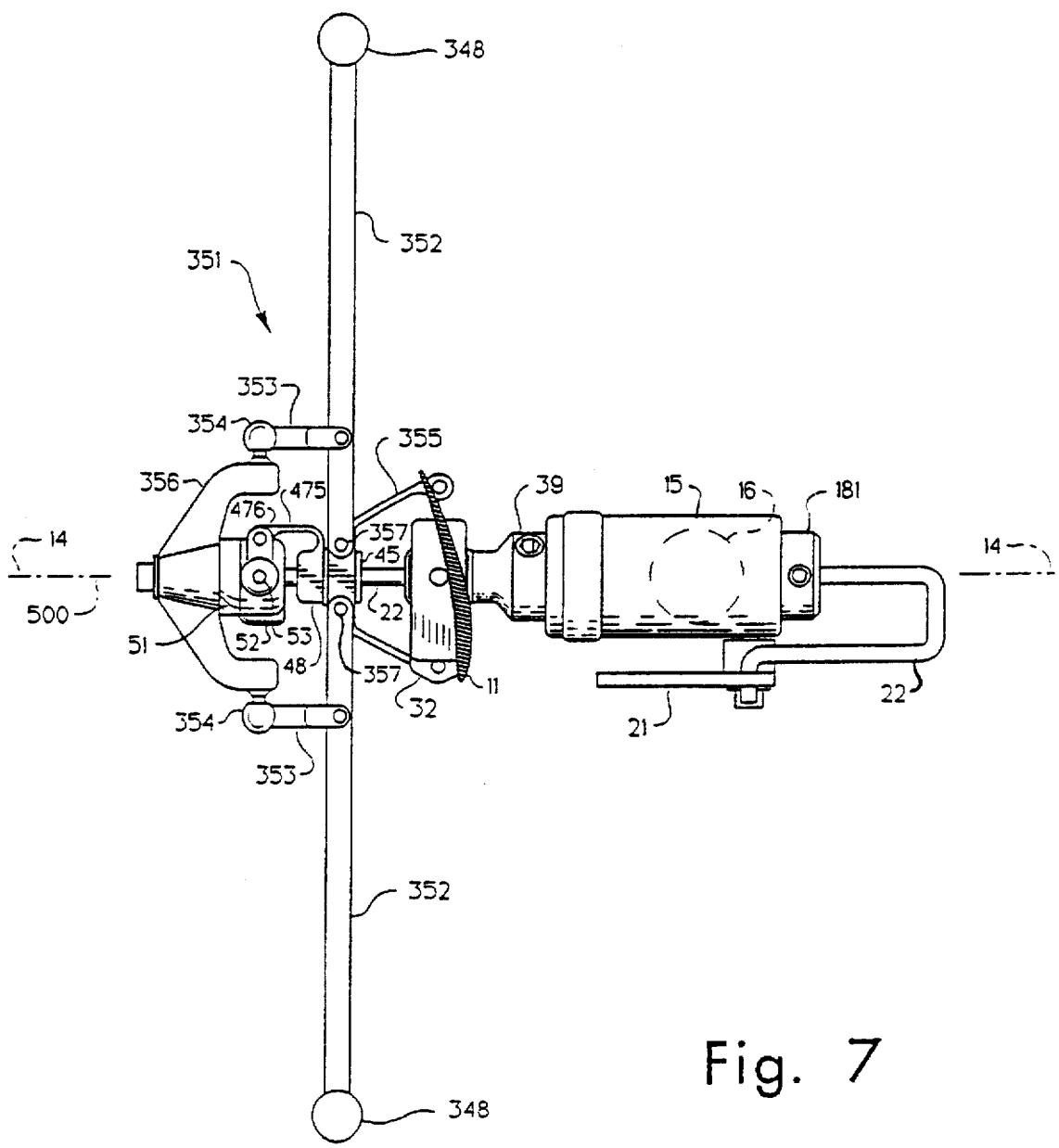
FIG. 7 is a rear-end elevation view of a third embodiment which has a hollow tail rotor shaft, a gyro rotor mounted to a slider and translatable in response to pilot control commands, follower-link drive means in the form of drive bars driving the gyro spindle, follower-link drive means in driving the gyro rotor, and centrifugal restoring means in the form of weighted gyro arms, with one tail rotor blade shown in cross-section, and with the vertical tail fin, blade-balancing weights, and all elements of the helicopter forward of the tail rotor gearbox removed for clarity

Centrifugal and aerodynamic mechanisms are usually more complicated than spring mechanisms, but produce restoring forces that vary with the operational speed of the system. Centrifugal restoring means can be any device that takes advantage of the forces developed by rotational motion of any element of the control and stabilization mechanism (such as weighted arms 352 operating in conjunction with spindle drive bars 353 as shown in FIG. 7). The gyroscopic forces that cause the gyroscopic mechanism to tilt when the helicopter yaws also vary with rotational speed, so centrifugal and aerodynamic restoring mechanisms are well suited for use in systems that must operate over a wide speed range such as systems intended for use on model helicopters with fixed-pitch main rotor blades.

Characteristic 5: Gyro Rotor Adapted to Produce a Thrust Force

In the simplest case, the gyroscopic mechanism of the current invention comprises a rotating disk with no aerodynamic properties, but in many alternative embodiments, the gyro rotor produces aerodynamic drag. It is desirable for the gyro rotor to generate usable thrust so that this drag is not produced without gain. Simple gyro paddles (such as paddles 59 in FIG. 3) that do not pitch collectively with tail rotor blades 11, may be used to off-load or trim tail rotor 2, but can also reduce overall tail rotor 2 effectiveness since tail rotor blades 11 must change pitch collectively to maneuver helicopter 10. Collectively pitchable paddles or blades are more complicated, but are preferred in some applications because they can increase the thrust potential of the tail rotor without adding appreciable drag.

In some embodiments, the gyro rotor may be adapted for use as a thrust-producing rotor. Since the gyro rotor must tilt in operation, it may seem to a casual observer that the thrust produced by this tilted gyro rotor will be directed in various unwanted directions. However, since means is provided for cyclically pitching the gyro rotor blades, the airflow through the gyro rotor will not necessarily follow the same path as through a simple tilted rotor. The actual airflow direction will depend upon many factors including the size and speed of the rotor system, the degree of tilt of the gyro rotor, the mass of the rotor blades, and the amount of cyclic pitch induced in the gyro rotor blades.

The operational tilt of the gyro rotor in hybrid electro-mechanical systems is usually less severe than in totally mechanical systems. Since electric and electronic switches can be very sensitive, less rotor tilt is required, and consequently less de-stabilizing thrust is produced, by a thrust-producing gyro rotor in an electromechanical system than by a similar gyro rotor in a totally mechanical system.

ILLUSTRATIVE EMBODIMENTS

Having described in general terms the basic characteristics and operational considerations of the present invention, reference will now be made to the remaining drawings which represent numerous preferred embodiments. Each embodiment is shown as functional on helicopter 10 of FIG. 1, but may be generalized to other aircraft. A discussion of the fundamental operating dynamics of aircraft operating dynamics has been described in detail by Paul E. Arlton in U.S. patent application Ser. No. 08/292,719, filed Aug. 18, 1994 and also in U.S. Pat. No. 5,305,968, issued Apr. 26, 1994, which are hereby incorporated by reference herein.

Figure 16:
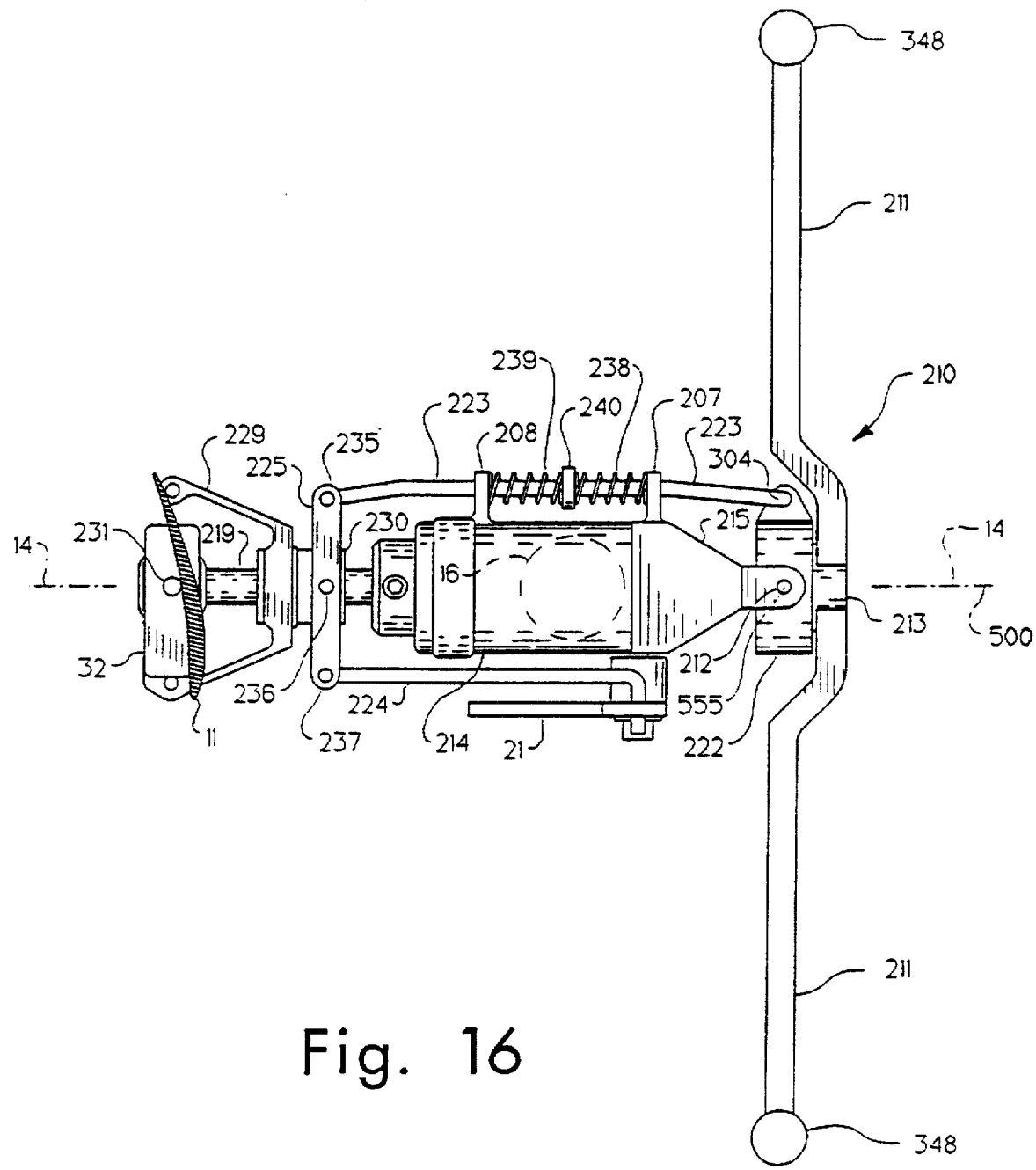

In general, the gyroscopic mechanism of the current invention includes a spinning gyro rotor that is capable of pivoting about a gyro rotor pivot axis, and a gyro spindle that responds to pivotal displacement of the gyro rotor. In some preferred embodiments, as shown in FIG. 16 for instance, the gyro spindle 222 supports the gyro rotor 210 directly. In other preferred embodiments, as shown in FIG. 18 for instance, the gyro spindle 222 is located at a distance from the gyro rotor 253 and connected to the gyro rotor 253 with linkages 256.

While the gyro rotors illustrated in the drawings are generally shown for clarity with two gyro arms extending radially from a central hub, it will be understood that gyro rotors having more than two arms are advantageous in certain embodiments (such as that shown in FIG. 18). Additional arms increase the moment of inertia of the gyro rotor about axes perpendicular to the gyro rotation axis. High inertia about axes perpendicular to the rotation axis is especially important when gyro rotor tilt is being transferred to a remote gyro spindle such as gyro spindle assembly 261 in FIG. 18 because flight forces acting on gyro pushrod 223, as may be generated by centrifugal feathering of tail rotor blades 11, will tend to tilt spindle assembly 261 about pivot pins 212. With only two arms, gyro rotor 253 cannot maintain the tilt angle of spindle assembly 261 when gyro rotor 253 has rotated about tail rotor axis of rotation 14 to a point where both gyro arms 254 are parallel to pivot pins 212. If gyro rotor 253 has three radially extending gyro arms 254 (and corresponding spindle drive bars 256), it can provide the inertia needed to constrain spindle assembly 261 at all times. Other embodiments, such as that shown in FIG. 3, have a gyro hub 62 which can be designed to generate sufficient inertia to maintain the tilt angle of gyro spindle 51, so more than two gyro arms may not be necessary.

Referring to the drawings in general, FIGS. 4 through 27 illustrate 22 preferred embodiments of the present invention for use on helicopter 10. FIGS. 4 through 23 illustrate seventeen dual-rotor embodiments of the present invention for tail assemblies with various mechanical configurations. For convenience, the figures are assembled into three groups based on the location of the gyroscopic mechanism relative to the primary tail rotor and tail rotor gearbox. Within each group, the figures show variations of the basic operational elements that make up the invention. FIGS. 24 through 27 illustrate four embodiments of the present invention wherein the primary tail rotor and gyroscopic mechanism have been combined into a single rotor. Generally, each embodiment comprises operational elements, such as mechanical linkages and drive means, that may be interchanged among the various embodiments within the constraints imposed by the configuration of the helicopter for which that element is intended.

Figure 2:
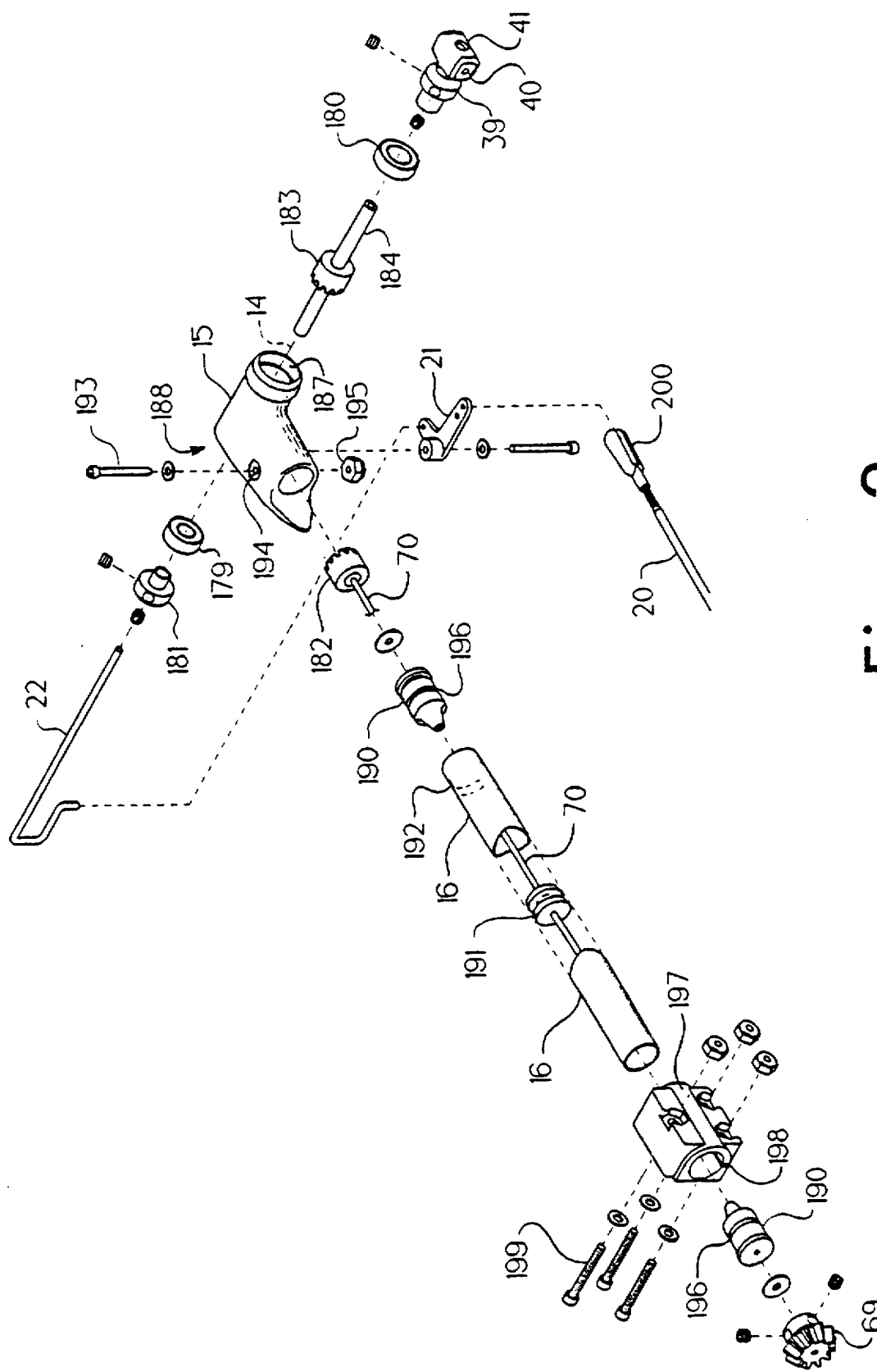
FIG. 2. is an exploded perspective view of the tail boom and tail rotor gearbox mechanism of the helicopter illustrated in FIG. 1, showing components situated within th tail boom and tail rotor gear box.

Now referring in detail to FIG. 2, which is an exploded view of the tail boom assembly of helicopter 10, gearbox 15 is mounted at the end of tail boom 16 and encloses ball bearings 179, 180, bevel gears 182, 183, and tail rotor shaft 184 that together support and drive tail rotor 2 (shown in FIG. 1). Rotational motion from the power plant 3 of helicopter 10 is transmitted to tail rotor 2 (shown in FIG. 1) attached to tail rotor hub 39 through a front bevel gear 69 (which is appended to a drive wire 70), bevel gears 182, 183, tail rotor shaft 184, and a tail rotor hub 39.

For model helicopters, tail boom 16 (shown in sectioned cut-away) has a center bushing 191 and end bushings 190 at each end made of a plastics material such as Delrin which take the place of expensive ball bearings. Gearbox bolt 193 passes through gearbox hole 194 formed in gearbox 15, and bolt slot 192 (shown in phantom in FIG. 2) near the end of tail tube 16, and into gearbox locknut 195 thereby securing gearbox 15 to tail tube 16. Bushing recesses 196 are formed in end bushings 190 to allow for passage of gearbox bolt 193.

Tail tube bracket 197 is provided to mount tail boom 16 to the fuselage structure (not shown) of helicopter 10. Pilot control commands actuate pilot pushrod 20 (having clevis 200) and bellcrank 21 as shown in FIG. 2. Some embodiments of the present invention employ a push-pull rod 22 to transmit control commands through the center of tail rotor shaft 184 to tail rotor assembly 2 attached to tail rotor hub 39, in which case tail rotor shaft 184 is necessarily hollow as shown.

Figure 2A:
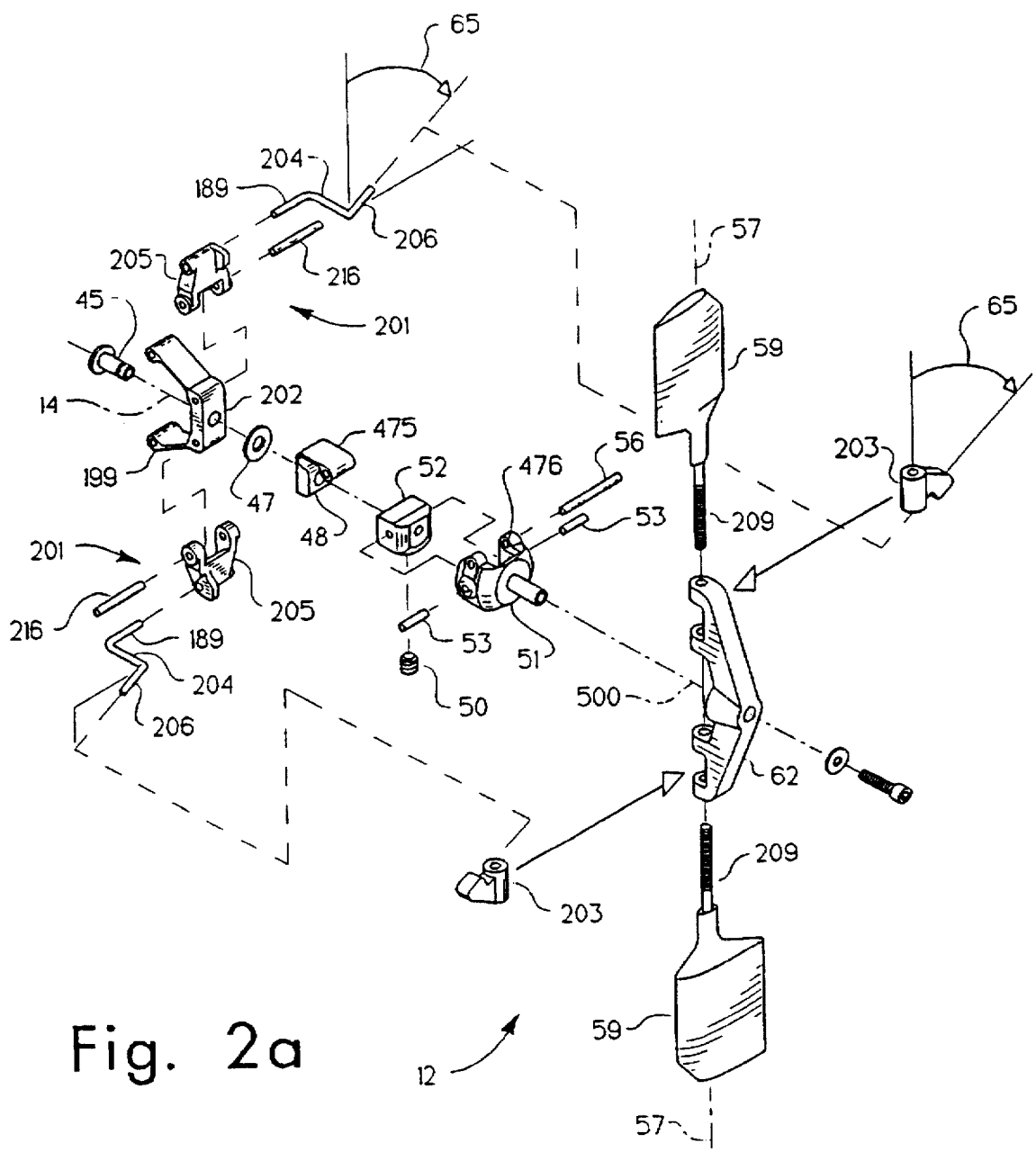
FIG. 2a is an exploded perspective view of the gyroscopic mechanism of the helicopter illustrated in FIG. 1, showing details of thee gyro rotor, gyro spindle, gyro control linkage and scissor-link drive means.

FIGS. 2a, 4, and 5 show an exploded view, top view, and rear end view, respectively, of the tail rotor assembly 2 of helicopter 10 incorporating a first embodiment of the improved control and stabilization system of the present invention. In this first embodiment, gyro rotor 12 has gyro paddles 59 extending radially from gyro hub 62, and is rotationally supported by gyro spindle 51. Gyro spindle 51 is pivotably supported by gyro pivot pins 53 extending from gyro mount 52 which is appended with setscrew 50 (shown in FIG. 2a) to the end of push-pull rod 22 which extends through the center of hollow tail rotor shaft 184 and gearbox 15. Gyro rotor 12 rotates about gyro rotor axis of rotation 500 (which normally coincides with tail rotor axis 14) and is constrained to pivot about a substantially longitudinal pivot axis 553 by pivot pins 53.

Semi-flexible gyro pushrod 475 transforms pivoting motion of gyro spindle 51 into translational motion, and is operably connected to gyro spindle 51 at gyro output pivot 476 which coincides with pivot link pin 56. Spider slider 48 is operably connected to gyro spindle 51 through semi-flexible gyro pushrod 475, and is free to move axially on push-pull rod 22. Spider 202 is supported for rotation about tail rotor axis 14 by an annular recess formed between eyelet 45 and slider 48, and is operably connected by spider arms 199 to the leading edge of each reach-around grips 32 which are fixedly secured to each tail rotor blade 11 and blade balancing weight 34. Tilt of gyro spindle 51 (as would be caused, for instance, by precession of gyro rotor 12 about pivot pins 53 due to yaw motion of helicopter 10) displaces gyro pushrod 475, spider slider 48, and spider 202 thereby varying the pitch of tail rotor blades 11 independent of pilot control inputs. Note that push-pull rod 22 is held in position by the pilot control system which typically includes pilot pushrod 20 (shown in FIG. 2) connected to bellcrank 21 (shown in FIG. 2). Since gyro rotor 12 is operably connected to push-pull rod 22, pilot control inputs displacing push-pull rod 22 axially along tail rotor axis of rotation 14 also displace gyro rotor 12 and the attached pitch linkages thereby varying the pitch of tail rotor blades 11 independent of stabilizing inputs from gyro rotor 12.

Rotational motion of tail rotor hub 39 is transferred to gyro rotor 12 through blade grips 32 and spider 202, scissor-link 201 comprising inner drive links 205, and delta-drive bars 204 which are operably connected to gyro paddle grips 203. Gyro paddle grips 203 are fixedly secured to pivot rod portions 209 of gyro paddles 59, and pivotably connect gyro paddles 59 to gyro hub 62 for rotation about their respective pitch axes 57,58. When operating as follower links, delta-drive bars 204, and inner drive links 205 transfer rotational motion to gyro rotor 12 regardless of the tilt angle of gyro rotor 12 or the axial displacement of spider 202 on push-pull rod 22.

Each delta-drive bar 204 has a drive pivot-leg portion 189 extending into drive link 205 and a delta pivot-leg portion 206 oriented to form an acute delta-angle with the pitching axis of gyro paddles 59. Pivot of gyro rotor 12 leads to a cyclic change in pitch of gyro paddles 59 resulting in cyclic aerodynamic forces on gyro paddles 59 that tend to restore gyro rotor 12 to a nominal vertical orientation. In this way, scissor links 201 act as both drive means and restoring means for gyro rotor 12. It should be noted that delta-drive bar 204 should be semi-flexible, or have an additional degree of freedom to rotate slightly about its longitudinal axis, since operation of the delta mechanism as illustrated in FIG. 5 will induce small twisting forces in delta-drive bars 204. In alternative embodiments of the present invention, spring means may interconnect delta-drive links, inner drive links, and/or spider to restore gyro rotor 12 to a nominal vertical orientation.

Delta-drive components are so-named because pivoting motion of gyro rotor 12 causes a pitching motion of gyro paddles 59 in a manner conceptually similar to delta hinges on main rotor 1 of helicopter 10 (rotor hinge-axes are generally referred to with the Greek letters Alpha, Beta, Gamma, and Delta).

A key distinction between the present invention as shown in FIGS. 1 through 5 and the device disclosed by Paul E. Arlton in U.S. patent application Ser. No. 08/292,719 is the use of scissor linkages 201 comprising delta-drive bars 204 and inner drive links 205 to drive gyro rotor 12 instead of slidable delta-drive bars (not shown). Advantageously, pivoting scissor linkages 201 offer less frictional resistance, and are more practical in many applications than are slidable drive bars (not shown). Delta-drive bar 204 is also known as a delta Z-link and is preferably made of metal wire bent into a Z-shape. Formed wire Z-links are especially inexpensive and simple in model helicopter applications.

Figure 6:
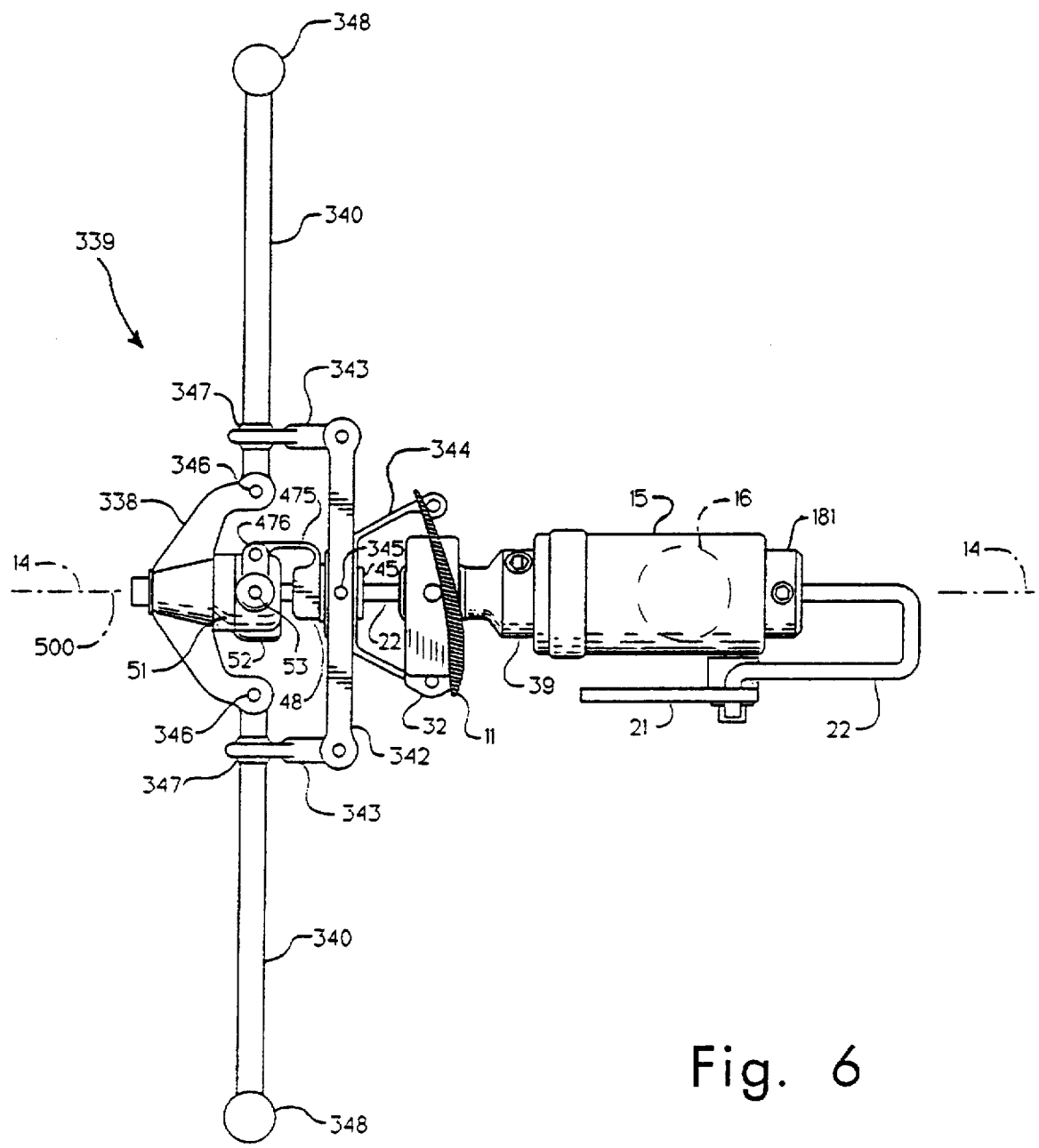
FIG. 6 is a rear-end elevation view of a second embodiment which has a hollow tail rotor shaft, a gyro rotor appended to the end of a push-pull rod and translatable in response to pilot control commands, follower-link drive means in the form of drive bars driving the gyro rotor, and centrifugal restoring means in the form of weighted gyro arms, with one tail rotor blade shown in cross-section, and with the vertical tail fin, blade-balancing weights, and all elements of the helicopter forward of the tail rotor gearbox removed for clarity.

FIG. 6 illustrates a second embodiment of the present invention with a gyro rotor 339 having gyro arms 340 terminating in gyro arm weights 348 instead of a gyro rotor having aerodynamic paddles 59 as shown in FIGS. 4 and 5. In operation, slider 48 is displaced axially by pivoting motion of gyro spindle 51 which is pivotably supported by gyro mount 52 which is fixedly secured to the end of push-pull rod 22. Crossbar 342 is pivotably mounted to spider 344 at crossbar pivot 345 so that axial displacement of slider 48 displaces spider 344, crossbar 342, and drive bars 343 which are universally connected to weighted gyro arms 340 at ball joints 347. Such axial displacement of crossbar 342 and drive bars 343 causes gyro arms 340 to "cone" about arm flapping pivots 346. Since centrifugal forces tend to orient gyro arms 340 radially from gyro hub 338, coning of gyro arms 340 produces centrifugal forces that tend to move slider 48 back to a non-displaced position on push-pull rod 22 thereby restoring gyro rotor 339 to a nominal vertical orientation. Advantageously, weighted gyro arms 340 are simpler to construct than gyro paddles 59 shown in FIGS. 4 and 5.

FIG. 7 shows a third embodiment with gyro rotor 351 having weighted gyro arms 352 extending radially from flapping pivots 357 situated on the center portion of spider 355, and operably connected to spindle hub 356 by spindle drive bars 353 at ball joints 354. Rotational motion of tail rotor hub 39 is transferred to gyro rotor 351 by follower-linkages comprising reach-around grips 32 (which act as inner drive links) and the arms of spider 355 (which act as gyro drive bars). Spindle hub 356 constrains gyro rotor 351 to tilt about a substantially longitudinal axis, and illustrates the general concept of a remote gyro spindle constraining the tilt of a gyro rotor. Tilt of gyro rotor 351 causes spindle hub 356 to tilt, and displaces slider 48 axially. Such axial displacement causes gyro arms 352 to cone about arm flapping pivots 357 producing centrifugal forces that tend to move slider 48 back to a non-displaced position on push-pull rod 22 thereby restoring gyro rotor 351 to a nominal vertical orientation. Advantageously, spindle hub 356 may be constructed more lightly than gyro hub 338 shown in FIG. 6 because spindle hub 356 is not required to carry the radial centrifugal loads of weighted gyro arms 352.

Figure 8:
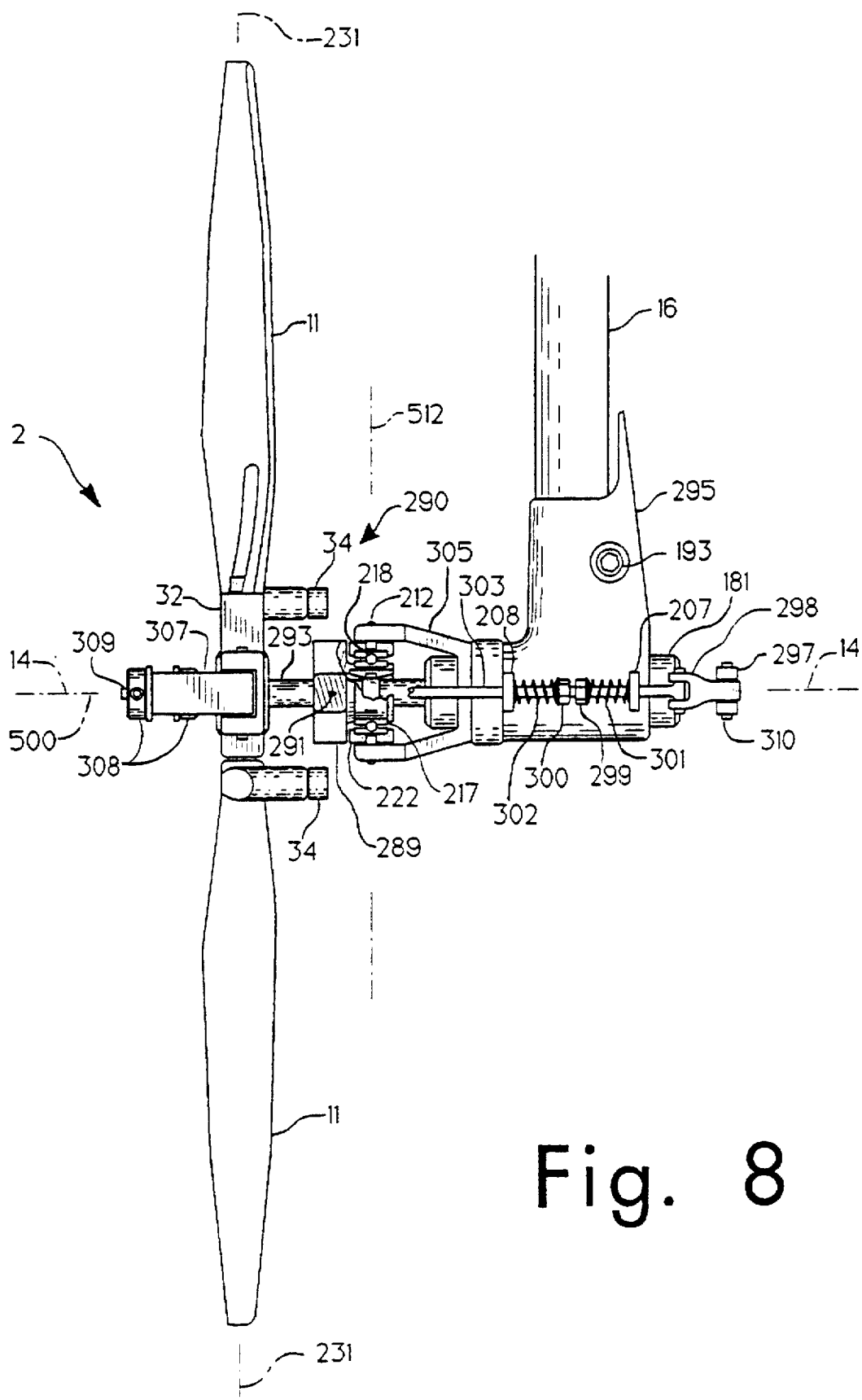
FIGS. 8 through 14 illustrate fourth through ninth embodiments of the improved yaw control and stabilization system of the present invention, each having a gyro rotor located between the primary tail rotor and the tail rotor gearbox.

FIGS. 8 and 9 show the top plan view and rear end elevational view, respectively, of the tail rotor assembly of helicopter 10 incorporating a fourth embodiment of the present invention having a gyro rotor 290 located between the tail rotor 2 and the gearbox 295. In the fourth embodiment, which illustrates the general configuration of the gearbox and primary tail rotor of the fourth through ninth embodiments shown in FIGS. 8 through 14, gyro rotor 290 has weighted arms 291 extending radially from gyro hub 289, and is pivotably supported by gyro support arms 305 extending from gearbox 295. Gyro rotor 290 normally rotates about gyro rotor axis 500 and is constrained to pivot about a substantially longitudinal pivot axis 512 by pivot pins 212 extending through gyro support arms 305 into gyro spindle 222. Gyro hub 289 is supported by ball bearing inner race 217, and has an interior receptive to universal drive means on hollow tail rotor shaft 293.

Illustratively, tail rotor shaft 293 has universal drive means comprising a spherical bulge with drive pins extending radially therefrom and riding within axial slots (shown in cut away in FIG. 8) in gyro hub 289 thereby transferring rotational motion of tail rotor shaft 293 to gyro rotor 290 while allowing gyro rotor 290 to pivot about pivot pins 212. In alternative embodiments of the present invention, follower link drive means may be substituted for universal drive means. Although gyro rotor 290 is shown supported for rotation by inner race 217, it may be supported by outer race 218 with appropriate modification to gyro support arms 305 and with modified means to combine pilot control and gyro stabilization inputs.

Gyro pushrod 303 is pivotably connected to gyro spindle 222 at gyro output pivot 304, and transmits gyro stabilization outputs from gyro rotor 290 to three-point mixing arm 297 where they are combined with pilot control commands displacing pilot pushrod 296. Push-pull rod 309 transmits combined control and stabilization commands through the center of hollow tail rotor shaft 293 to spider 307, and thereby to reach-around grips 32 and tail rotor blades 11.

It is generally desirable to compensate for the aerodynamic and gyroscopic pitching forces produced by tail rotor blades 11 and other elements of the tail rotor system to maximize the sensitivity and effectiveness of the gyro stabilization system of the current invention. Pitching forces generated about blade pitching axis 231 can be transmitted through spider 307, push-pull rod 309, mixing arm 297, link 298, and gyro pushrod 303, to gyro spindle 222 causing gyro rotor 290 to tilt undesirably. Gyro adjustment nuts 299 and 300 on gyro pushrod 303, and adjustable link 298 are operably connected to three-point mixer 297 at one of multiple gyro-input pivot points 310. Gyro-input pivot points 310 are provided for adjusting the gain and bandwidth of the stabilizing input to three-point mixer 297, and for adjusting the restoring force applied to gyro rotor 290. Adjustable nuts 299 and 300 operate against springs 301 and 302 and may also be set to compensate for pitch-link forces so that gyro rotor 290 maintains a nominal vertical orientation even if tail rotor blades 11 are not aerodynamically balanced or mass balanced about their respective blade pitching axes 231.

While gyro rotor 290 is shown with only two arms 291, gyro rotor 290 may have multiple arms. As previously discussed, multiple arms advantageously increase the moment of inertia of the gyro rotor about two axes thereby enabling the gyro rotor to more smoothly hold the tail rotor blades at a particular pitch if the tail rotor blades are not balanced to minimize pitch-link forces.

FIG. 10 shows a fifth, hybrid electro-mechanical embodiment of the present invention that is mechanically similar to the fourth embodiment shown in FIGS. 8 and 9. Illustratively, magnet means 321 is secured to gyro pushrod 323 in proximity to Hall-effect switch 322 so that displacement of magnet means 321 is sensed by Hall-effect switch 322. Electronic output of Hall-effect switch 322 is amplified and mixed electronically with pilot control commands, and sent to the tail rotor control servo (not shown) which operates bellcrank 21 and push-pull rod 306. Tilt of gyro rotor 325 can be sensed electrically or electronically in many ways including rotary potentiometer means at gyro pivot 212, or linear potentiometer means or electronic counter means on gyro pushrod 323. Advantageously, gyro arms 327 of gyro rotor 325 on hybrid electromechanical systems can be smaller than on totally mechanical systems because the motion of gyro rotor 325 is amplified electronically, so that gyro rotor 325 need not generate gyroscopic forces capable of moving tail rotor blades 11 directly.

Figure 11:
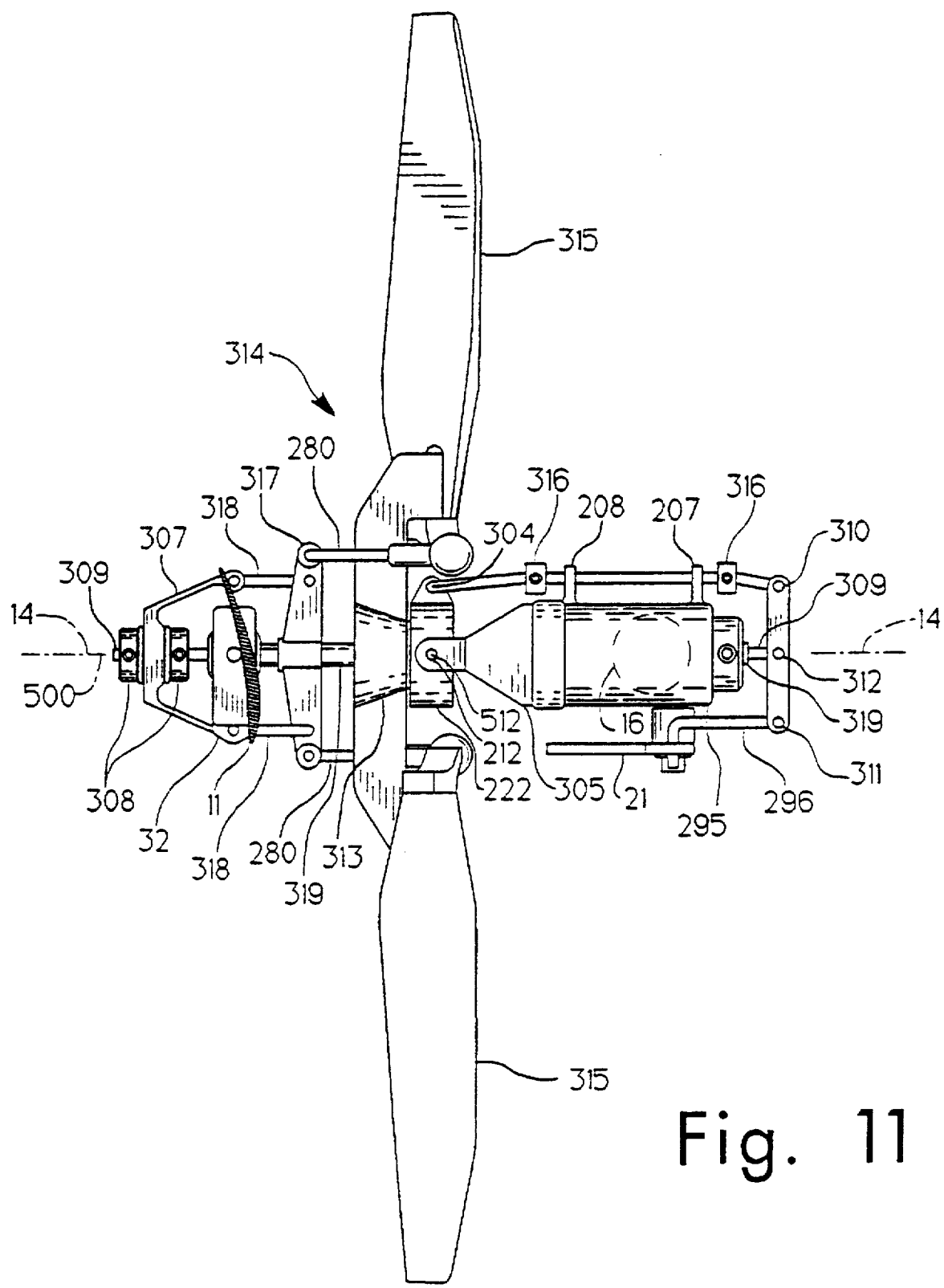

A sixth embodiment shown in FIG. 11 has a universal joint (hidden) inside gyro hub 313 to transmit rotary motion from tail rotor shaft 319 to gyro rotor 314, and pushrod collars 316 for adjusting the limits of tilt of gyro rotor 314. Pitch slider 317 is operably connected to spider 307 and blade grips 32 with spider links 318 so that pitch control inputs to tail rotor blades 11 also control collectively-pitchable gyro rotor blades 315. Gyro rotor 314 is restored by cyclic pitching of gyro rotor blades 315. Advantageously, gyro rotor blades 315 can produce a controllable thrust force to augment the thrust produced by tail rotor blades 11.

Figure 12:
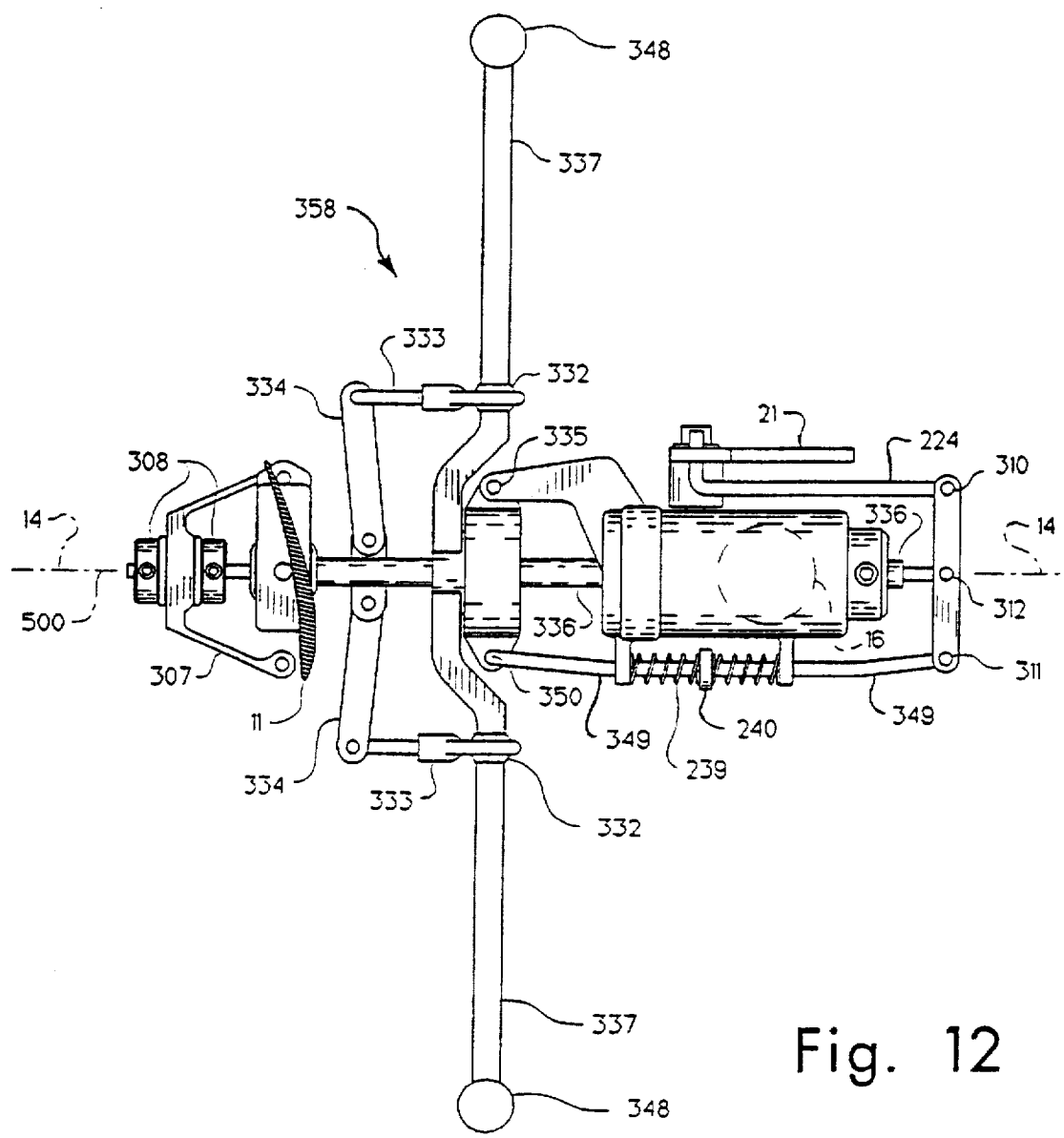

FIG. 12 shows a seventh embodiment with offset gyro pivot 335, gyro pushrod 349, gyro output pivot 350, hollow tail rotor shaft 336, and follower link drive means comprising a scissor linkage for transferring rotational motion from tail rotor shaft 336 to gyro rotor 358 having drive bars 333 and inner drive links 334 operably connected to weighted arms 337 at ball joints 332. In this embodiment, spider 307 is connected to the trailing edge of tail rotor blades 11.

Figure 13:
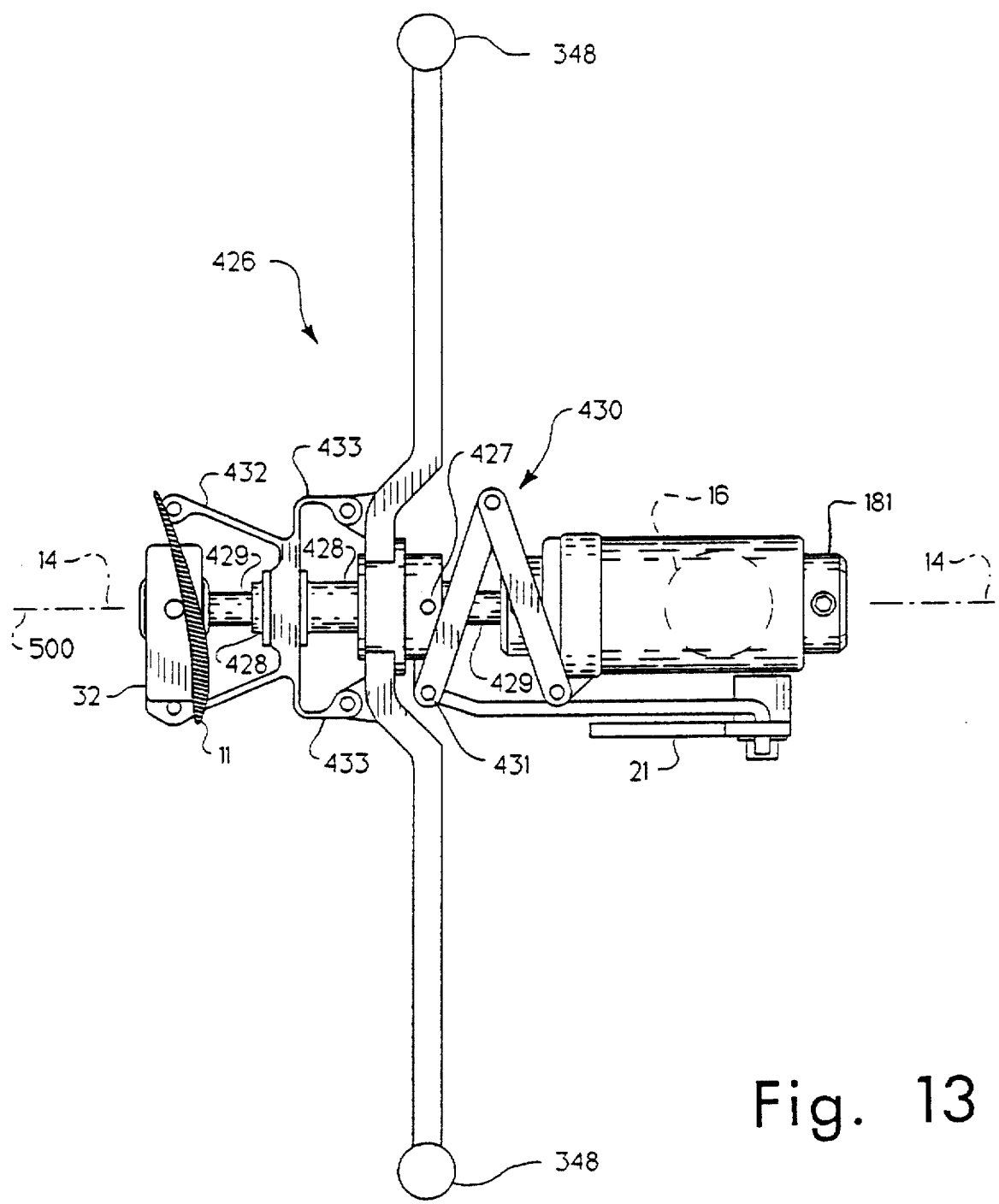

An eighth embodiment shown in FIG. 13 has gyro rotor 426 pivotable about gyro pivot axis 427 extending radially from slider 428. Gyro slider 428 is slidable on tail rotor shaft 429, rotatably supports spider 432 and gyro rotor 426, and is constrained against rotation by scissor links 430. Tilt of gyro rotor 426 about gyro pivot axis 427 causes gyro rotor 426 to push against pilot control pivot 431 (which doubles as the gyro output pivot) displacing gyro rotor 426, slider 428, and spider 432 axially. Semi-flexible links 433 act both as follower link means to transmit rotational motion from tail rotor shaft 429 to gyro rotor 426 and as spring restoring means to return gyro rotor 426 to its nominal vertical orientation after gyro rotor 426 has been tilted.

Figure 14:
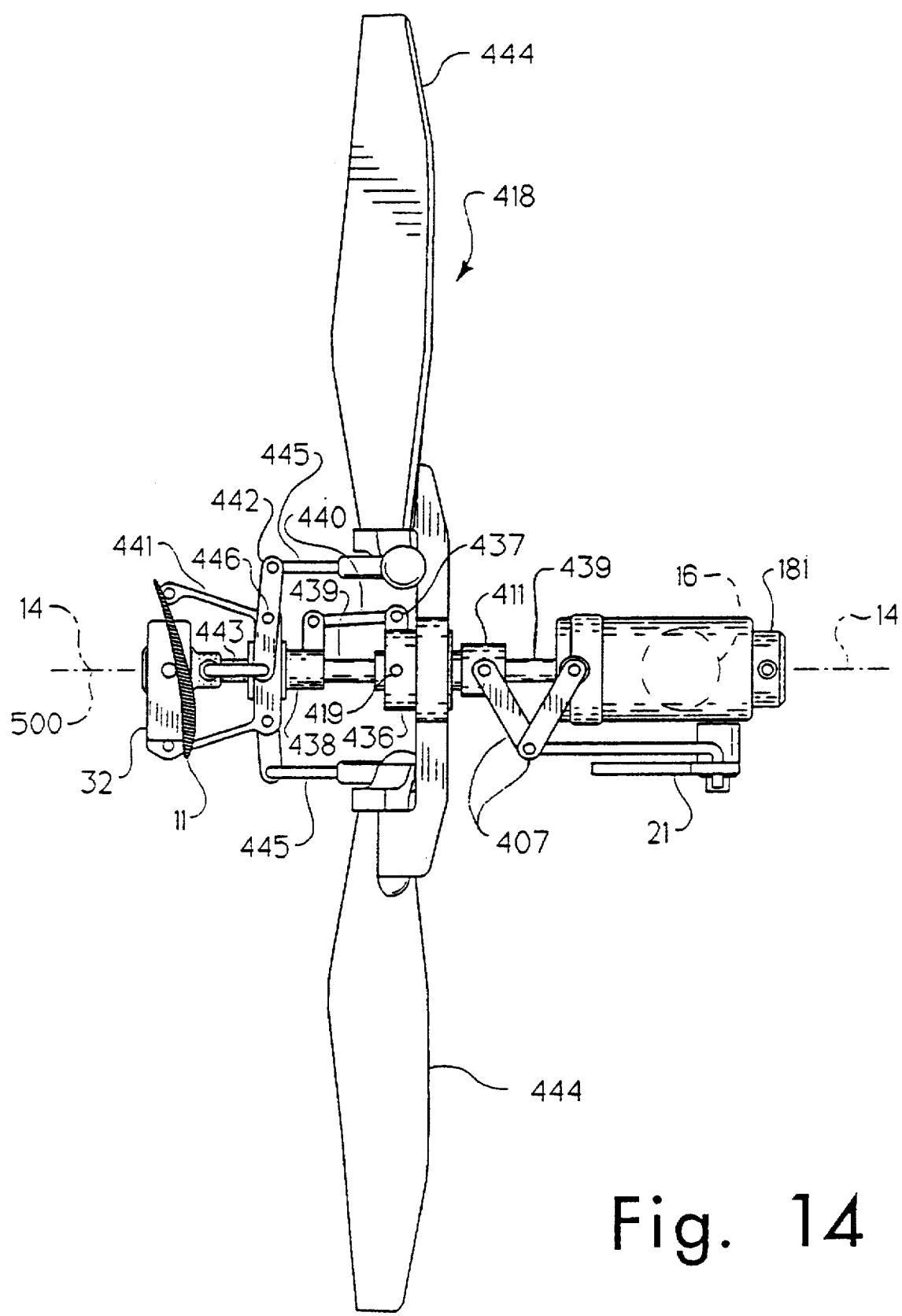

FIG. 14 shows a ninth embodiment with thrust-producing gyro rotor 418 pivotable about gyro pivot axis 419 on slider 438. Slider 438 is slidable on tail rotor shaft 439 and constrained against rotation by scissor links 407. Gyro pushrod 440 is pivotably connected to gyro spindle 436 at gyro output pivot 437 and actuates slider 438 and spider 441 which is operably connected to three-point lever 442 at spider pivot 446. Three-point lever 442 is operably connected at one end to ground link 443 attached to tail rotor shaft 439, and at the other end to drive bar 445, and reverses the direction of pitch control commands that collectively pitch gyro rotor blades 444 so that gyro rotor blades 444 and tail rotor blades 11 pitch in the same direction.

Figure 15:
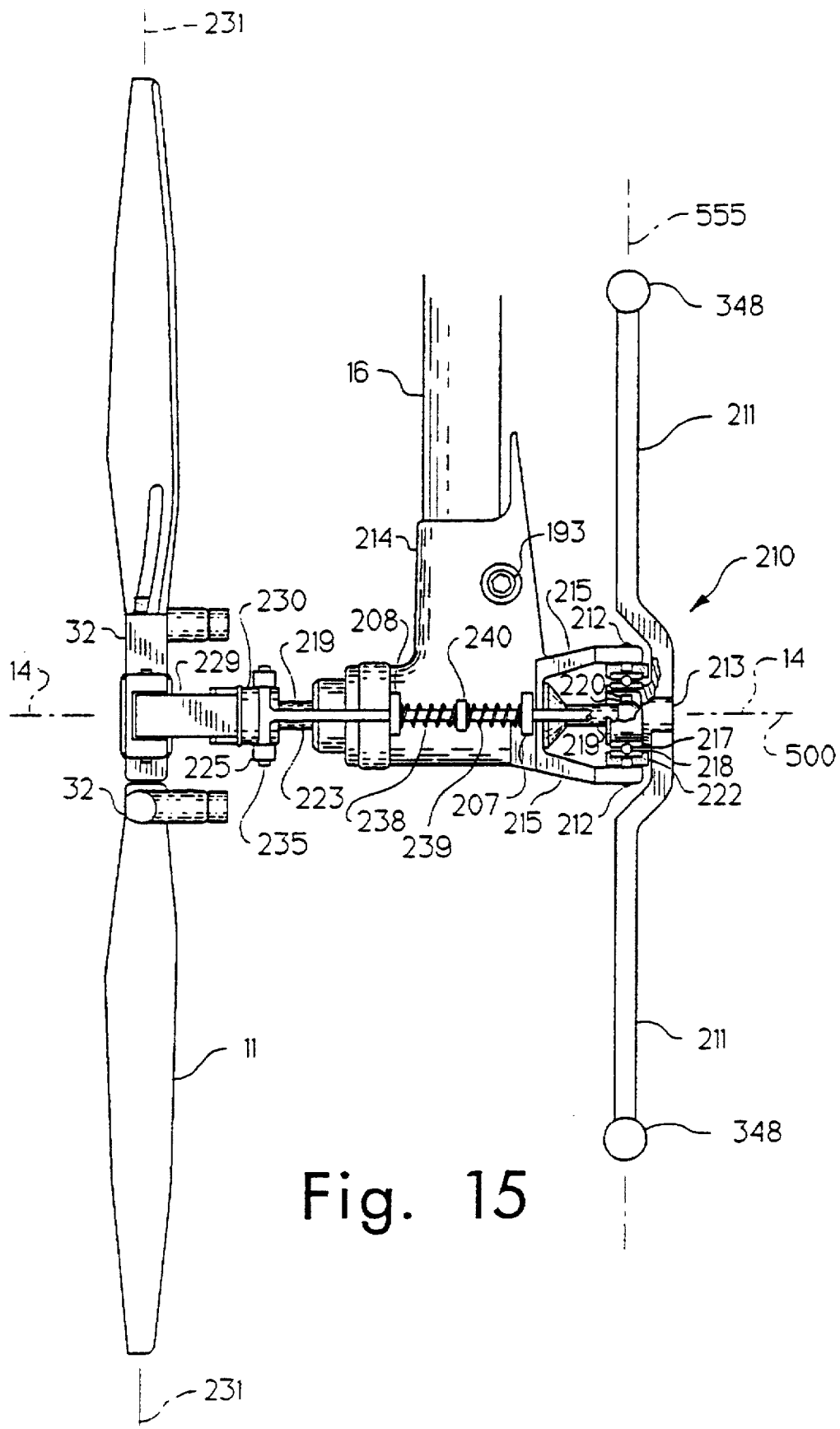
FIGS. 15 through 23 illustrate tenth through seventeenth embodiments of the improved yaw control and stability system of the current invention, each having a gyro rotor located beside the tail rotor gearbox opposite the primary tail rotor, where.

FIGS. 15 and 16 show a top plan view and rear end elevational view, respectively, of a tail rotor assembly of helicopter 10 incorporating a tenth embodiment of the present invention having a gyro rotor 210 located outboard of a gearbox 214 opposite tail rotor 2 and pivotable about a gyro pivot axis 555 defined by pivot pins 212. Advantageously, embodiments having the tail rotor on one side of the gearbox and the gyro rotor on the other side have simpler linkage installations because the linkages may be supported directly by the gearbox.

In the tenth embodiment, which illustrates the general configuration of gearbox 214 and primary tail rotor 2 of the tenth through seventeenth embodiments shown in FIGS. 15 through 23, gyro rotor 210 has weighted arms 211 extending radially from gyro hub 213, and is pivotably supported by gyro support arms 215 extending from gearbox 214. Gyro rotor 210 normally rotates about tail rotor axis of rotation 14 and is constrained to pivot about a substantially longitudinal pivot axis 555 defined by pivot pins 212 extending through gyro support arms 215 into gyro spindle 222. Gyro hub 213 is supported by ball bearing inner race 217, and has an interior receptive to universal joint means on the end of solid tail rotor shaft 219.

Figure 28:
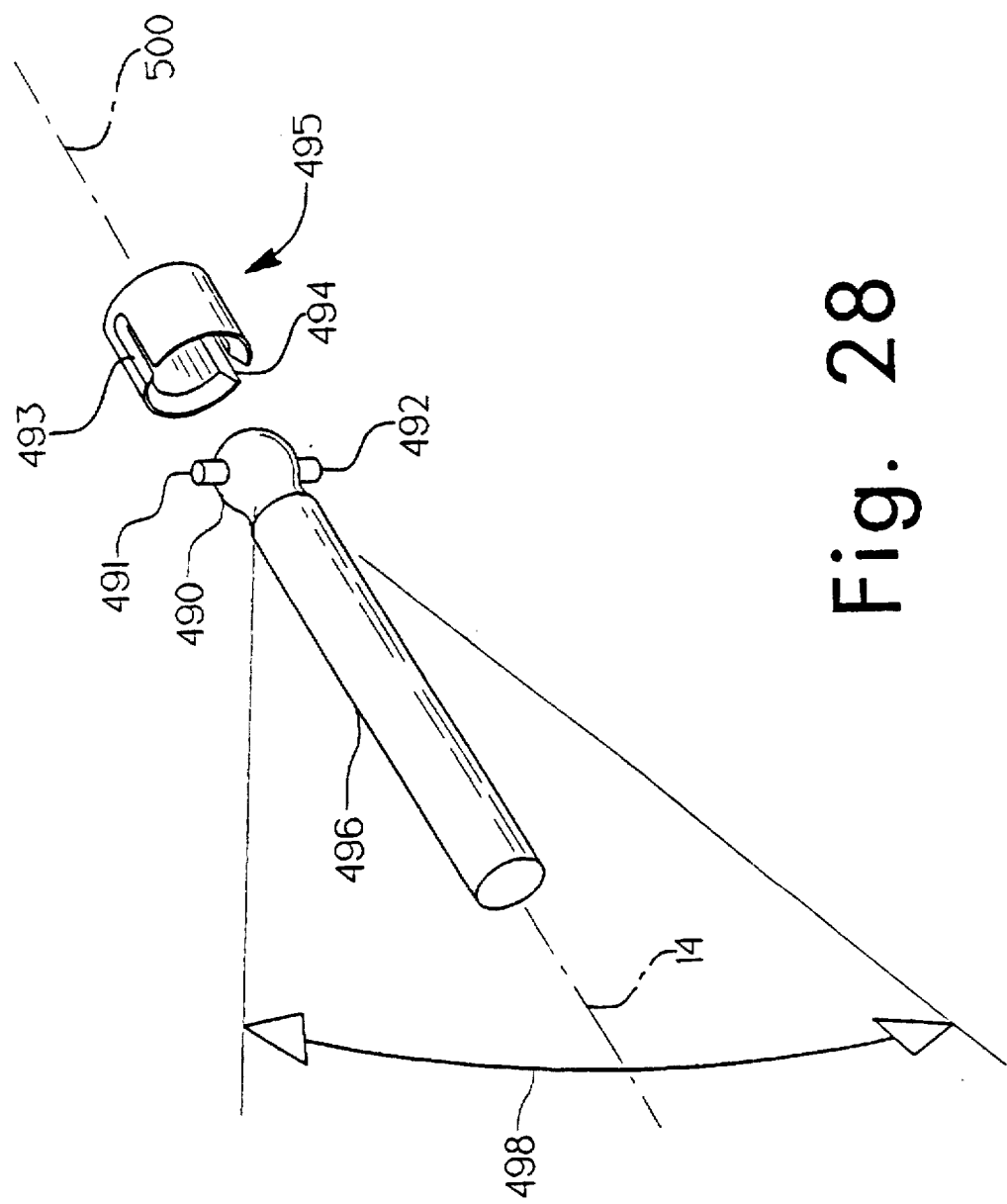

Illustratively, tail rotor shaft 219 has universal drive means comprising a spherical end with drive pins 220 extending radially therefrom and riding within axial slots in gyro hub 213 thereby transferring rotational motion of tail rotor shaft 219 to gyro rotor 210 while allowing gyro rotor 210 to pivot about longitudinal pivot axis 555 defined by pivot pins 212 ("pin and slot" type drive means are shown in more detail in FIG. 28). In the illustrated embodiment, gyro rotor 210 is shown supported for rotation on ball bearing inner race 217. In alternative embodiments, the gyro rotor may be supported on a ball bearing outer race 218 with appropriate modification to the gyro support arms, and with modified means to combine pilot control and stabilization inputs.

Spider 229 is supported for rotation about tail rotor axis 14 by slider 230, and is operably connected to the leading edge of reach-around grips 32 which are fixedly secured to tail rotor blades 11. Slider 230 is pivotably connected to three-point mixing arm 225 at output pivot point 236, and is free to move axially on tail rotor shaft 219.

In operation, pivot of gyro rotor 210 and gyro spindle 222, as caused by yaw motion of helicopter 10, displaces gyro pushrod 223 and gyro-input pivot point 235 of three-point mixing arm 225 independent of pilot control inputs. Pilot control inputs displacing bellcrank 21 also displace pilot pushrod 224 and pilot-input pivot point 237 of arm 225 independent of stabilizing inputs from gyro rotor 210. Output pivot point 236, and consequently slider 230 and spider 229, are displaced by the average of the displacement of gyro-input pivot point 235 and pilot-input pivot point 237 thereby combining pilot control and gyro stabilizing inputs to control the pitch of tail rotor blades 11 about blade pitching axis 231. Spring-restoring means 238, 239 act against pushrod guides 207, 208 and gyro pushrod collar 240 affixed to gyro pushrod 223 to restore gyro rotor 210 to a nominal vertical orientation after helicopter 10 has stopped rotating.

Figure 17:
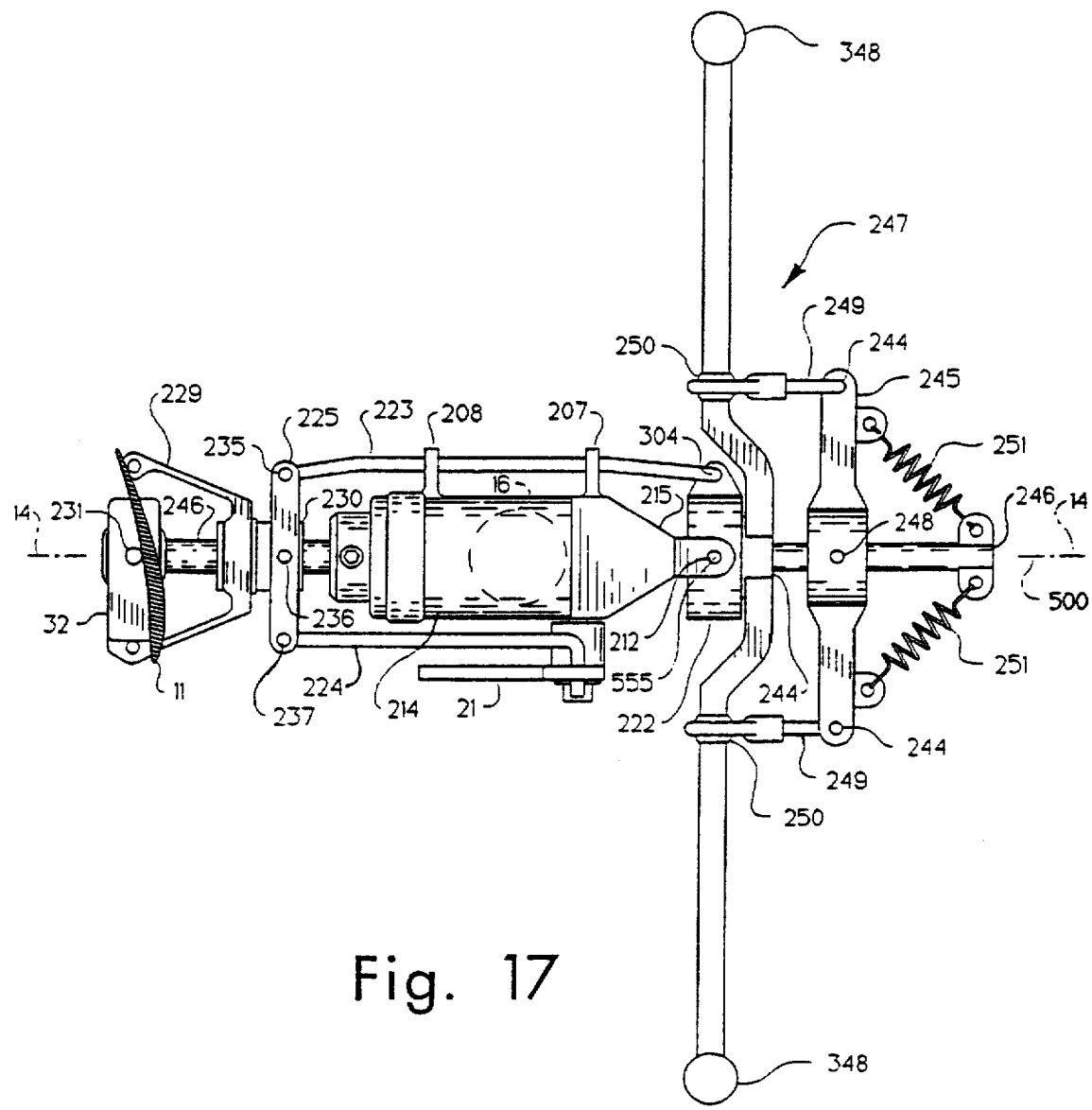

An eleventh embodiment shown in FIG. 17 has no universal joint inside gyro hub 244 which instead is generally hollow to allow pivoting motion of gyro rotor 247 without interfering with tail rotor shaft 246. Crossbar 245 is pivotably mounted to tail rotor shaft 246 at crossbar pivot 248 and drives gyro rotor 247 through drive bars 249 which are pivotably connected to crossbar 245 at drive bar pivots 244, and universally attached to gyro rotor 247 at ball joints 250. Ball joints 250 are necessary for proper operation when gyro rotor 247 is tilted about pivot pin 212 and rotated 90 degrees out of the plane of FIG. 17. Spring-restoring means 251 operates on crossbar 245 to restore gyro rotor 247 to a nominal vertical orientation. Advantageously, the follower links 245, 249 on this embodiment are more robust than universal joints, and allow the gyro rotor hub assembly 244 to be reduced in size.

Figure 18A:
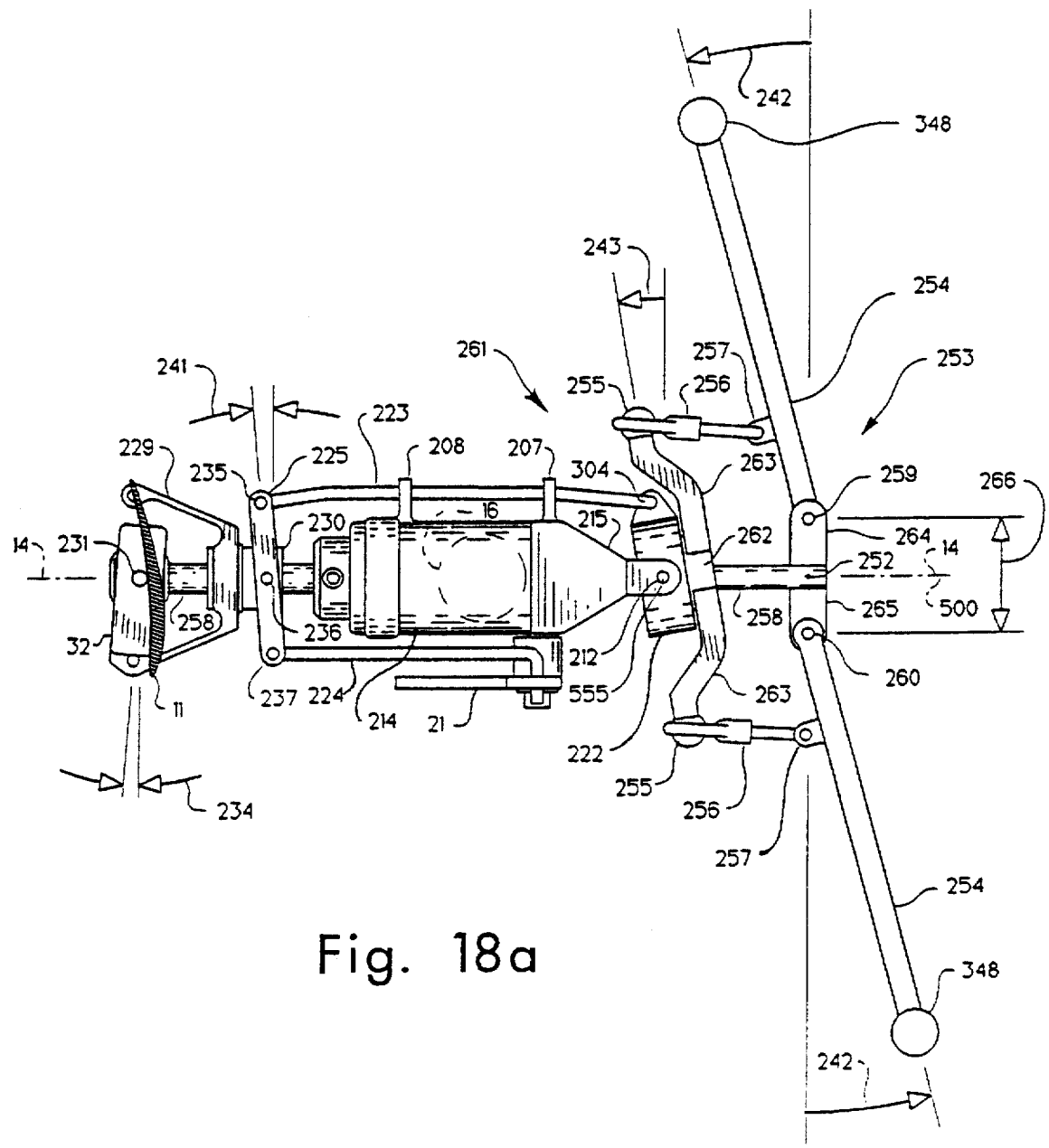
FIG. 18a is a rear-end elevation view of the embodiment shown in FIG. 18 with the gyro rotor reacting to a yaw motion of helicopter 10 showing representative operation of the flapping gyro arms, gyro spindle, and gyro control linkages.

FIGS. 18 and 18a illustrate a twelfth embodiment of the present invention having a remote spindle assembly 261 at a distance from a gyro rotor 253. In FIGS. 18 and 18a, spindle hub 262 is generally hollow to allow uninhibited pivoting motion of spindle assembly 261 without interfering with tail rotor shaft 258. Spindle assembly 261 comprises spindle arms 263 extending radially from spindle hub 262 which is rotatably mounted to gyro spindle 222. Gyro rotor 253 comprises gyro arms 254 extending radially from tail rotor shaft 258, and connected pivotably to arm extensions 264 and 265 which are fixedly secured to tail rotor shaft 258. Advantageously, because gyro rotor 253 is supported by tail rotor shaft 258 instead of gyro spindle 222, spindle assembly 261 is not subjected to the radial flight loads generated by gyro arms 254, and can be more lightly built.

Spindle arms 263 are operably connected to gyro arms 254 by spindle drive bars 256 each having a ball joint 255 and gyro arm link pivot 257. Tilt of gyro rotor 253 is transferred by spindle drive bars 256 to gyro spindle 261 which constrains gyro rotor 253 to tilt about an effective gyro pivot axis 252 located midway between arm flapping pivots 259 and 260 and parallel to pivot pins 212 and gyro spindle pivot axis 555. Spindle drive bars 256 also act as follower-link drive members by transferring rotational motion from gyro rotor 253 to gyro spindle 261 through a wide range of tilt angles. Arm flapping pivots 259, 260 define flapping axes for gyro arms 254 which are offset from and substantially perpendicular to gyro rotor axis 500, and which rotate along with gyro rotor 253.

In operation, gyro arms 254 are driven by tail rotor shaft 258 through arm flapping pivots 259, 260, and act like a solid gyro rotor with an effective gyro pivot axis 252. As shown in FIG. 18a, yaw motion of helicopter 10 in yaw direction 8 (shown in FIG. 1) causes gyro rotor 253 to tilt through a gyro rotor pivot angle 242. Tilt of gyro rotor 253 is transferred to gyro spindle 261 by drive bars 256 and through gyro pushrod 223 to three-point mixing arm 225 which pivots about pilot input pivot 237 by an angle 241. Displacement of output pivot 236 attached to slider 230 displaces spider 229 and adjusts the pitch of tail rotor blade 11 through a pitch angle 234, thereby modifying the thrust of blade 11 to opposite the yaw motion.

Unlike a solid gyro rotor, pivoting motion of gyro rotor 253 results in flapping motion of gyro arms 254 about arm flapping pivots 259, 260. Once tilted (or flapped), centrifugal forces will act to orient gyro arms 254 perpendicular to tail rotor shaft 258 effectively restoring gyro rotor 253 to a nominal orientation. The greater the pivot separation 266 between arm flapping pivots 259 and 260, the higher the restoring forces, and the faster gyro arms 254 will reorient after being moved away from their nominal orientation.

Figure 19:
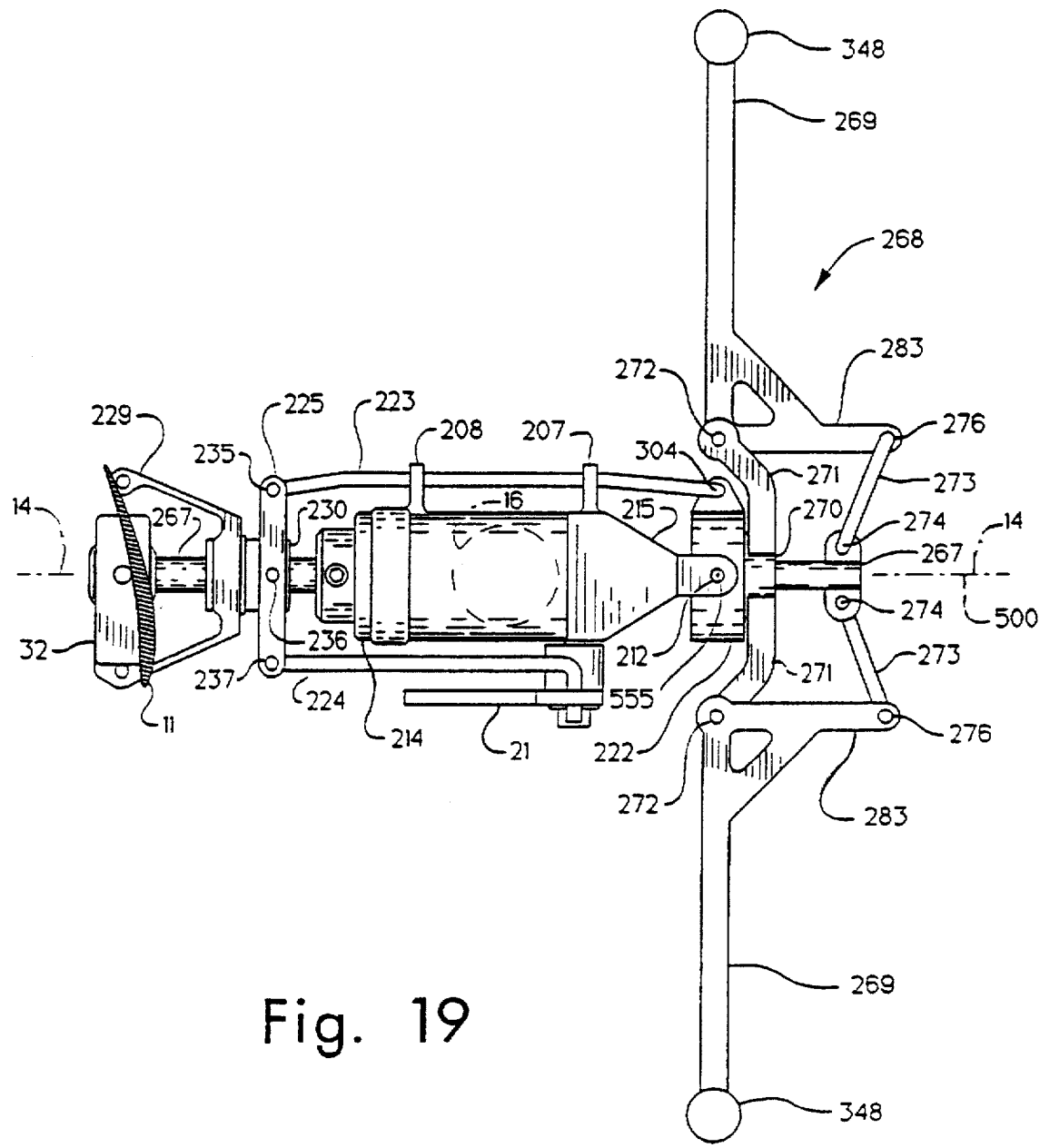

A thirteenth embodiment shown in FIG. 19 has a gyro hub 270 which is generally hollow to allow uninhibited pivoting motion of a gyro rotor 268 without interfering with tail rotor shaft 267. Gyro rotor 268 comprises gyro rotor arms 269 extending radially from, and operably mounted to gyro hub 270. In operation, gyro arms 269 are driven by tail rotor shaft 267 through follower-link elements including inner drive link pivots 274, drive links 273, arm-link pivots 276, and drive bar portions 283 (which are fixedly secured to gyro arm 269), and act like a solid gyro rotor which is constrained to pivot about a longitudinal axis 555, shown in FIG. 15, defined by pivot pins 212. Unlike a solid gyro rotor, pivoting motion of gyro rotor 268 results in flapping motion of gyro arms 269 about arm flapping pivots 272 because drive link pivots 274 do not coincide with pivot pins 212. Centrifugal forces induced by this flapping motion will tend to orient gyro arms 269 perpendicular to tail rotor shaft 267 effectively restoring gyro rotor 269 to a nominal, vertical orientation.

Figure 20:
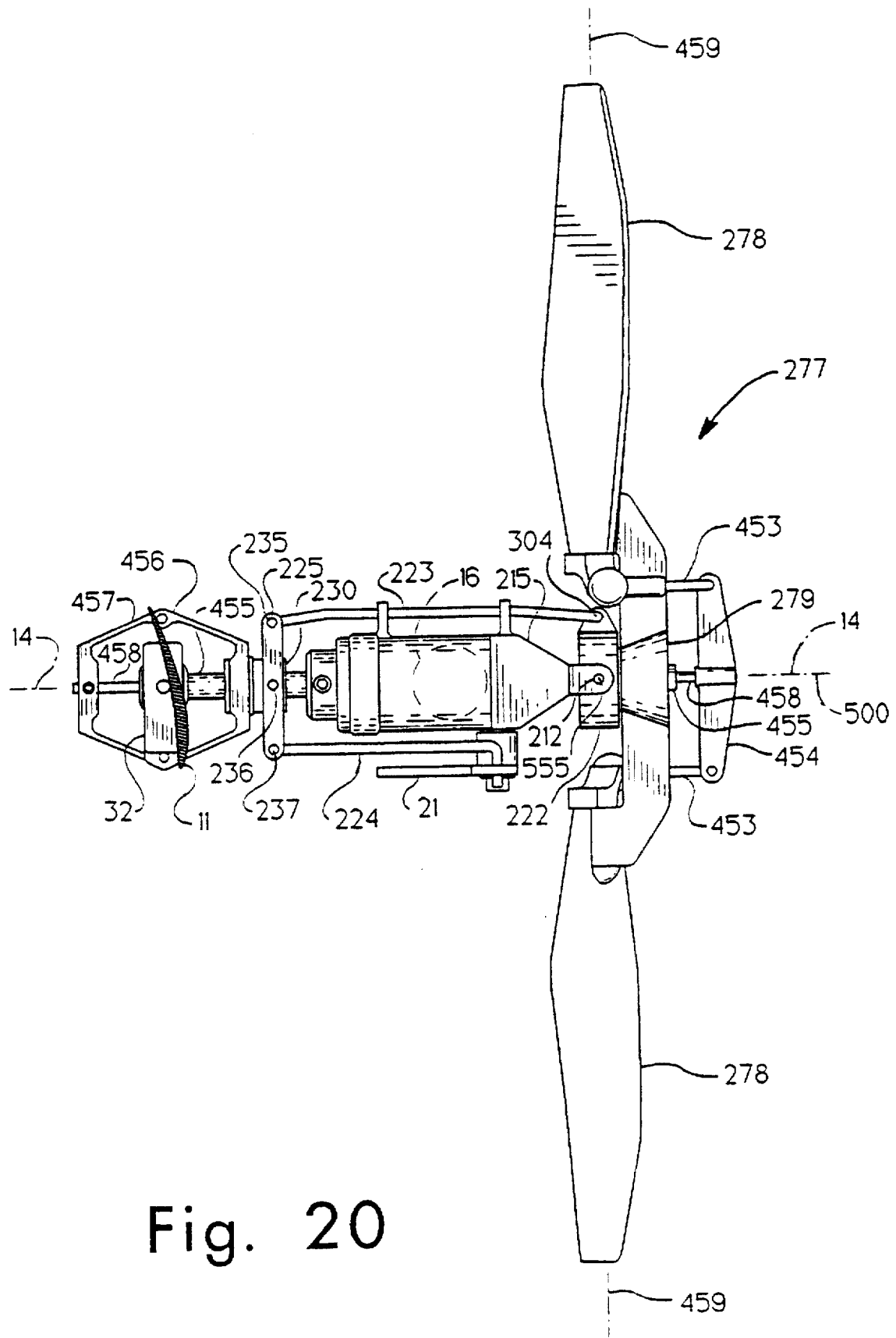

FIG. 20 shows a fourteenth embodiment having universal drive means inside gyro hub 279 to transmit rotary motion from shaft 455 to gyro rotor 277. Gyro rotor 277 comprises thrust producing gyro blades 278 extending radially from gyro hub 279, and operably mounted to gyro hub 279 to be rotatable about their respective pitching axes 459. Displacement of slider 230 and spider 456, causes tail rotor blades 11 to pitch collectively, and also displace spider 457 which is fixedly secured to transfer-pushrod 458 extending through hollow tail rotor shaft 455. Pitch links 453 operably connect gyro blades 278 through crossbar 454 which is appended to transfer pushrod 458 so that axial displacement of transfer pushrod 458 causes gyro blades 278 to pitch collectively. Tilt of gyro rotor 277 displacing gyro pushrod 223, and pilot control inputs displacing pilot pushrod 224 can both displace slider 230 along shaft 455 and thereby modify the collective pitch of tail rotor blades 11 and gyro rotor blades 278 simultaneously. Tilt of gyro rotor 277 will also induce gyro blades 278 to pitch cyclically thereby generating aerodynamic forces to restore gyro rotor 277 to a nominal orientation. In alternative embodiments the gyro blades may be replaced with other gyro rotor means such as aerodynamic paddles.

Figure 21:
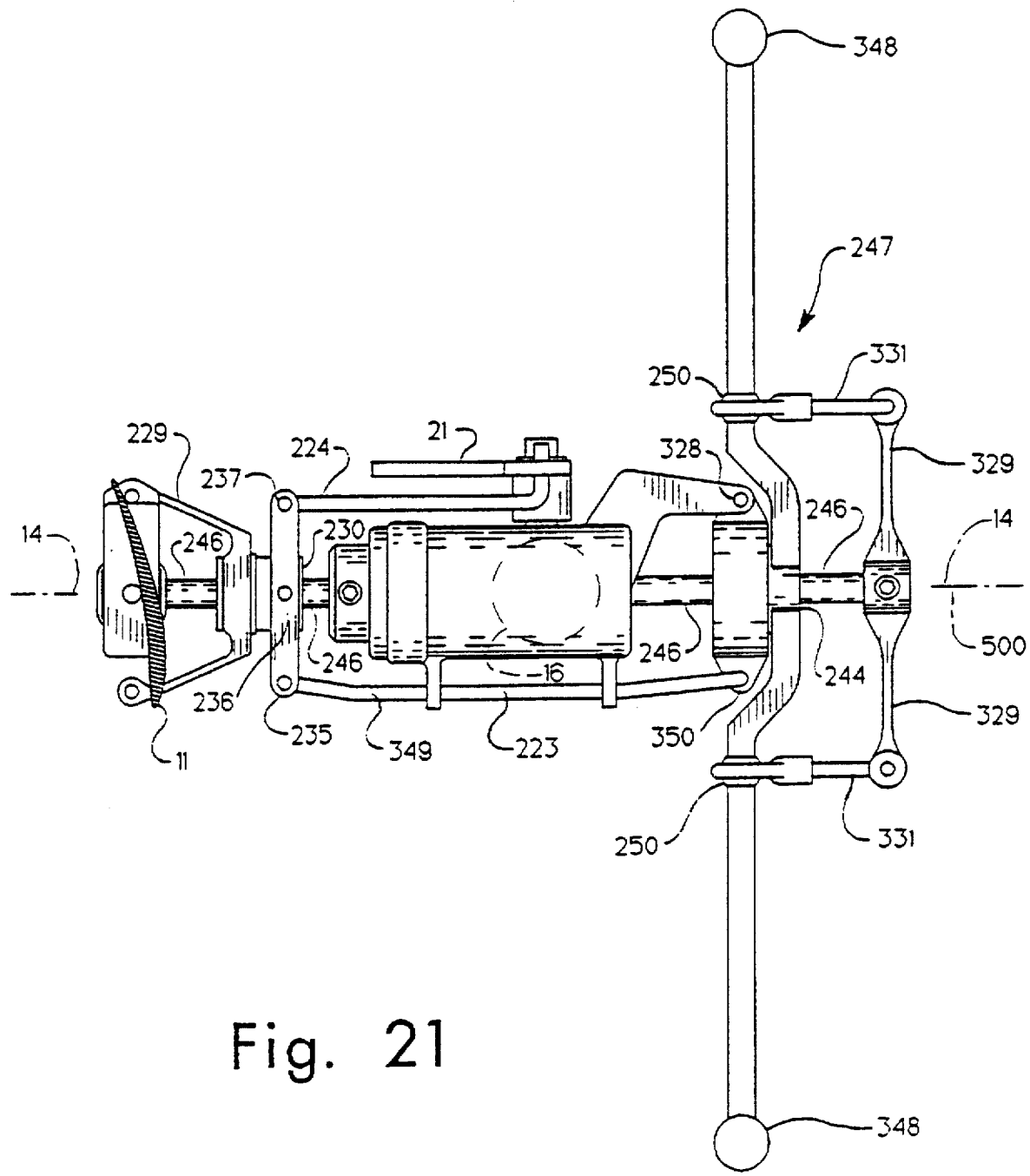

A fifteenth embodiment shown in FIG. 21 has no universal joint inside gyro hub 244. Instead, gyro hub 244 is generally hollow to allow pivoting motion of gyro rotor 247 about offset gyro pivot 328 without interfering with tail rotor shaft 246. Semi-flexible crossbar 329 drives gyro rotor 247 through drive bars 331 which are pivotably connected to semi-flexible crossbar 329 and universally attached to gyro rotor 247 at ball joints 250. Spring force caused by deflection of semi-flexible crossbar 329 tends to orient gyro rotor 247 to a vertical nominal orientation. In this way, crossbar 329 and drive bars 331 act as both drive means and restoring means for gyro rotor 247. Ball joints 250 are necessary for proper operation when gyro rotor 247 is tilted about offset gyro pivot 328 and rotated 90 degrees out of the plane of FIG. 21. Note that in this embodiment spider 229 is connected to the trailing edge of tail rotor blade 11 so that tail rotor blade 11 produces stabilizing thrust forces in opposition to yaw motion of helicopter 10.

Figure 22:
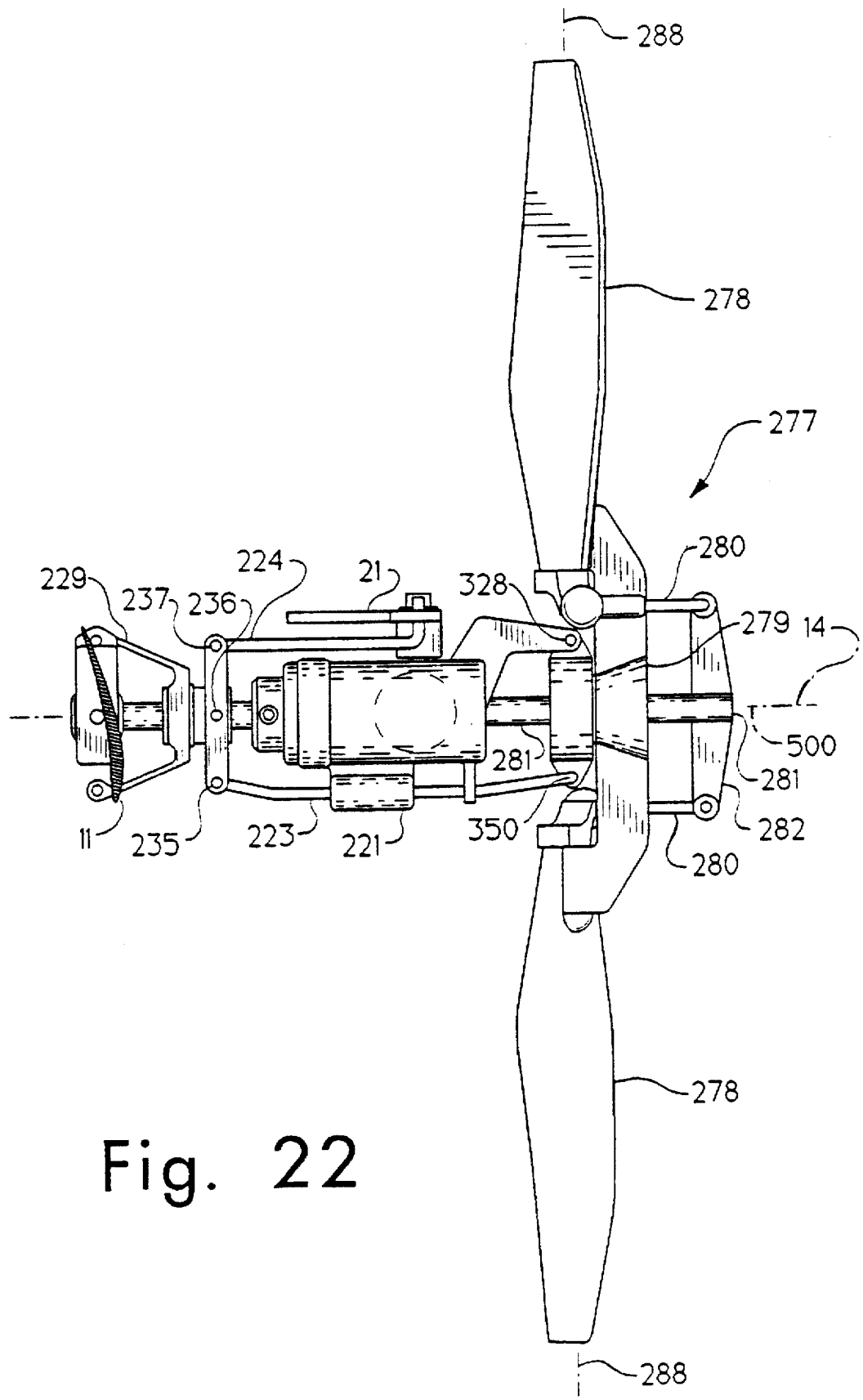

FIG. 22 illustrates a sixteenth embodiment having a gyro rotor 277 mounted to pivot about offset gyro pivot 328, and having a gyro hub 279 which is generally hollow to allow pivoting motion of gyro rotor 277 about offset gyro pivot 328 without interfering with tail rotor shaft 281. Gyro rotor 277 comprises thrust producing gyro blades 278 extending radially from gyro hub 279, and operably mounted to gyro hub 279 to be rotatable about their respective pitching axes 288. Pitch links 280 operably connect tail rotor shaft 281 to gyro blades 278 through crossbar 282 affixed to shaft 281 so that tilt of gyro rotor 277 induces gyro blades 278 to pitch cyclically, thereby generating aerodynamic forces to restore gyro rotor 277 to a nominal orientation. Advantageously, gyro pushrod 223 passes through motion damper 221 which minimizes unwanted high frequency motion of gyro rotor 278.

In operation, gyro rotor 277 will not automatically orient vertically because the thrust it produces is coincident with tail rotor axis of rotation 14 while it pivots about offset gyro pivot 328. A small tilt is required to cyclically pitch gyro rotor blades 278 to balance the thrust force with a restoring force.

Figure 23:
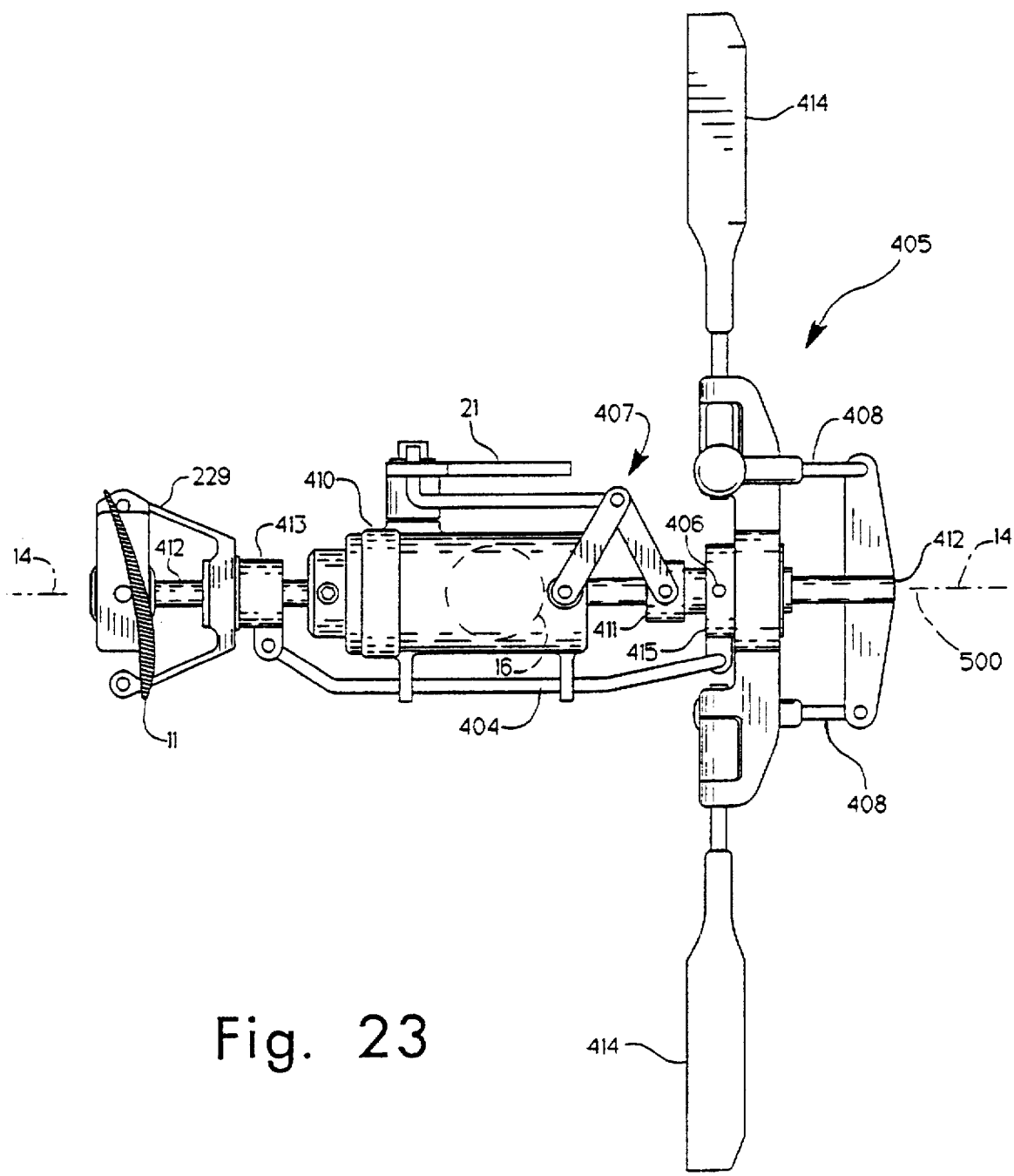

A seventeenth embodiment shown in FIG. 23 shows the present invention having a gyro rotor 405 operably mounted to a gyro slider 411 and pivotable about a gyro pivot 406. Gyro slider 411 is slidable on tail rotor shaft 412 and constrained against rotation by scissor links 407. Tilt of gyro hub 415 by gyro rotor 405 displaces gyro pushrod 404 which actuates pitch slider 413 and spider 229 to vary the pitch of tail rotor blades 11. Drive bars 408 drive gyro rotor 405 which has aerodynamic restoring means in the form of gyro paddles 414 that pitch cyclically in response to tilt of gyro rotor 405.

Reference will now be made to FIGS. 24 through 27 which illustrate embodiments of the present invention in which the gyro-stabilizing part and thrust-producing part have been combined into a single thrust-producing gyro rotor.

Figure 24:
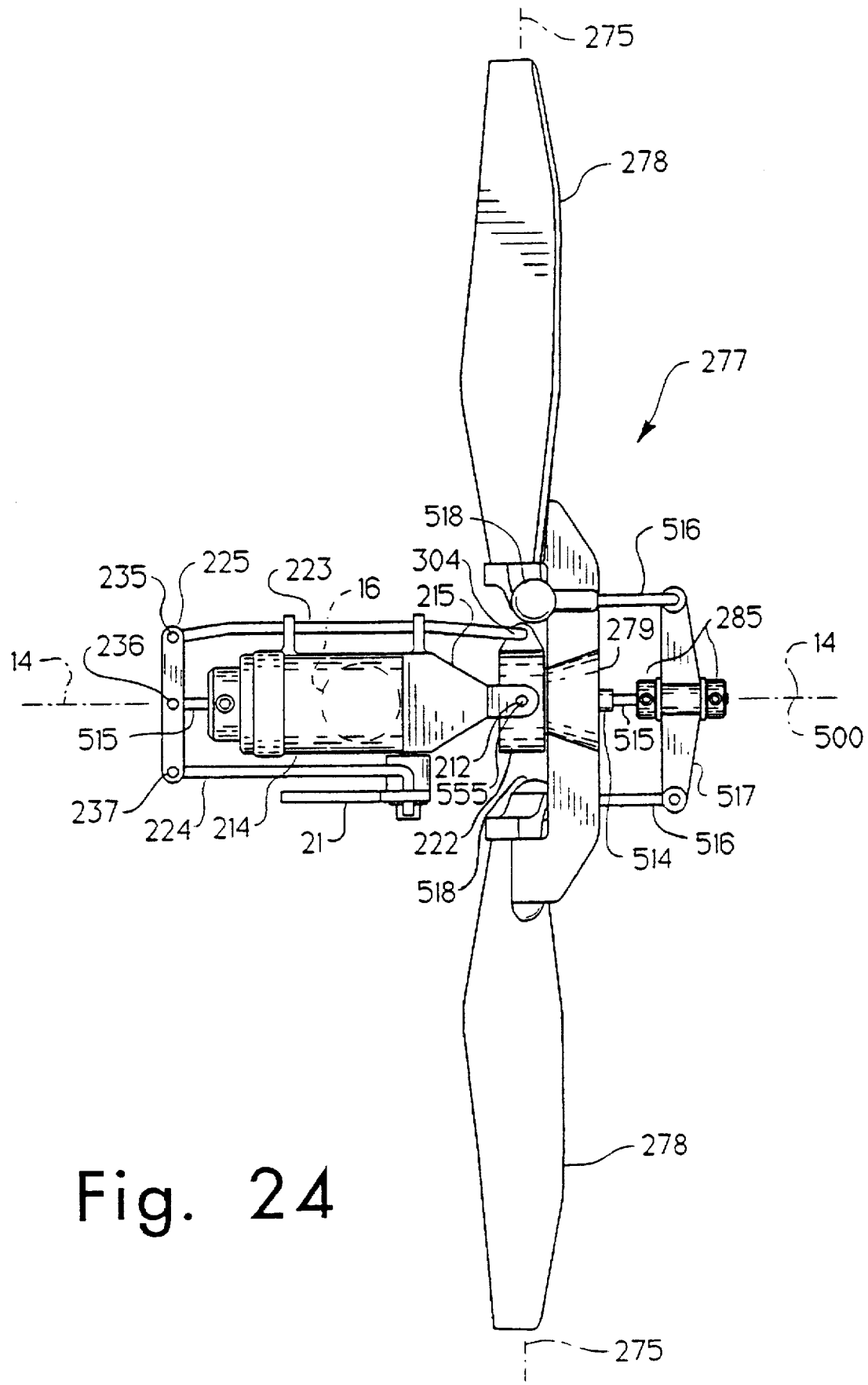
FIGS. 24 through 28 illustrate five single-rotor embodiments of the improved yaw control and stability system of the present invention, each having a gyro rotor and tail rotor combined into a single mechanism, where.

FIG. 24 shows a first combined single-rotor embodiment of the present invention with gearbox 214 configured as shown in FIG. 15, and having universal drive means inside gyro hub 279 to transmit rotary motion from hollow shaft 514 to gyro rotor 277. Gyro rotor 277 comprises thrust-producing gyro blades 278 extending radially from gyro hub 279, and operably mounted to gyro hub 279 to be rotatable about their respective pitching axes 275. Pitch links 516 operably connect push-pull rod 515 to gyro blades 278 through crossbar 517. Cross bar 517 is operably appended to the end of push-pull rod 515 to translate with push-pull rod 515, and to rotate with gyro rotor 277. Tilt of gyro rotor 277 about a coplanar pivot axis 555 shown in FIG. 15 and defined by pivot pins 212, as may be induced by yaw motion of a helicopter, displaces gyro pushrod 223, three-point mixing arm 225 and push-pull rod 515 (through the center of hollow shaft 514) causing gyro rotor blades 278 to pitch collectively to produce a thrust force which opposes the yaw motion. Because ball joints 518 connected to the leading edge of rotor blades 278 are spatially offset from pivot axis 555, tilt of gyro rotor 277 also induces gyro blades 278 to pitch cyclically thereby generating aerodynamic forces to restore gyro rotor 277 to a nominal orientation. Note that the single-rotor embodiment of FIG. 24 is closely related to the dual-rotor embodiment shown in FIG. 20, with tail rotor blades 11 and other interconnected linkages removed.

Figure 25:
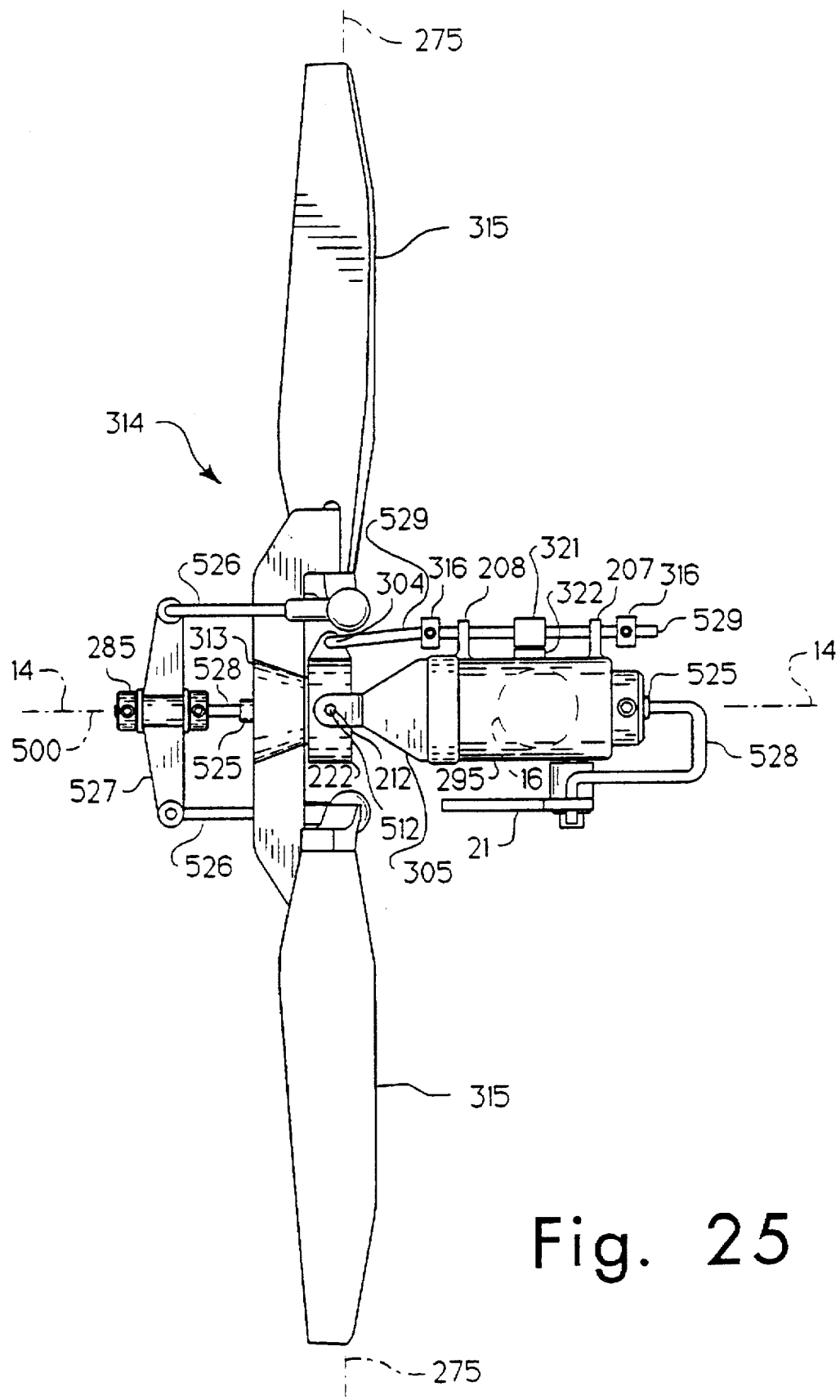

FIG. 25 shows a second the current embodiment of the current invention having universal drive means inside a gyro hub 313 to transmit rotary motion from a hollow shaft 525 to a gyro rotor 314. Gyro rotor 314 comprises thrust producing gyro blades 315 extending radially from gyro hub 313, and operably mounted to gyro hub 313 to be rotatable about their respective pitching axes 275. Pitch links 526 operably connect push-pull rod 528 to gyro rotor blades 315 through cross bar 527. Cross bar 527 is operably appended to the end of push-pull rod 528 to translate with push-pull rod 528, and rotate with gyro rotor 314. Tilt of gyro rotor 314 displaces gyro pushrod 529 and magnet means 321, and is limited by adjustable pushrod collars 316 appended to pushrod 529. Tilt of gyro rotor 314 also induces gyro blades 315 to pitch cyclically thereby generating aerodynamic forces to restore gyro rotor 314 to a nominal orientation. Note that this single-rotor embodiment is related to the dual-rotor embodiments shown in FIGS. 10 and 11, with tail rotor blades 11 and other interconnected linkages removed.

During normal operation of a radio controlled model helicopter, pilot control commands operate a tail rotor control servo-actuator located within the body of helicopter 10 (shown in FIG. 1) which displaces pushrod 20 (shown in FIG. 1), bellcrank 21 (shown in FIG. 25), pushpull rod 528, cross bar 527, and pitch links 526 thereby controlling the collective pitch of gyro blades 315. In the embodiment of the present invention shown in FIG. 25, magnet means 321 is illustratively secured to gyro pushrod 529 in proximity to Hall-effect switch 322 appended to gearbox 295 so that any displacement of magnet means 321 is sensed by Hall-effect switch 322. The electronic output of Hall-effect switch 322 is then amplified and mixed electronically with pilot control commands, and sent to the tail rotor control servo (not shown) which in turn controls the pitch of gyro blades 315. In alternative embodiments of the present invention, tilt of the gyro rotor can be sensed electrically or electronically in many ways including rotary potentiometer means at the gyro pivot, or linear potentiometer means or electronic counter means on the gyro pushrod.

Figure 26:
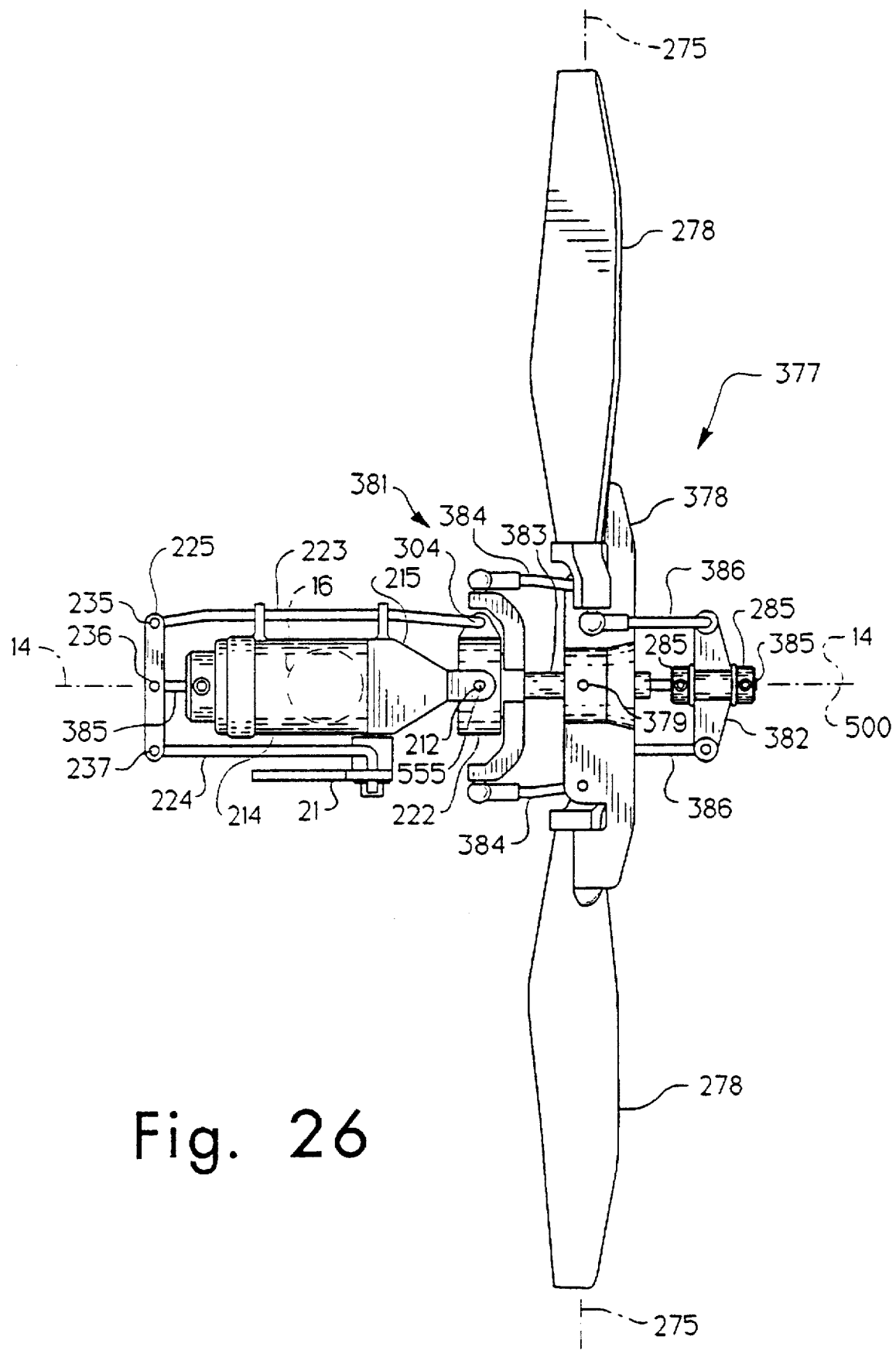

FIG. 26 shows a third single-rotor embodiment of the present invention with gearbox 214 configured as shown in FIG. 15, and having a gyro hub 378 operably mounted to a tail rotor shaft 383 and driven by gyro pivot pins 379 which rotate with shaft 383. Spindle assembly 381 is operably mounted to gyro support arms 215 on gearbox 214 to pivot about a pivot axis 555 defined by pivot pins 212. Gyro rotor 377 comprises thrust producing gyro blades 278 extending radially from gyro hub 378, and operably mounted to gyro hub 378 to be rotatable about their respective pitching axes 275. Gyro rotor 377 is constrained to pivot about longitudinal pivot axis 555 by spindle drive bars 384 universally connected to spindle assembly 381 and pivotably connected to gyro rotor 377. Pitch links 386 operably connect push-pull rod 385 to gyro blades 278 through crossbar 382. Cross bar 382 is operably appended to the end of push-pull rod 385 to translate with push-pull rod 385, and to rotate with gyro rotor 377. Tilt of gyro rotor 377, as may be induced by yaw motion of helicopter 10, displaces gyro pushrod 223, three-point mixing arm 225, and push-pull rod 385 (through the center of hollow shaft 383). Displacement of push-pull rod 385 moves pitch links 386, causing gyro rotor blades 278 to pitch collectively to produce a thrust force which opposes the yaw motion of helicopter 10. Tilt of gyro rotor 377 also induces gyro blades 278 to pitch cyclically thereby generating aerodynamic forces to restore gyro rotor 377 to a nominal orientation. Advantageously, this single-rotor embodiment supports gyro rotor 377 on shaft 383 instead of on spindle assembly 381, so that spindle assembly 381 may be lighter and more compact.

Figure 27:
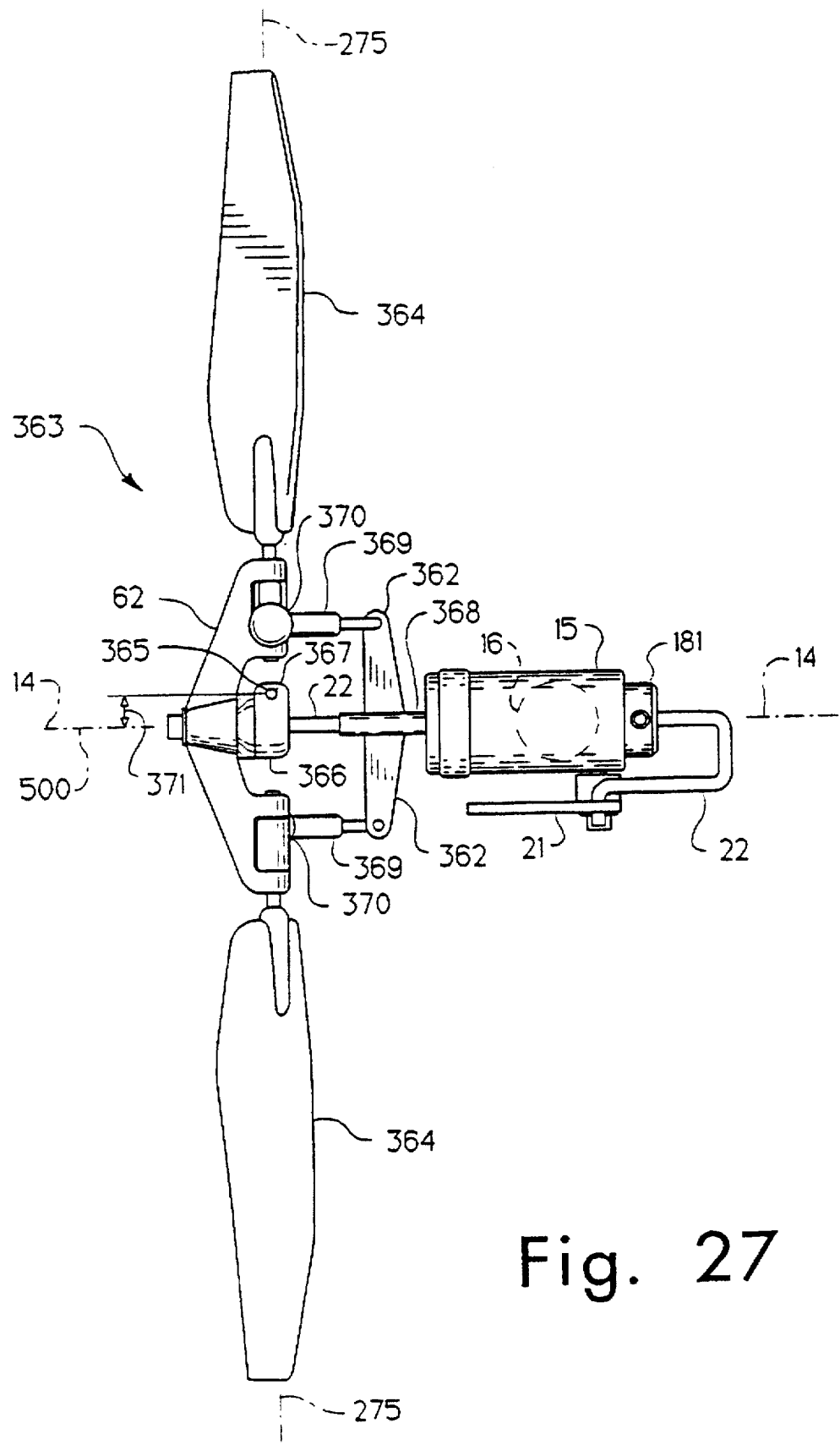

FIG. 27 illustrates a fourth single-rotor embodiment of the present invention having pitch control linkages that also act as follower linkages. In this embodiment, a gyro hub 62 is rotatably mounted to a gyro spindle 366 which is pivotably mounted to push-pull rod 22 and constrained to tilt about offset coplanar pivot axis 365 defined by gyro pivot pin 367 which is spatially offset from tail rotor axis 14 by a distance 371. Shaft arms 362 are rigidly mounted to tail rotor shaft 368, and drive gyro rotor 363 through drive bars 369 which are universally connected to the leading edges of gyro rotor blades 364 at ball joints 370. Pilot control commands displacing pushpull rod 22 displace gyro rotor 363 axially along tail rotor axis of rotation 14 causing gyro rotor blades 364 to pitch collectively thereby altering the thrust of gyro rotor 363. Tilt of gyro rotor 363 about offset pivot axis 365, as may be induced by yaw motion of helicopter 10, displaces the center of gyro rotor 363 axially which causes gyro rotor blades 364 to pitch collectively to oppose the yaw motion of helicopter 10. Tilt of gyro rotor 363 also causes gyro rotor blades 364 to pitch cyclically and generate aerodynamic forces to restore gyro rotor 363 to a nominal orientation. Note that separate follower linkages may be added between shaft 368 and gyro hub 62 to drive gyro rotor 363 and reduce the operational forces felt by drive bars 369 and shaft arms 362.

Note that in operation gyro rotor 363 will not automatically orient vertically because the thrust it produces is coincident with tail rotor axis of rotation 14 while it pivots about offset pivot axis 365. A small tilt is required to cyclically pitch gyro rotor blades 364 to balance the thrust force with a restoring force. Alternatively, spring means may be added between push-pull rod 22 and gyro spindle 366 to balance the thrust force.

It should be noted that the device shown in FIG. 27 is the only single-rotor embodiment of the current invention described herein that requires the pitch-control means to remain stationary while the gyro rotor moves (as required by Burkam's device). Even so, this device uses a coplanar pivot axis that minimizes the transverse displacement of the gyro rotor and some of the operational disadvantages of Burkam's device. It should also be noted, however, that the thrust load of the gyro rotor must be supported by the pilot control linkages. This would not be advantageous in some applications such as in man-carrying helicopters where the pilot control linkages are powered by the pilot's legs.

UNIVERSAL DRIVE MEANS

If the gyro rotor of the present invention is driven by universal drive means located within the hub of the gyro rotor, then many different types of universal drive mechanisms are available. A common universal joint having three functional parts (an input drive-yolk, a four-point universal block, and an output yolk) has been shown by Burkam to drive a single rotor system. This universal system, however, is very bulky and difficult to miniaturize in practice.

Two compact universal drive mechanisms, each having only two functional parts, are provided herein to drive gyro rotors, and are particularly well suited for application to model helicopters. The first type, shown in FIG. 28, is referred to herein as the "pin-and-slot" type, and may be advantageously employed on gyro systems having a solid tail rotor shaft. The second type, shown in FIG. 29, is referred to herein as the "hexagonal" type, and may be used with a solid shaft, but is most useful with hollow shafts having a pushrod extending through the center of the shaft.

Referring now to FIG. 28, which is an exploded view of the functional elements of the first type of universal drive coupling, a pin-and-slot universal drive has drive ball portion 490 with drive pins 491, 492 extending radially therefrom and engageable within axial slots 493 and 494 formed in drive yolk 495. In practice, drive yolk 495 is appended to a gyro rotor hub such as gyro hub 213 shown in FIGS. 15 and 16. Drive pins 491, 492 are preferably the exposed ends of a single pin made from a material such as hardened steel, and press-fit through a transverse aperture formed in drive ball portion 490 of tail rotor shaft 496 that is perpendicular to tail rotor axis of rotation 14. Drive yolk 495 is preferably hardened steel, and can be insert molded or pressed into a plastic gyro hub for use on model helicopters. In operation, drive ball 490 centers drive shaft 496 within drive yolk 495 through a range of engagement angles (typically ±20 degrees as illustrated by arrow 498) between drive shaft 496 and yolk 495. Drive pins 491, 492 engage axial slots 493, 494 in yolk 495 thereby transferring rotational motion from shaft 496 to drive yolk 495, and driving a gyro rotor such as gyro rotor 210 in FIGS. 15 and 16. Advantageously, this pin-and-slot arrangement is much more compact and low weight then a common three-part universal joint, and is particularly well suited for use on model helicopters.

Figure 29:
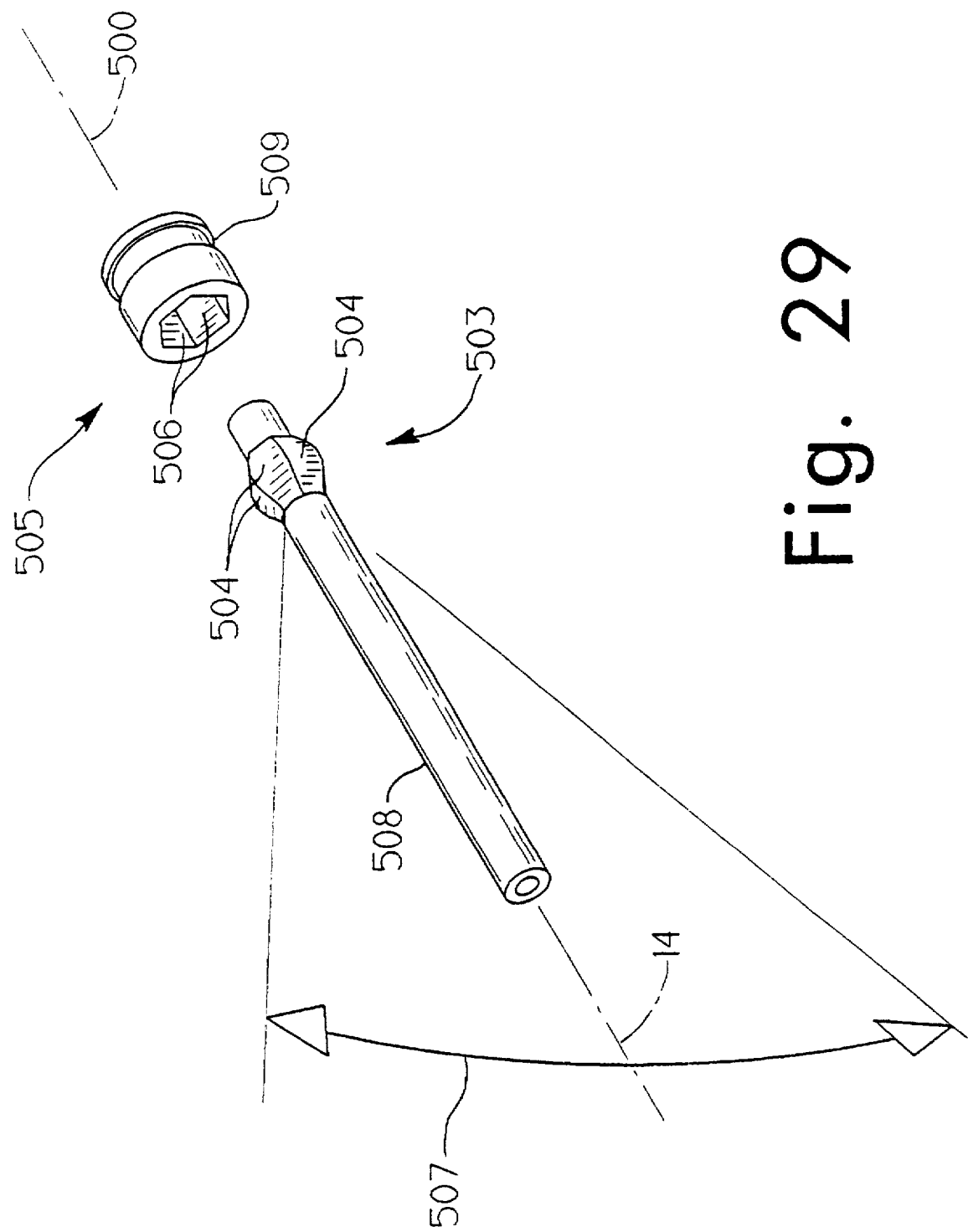
FIG. 29 is an exploded isometric view of a representative hexagonal-type universal drive means for use with the current invention, with all other elements of the invention and the helicopter removed for clarity.

A hexagonal-type universal drive shown in FIG. 29 has hexagonal drive portion 503 with a multitude of curved drive faces 504 engageable within the multifaceted interior of universal hex housing 505. Each drive face 504 of drive portion 503 has a corresponding interior face 506 inside universal housing 505 such that drive portion 503 can transmit rotational motion of shaft 508 to universal housing 505 through a wide range of engagement angles (typically +20 degrees as illustrated by arrow 507). Advantageously, hexagonal-type universal drives may be made hollow to accommodate a pushrod extending through a hollow shaft (such as transfer pushrod 458 inside hollow shaft 455 in FIG. 20) to control the pitch of the tail rotor or gyro rotor blades. On model helicopters, hexagonal drive portion 503 and universal drive housing 505 may be made of a light weight material such as aluminum, and hard-coat anodized to provide a wear-resistant surface. Drive housing 505 may have surface geometry, such as annular slot 509, to be insert molded or pressed into a plastic gyro hub such as gyro hub 279 in FIG. 20. It will be understood that hexagonal-type universal drives may have more or fewer than six driving faces.

GENERAL

While the gyroscopic mechanisms and linkages of the present invention have been shown in standardized positions for the purpose of illustrating preferred embodiments, it will be understood that they may be located above, below, in front of or behind the gearbox or tail boom depending upon the specific requirements of the application. Said mechanism and linkages may also be oriented at an angle relative to the tail rotor shaft as when the gyro rotor is mounted to rotate about an axis parallel to the tail boom and perpendicular to the tail rotor shaft. It will be further understood that the gyro rotor pivot axis of each embodiment need not be horizontal, but may be set to any angle such as to couple roll and yaw motions.

In addition, the various components of the invention may be located elsewhere on the helicopter. For example, alternative embodiments are contemplated wherein the gyroscopic mechanism is located in the forward section of the aircraft (such as at forward gyro location 449 of helicopter 1 shown in FIG. 1) instead of near tail rotor 2. The gyroscopic mechanism in such location 449 is preferably a solid wheel or hoop (not shown) with mechanical restoring means (not shown) such as spring means or centrifugal means. Various means are provided herein to support, restore, and drive the mechanism from the engine, main rotor shaft, tail rotor drive wire, etc.

Power take-off for a remote gyro rotor from the reduction gears driving the tail rotor is advantageous as structure is available at location 449 for sturdy mounting. In this configuration, gyroscopic stabilization and pilot control inputs are best combined near forward gyro location 449, and transmitted mechanically (as by pushrod linkages and mixing arms) or electronically (as through the tail rotor servo) to the thrust-producing means located at the end of the tail boom. A simple electronic element for sensing gyro rotor tilt would have a rotary potentiometer operably connected to the pivot axis of the gyro rotor and electronically mixed with pilot control inputs to the tail rotor control servo.

Further embodiments are contemplated for aircraft such as helicopters with blown tail booms (such as the NOTAR system by McDonnell Douglas Helicopter Company) where the thrust-producing means is located at the front of the tail boom instead of at the rear. NOTAR systems lack the natural yaw-damping capabilities of traditional tail rotors, and can benefit greatly from the stabilizing features of the present invention. The gyroscopic mechanism may be located in front of, behind, to the sides of, or remotely from the thrust producing means. Control and stabilization commands may be used to modify or direct the thrust as it exits the tail boom in addition to controlling the magnitude of the thrust force.

Other embodiments are contemplated wherein the gyro rotor is driven at a different speed than the thrust producing means as through the use of drive gears with different speed ratios. Gyroscopic mechanisms generally become more sensitive and powerful when operated at higher rotational speeds. Therefore, if operated at a different, generally higher speed than the thrust-producing means, the gyro rotor may be smaller, lower in weight, and less obtrusive. This would be especially advantageous at forward gyro location 449 shown in FIG. 1.

Because of the unique features of the current invention, such as the preferred gyro rotor mounting configurations and control-mixing means, the gyro rotor pivot axis may lie near or within the gyro rotor plane of rotation. As used herein, a "coplanar pivot axis" is generally any axis which lies in, or passes close to, the plane of rotation of the gyroscopic mechanism. The plane of rotation of the gyroscopic mechanism is usually taken as a plane (such as a plane 275 shown edge-on in FIG. 24) which is perpendicular to the gyro rotation axis, (such as gyro rotor axis 500), and which contains the center-of-mass of the rotating portions of the gyroscopic mechanism (such as gyro rotor 277). Pivoting motion of the gyroscopic mechanism about such a coplanar axis minimizes the transverse component of motion of the center-of-mass relative to the gyro rotation axis. This means that there is little, if any, vertical swinging motion of a single-rotor system in accordance with the present invention adapted for use on a helicopter.

While the foregoing have been described as embodiments of a stabilization and control system having a pilot control input, it will be understood that if the pilot control system is fixed, as by securing the pilot control pushrods against displacement, or omitting the pilot control linkages entirely, then the invention becomes a stabilization system. This can be particularly advantageous in applications which do not require active pilot control, but would benefit from increased stabilization, such as free-flight model helicopters.

While the foregoing preferred embodiments of the present invention have been described generally as being actuated by gyroscopic precession (tilt) of a gyro rotor, it will be understood that the simple inertial qualities of a gyro rotor may also be used to orient a gyro spindle in some applications. The inertia of a spinning gyro rotor tends to hold the gyro rotor in a plane in space while the aircraft rotates. With an inertial gyro, the gyro pivot axis can be oriented more parallel to the aircraft rotation axis, and the operation of the stabilizer will then be governed more by angular displacement of the aircraft than by the speed of rotation of the aircraft.

As used herein, "gyro control means" generally refers to control linkages (which can include, for instance, mechanical, hydraulic or electric/electronic devices) that are operated in response to pivoting motion of a gyro rotor. Gyro control means frequently includes a member, such as gyro pushrod 303 shown in FIG. 9, which is displaced axially along tail rotor axis of rotation 14, and can transmit gyro control inputs away from the gyro rotor to some other point on the aircraft. Gyro control linkages and electrical means may be located entirely in proximity to the gyroscopic mechanism, or extend to a remote location on the aircraft where they are combined with pilot control commands.

As used herein, "pilot control means" generally refers to control linkages (which can include for instance, mechanical, hydraulic or electric/electronic devices) that are responsive to pilot control commands. Such control commands may originate, for instance, from a pilot located within the cockpit of a full-size helicopter, or from a pilot located on the ground with a radio transmitter.

As used herein, "thrust control means" generally refers to control linkages (which can include for instance, mechanical, hydraulic or electric/electronic devices) that can vary the magnitude and/or direction of a force that can be used to direct or orient an aircraft in flight. Such thrust control means may, for instance, alter the pitch of tail rotor blades 11 on helicopter 10 to vary the thrust produced by tail rotor 2 (shown in FIG. 1). To "vary the thrust" of such thrust control means may also involve changing the direction of the thrust force (as when redirecting a controllable exhaust port on the end of a blown tail tube anti-torque system such as NOTAR system).

Although the invention has been described and defined in detail with reference to certain preferred embodiments, variations and modifications exist within the scope and spirit of the invention as described and defined in the following claims.

I claim:

1. A device for stabilizing yaw motion of a rotary wing aircraft including an aircraft body and a main rotor rotating relative to the aircraft body about an aircraft axis of rotation, the device comprising thrust-producing means for generating a thrust force along a thrust axis that is substantially perpendicular to the aircraft axis of rotation, thrust-varying means for permitting a pilot to remotely control the thrust-producing means to vary the magnitude of the thrust force produced by the thrust-producing means, gyro rotor means for automatically controlling the thrust-producing means to vary the magnitude of the thrust force produced by the thrust-producing means to oppose rotational motion of the rotary wing aircraft about the aircraft axis of rotation during flight, the gyro rotor means being adapted to be mounted to an aircraft body to maintain a fixed position relative to the thrust-producing means, and means for independently connecting each of the gyro rotor means and thrust-varying means to the thrust-producing means so that each of the thrust-varying means and the gyro rotor means operates independently to vary the thrust force generated by the thrust-producing means and so that the gyro rotor remains in a fixed position relative to the thrust-producing means when the pilot operates the thrust-varying means to vary the magnitude of the thrust force produced by the thrust-producing means.

2. The device of claim 1, wherein said gyro rotor means includes first and second gyro arms and means for supporting said first and second gyro arms for rotational movement about a gyro rotor rotation axis and for pivotable movement relative to said thrust-producing means about a gyro rotor pivot axis in response to yaw motion encountered by the first and second gyro arms during flight to vary the thrust force generated by said thrust-producing means and the supporting means includes a spindle adapted to be pivotably mounted to the aircraft body.

3. The device of claim 2, wherein the gyro rotor means is fixed relative to the thrust-producing means along the gyro rotor rotation axis.

4. The device of claim 2, wherein said gyro rotor means further includes a gyro pushrod connected to the spindle and linked to said thrust-producing means and the gyro pushrod is connected to the spindle at a gyro output pivot offset from the gyro rotor axis of rotation.

5. The device of claim 2, wherein the wherein said gyro rotor means includes first and second gyro arms, means for supporting said first and second gyro arms for rotation about a gyro rotor rotation axis and for pivotable movement relative to said thrust-producing means about a gyro rotor pivot axis in response to yaw motion encountered by the first and second gyro arms during flight to vary the thrust force generated by said thrust-producing means, and a spindle adapted to be pivotably mounted to the aircraft body and spaced apart from the supporting means.

6. The device of claim 5, further comprising linkage means for connecting the first and second gyro arms to the gyro spindle to transmit pivoting motion of the first and second gyro arms about the gyro rotor pivot axis to the gyro spindle to cause the gyro spindle to pivot about the gyro spindle pivot axis and to lie in spaced-apart relation to the supporting means.

7. The device of claim 1, further comprising a three-point mixing linkage including a mixing member and first output means for coupling the mixing member to the thrust-producing means so that movement of the thrust-varying means and gyro rotor means vary the magnitude of the thrust force produced by the thrust-producing means.

8. The device of claim 1, wherein the thrust-producing means includes a tail rotor, the tail rotor includes first and second tail rotor blades, bearings, and gears, the aircraft body includes a gearbox housing the bearings and gears, and the gyro rotor means is mounted to the gearbox.

9. The device of claim 1, wherein the thrust-producing means includes a tail rotor.

10. The device of claim 1, wherein the thrust-producing means includes a housing adapted to be appended to the aircraft body, an exhaust port, and means for controlling the flow of air through the exhaust port.

11. A device for stabilizing yaw motion of a rotary wing aircraft including an aircraft body and a main rotor rotating relative to the aircraft body about an aircraft axis of rotation, the device comprising thrust-producing means for generating a thrust force along a thrust axis that is substantially perpendicular to the aircraft axis of rotation, thrust-varying means for permitting a pilot to remotely control the thrust-producing means to vary the magnitude of the thrust force produced by the thrust-producing means, and gyro rotor means for automatically controlling the thrust-producing means to vary the magnitude of the thrust force produced by the thrust-producing means to oppose rotational motion of the rotary wing aircraft about the aircraft axis of rotation during flight, the gyro rotor means being adapted to be mounted to an aircraft body to maintain a fixed position relative to the aircraft body, the gyro rotor means including first and second gyro arms and means for supporting the first and second gyro arms for rotational movement in a gyro rotor rotational plane about a gyro rotor rotation axis and for pivotable movement relative to said thrust-producing means about a gyro rotor pivot axis in response to yaw motion encountered by the gyro arms during flight to vary the thrust force generated by said thrust-producing means, the supporting means being configured so that the gyro rotor pivot axis intersects the gyro rotor rotational plane.

12. The device of claim 11, wherein the supporting means is configured so that the gyro pivot axis is perpendicular to the gyro rotor rotational plane.

13. The device of claim 11, wherein the supporting means includes a spindle adapted to be mounted to the aircraft body to pivot about the gyro rotor pivot axis in response to pivotable movement of the first and second gyro arms about the gyro rotor pivot axis.

14. The device of claim 11, wherein the supporting means is configured so that the gyro rotor rotation axis intersects the gyro rotor pivot axis.

15. A device for stabilizing yaw motion of a rotary wing aircraft including an aircraft body and a main rotor rotating relative to the aircraft body about an aircraft axis of rotation, the device comprising thrust-producing means for generating a thrust force along a thrust axis that is substantially perpendicular to the aircraft axis of rotation and gyro rotor means for automatically controlling the thrust-producing means to vary the magnitude of the thrust force produced by the thrust-producing means to oppose rotational motion of the rotary wing aircraft about the aircraft axis of rotation during flight, the gyro rotor means including first and second gyro arms, means for supporting the first and second gyro arms for rotational movement about a gyro rotor rotation axis and for pivotable movement relative to said thrust-producing means about a gyro rotor pivot axis in response to yaw motion encountered by the first and second gyro arms during flight to vary the thrust force generated by said thrust-producing means, a gyro spindle spaced apart from the supporting means and adapted to be mounted to an aircraft body to pivot about a gyro spindle pivot axis that is spaced apart from the gyro rotor pivot axis in response to pivotable movement of the first and second gyro arms about the gyro rotor pivot axis, and linkage means for connecting the first and second gyro arms to the gyro spindle to transmit pivoting motion of the first and second gyro arms about the gyro rotor pivot axis to the gyro spindle to cause the gyro spindle to pivot about the gyro spindle pivot axis and to lie in spaced-apart relation to the supporting means.

16. The device of claim 15, wherein the gyro spindle pivot axis and the gyro rotor pivot axis lie in substantially spaced-apart parallel relation.

17. The device of claim 15, wherein the supporting means includes a shaft extending along the gyro rotor rotation axis.

18. The device of claim 15, wherein the first and second gyro arms are adapted to be mounted to the aircraft body in a fixed position relative to the thrust-producing means.

19. The device of claim 18, wherein the first and second gyro arms are adapted to be mounted to the aircraft body in a fixed position relative to the thrust-producing means along the gyro rotor rotation axis.

20. A device for stabilizing yaw motion of a rotary wing aircraft including an aircraft body and a main rotor rotating relative to the aircraft body about an aircraft axis of rotation, the device comprising thrust-producing means for generating a thrust force along a thrust axis that is substantially perpendicular to the aircraft axis of rotation, thrust-varying means for permitting a pilot to remotely control the thrust-producing means to vary the magnitude of the thrust force produced by the thrust-producing means, gyro rotor means for automatically controlling the thrust-producing means to vary the magnitude of the thrust force produced by the thrust-producing means to oppose rotational motion of the rotary wing aircraft about the aircraft axis of rotation during flight, and a three-point mixing linkage including a mixing member, output means for linking the mixing member to the thrust-producing means at an output point so that movement of the mixing member relative to the aircraft body causes the magnitude of the thrust force produced by the thrust-producing means to vary, first input means for coupling the thrust-varying means to the mixing member at a thrust-varying means input point so that movement of the thrust-varying means by the pilot moves the output means to vary the magnitude of the thrust force produced by the thrust-producing means, and second input means for coupling the gyro rotor means to the mixing member at a gyro rotor means input point so that movement of the gyro rotor means moves the output means to vary the magnitude of the thrust force produced by the thrust-producing means, wherein movement of the thrust-varying means causes the mixing member to rotate about the gyro rotor means input point of said mixing member and displace the output point of the mixing member to vary the thrust force produced by the thrust-producing means and movement of the gyro rotor means causes the mixing member to rotate about the thrust-varying means input point of the mixing member and displace the output point of the mixing member to vary the thrust force produced by the thrust-producing means.

21. The device of claim 20, wherein gyro rotor means input point includes first, second, and third gyro rotor input points and the second input means includes an adjustable link connected to one of the first, second, and third gyro rotor input points.

22. The device of claim 20, wherein the output point is situated to lie between the thrust-varying means input point and the gyro rotor means input point.

23. A device for stabilizing yaw motion of a rotary wing aircraft including an aircraft body and a main rotor rotating relative to the aircraft body about an aircraft axis of rotation, the device comprising thrust-producing means for generating a thrust force along a thrust axis that is substantially perpendicular to the aircraft axis of rotation and gyro rotor means for automatically varying the thrust force generated by said thrust-producing means, said gyro rotor means including first and second gyro arms, means for supporting the first and second gyro arms for pivotable movement relative to said thrust-producing means about a gyro pivot axis between a nominal orientation and a tilted orientation so that the gyro arms pivot about the gyro arm pivot axis from the nominal orientation toward the tilted orientation in response to yaw motion encountered by the gyro arms during flight to vary the thrust force generated by said thrust-producing means, and means for restoring gyro arms pivoted to a tilted orientation to their nominal orientation, the restoring means including a first weight connected to the first gyro arm, a second weight connected to the second gyro arm, and means for pivotally connecting the first gyro arm to the supporting means and the second gyro arm to the supporting means so that centrifugal forces acting on first and second gyro arms will orient first and second gyro arms in their nominal orientation.

24. The device of claim 23, wherein each of the first and second gyro arms include a first end pivotably connected to the supporting means and a second end spaced apart from the first end, the first weight is connected to the second end of the first gyro arm, and the second weight is connected to the second end of the second gyro arm.

25. The device of claim 23, wherein the first gyro arm is pivotably connected to the supporting means at a first gyro arm flapping pivot point and second gyro arm is pivotably connected to the supporting means at a second gyro arm flapping pivot point and the first and second gyro arm flapping pivot points are spaced apart from the gyro rotor axis of rotation.

26. A device for stabilizing yaw motion of a rotary wing aircraft including an aircraft body and a main rotor rotating relative to the aircraft body about an aircraft axis of rotation, the device comprising thrust-producing means for generating a thrust force along a thrust axis that is substantially perpendicular to the aircraft axis of rotation, gyro rotor means for automatically varying the thrust force to oppose rotational motion of the rotary wing aircraft about the aircraft axis of rotation, the gyro rotor means including first and second gyro arms and means for supporting the first and second gyro arms for rotational movement about a gyro rotor axis of rotation and for pivotable movement relative to said thrust-producing means, and about a gyro rotor pivot axis in response to yaw motion encountered by the gyro arms during flight to vary the thrust force generated by said thrust-producing means, and a scissor linkage including a first link and a second link appended to the first link and adapted to link to a power source, the first link being pivotably connected to the second link to one of extend and contract in response to pivoting of the first and second gyro arms about the gyro arms pivot axis.

27. The device of claim 26, wherein the scissor linkage is spaced apart from the gyro rotor axis of rotation.

28. A rotation control and stabilization system for a rotary wing aircraft having a power plant and an aircraft axis of rotation, the rotation control and stabilization system comprising thrust producing means spatially offset from the aircraft axis of rotation and capable of directing a thrust force along a thrust axis substantially perpendicular to the aircraft axis of rotation;

gyro rotor means driven by the power plant and mounted to rotate about a gyro rotor axis of rotation and pivot about a gyro rotor pivot axis in response to rotation of the aircraft about the aircraft axis of rotation, said gyro rotor means being linked to the thrust producing means to vary the thrust of the thrust producing means;

gyro spindle means mounted to pivot about a gyro spindle pivot axis, said gyro spindle means being responsive to pivoting of said gyro rotor means and said gyro spindle pivot axis being situated in fixed relation to the power plant; and gyro control means to transmit gyro control commands away from the gyro spindle means, said gyro control means being connected to the gyro spindle means at an output point spatially offset from the gyro rotor axis of rotation.

29. The rotation control and stabilization system of claim 28, wherein the gyro control means comprises a gyro pushrod connected to the gyro spindle means at a gyro output pivot point.

30. The rotation control and stabilization system of claim 28, wherein the gyro spindle pivot axis substantially intersects the gyro rotor axis of rotation.

31. The rotation control and stabilization system of claim 28 further comprising pilot control means responsive to pilot control commands and linked to the thrust producing means to vary the thrust of the thrust producing means.

32. A rotation control and stabilization system for a rotary wing aircraft having a power plant and an aircraft axis of rotation, the rotation control and stabilization system comprising thrust producing means spatially offset from the aircraft axis of rotation and capable of directing a thrust force along a thrust axis substantially perpendicular to the aircraft axis of rotation;

gyro rotor means mounted to rotate about a gyro rotor axis of rotation and to pivot about a gyro rotor pivot axis in response to angular motion of the aircraft about the aircraft axis of rotation, said gyro rotor means being linked to the thrust producing means to vary the thrust of the thrust producing means;

gyro spindle means mounted to pivot about a gyro spindle pivot axis, said gyro spindle means being responsive to pivoting of said gyro rotor means and said gyro spindle pivot axis being situated in fixed relation to the power plant;

gyro control means responsive to tilt of said gyro spindle means and connected to the gyro spindle means to transmit gyro control commands away from the gyro spindle means;

pilot control means responsive to pilot control commands and linked to the thrust producing means to vary the thrust of the thrust producing means; and pivoting operation of the gyro rotor about the gyro rotor pivot axis is substantially independent of pilot control commands to vary the thrust of the thrust producing means.

33. The rotation control and stabilization system of claim 32, further including a slider connected to the thrust producing means to vary the thrust of the thrust producing means upon sliding displacement of the slider, and the slider is independently slidable in response to pivoting of the gyro rotor means and in response to operation of the pilot control means.

34. The rotation control and stabilization system of claim 32, further comprising follower-link means for transmitting rotational motion to the gyro rotor, said follower-link means including a first part lying substantially in spaced apart relation to the gyro rotor axis of rotation and having a first end linked to the power plant and a second end linked to the gyro rotor, and the first part revolves about the gyro rotor axis of rotation thereby transmitting rotational motion from the power plant to the gyro rotor.

35. The rotation control and stabilization system of claim 34, wherein the follower-link means further includes a second part and the second part is connected to the first part to form a variable length scissor linkage and the variable length scissor linkage transfers rotary motion from the power plant to the gyro rotor while the gyro rotor may pivot about the gyro rotor pivot axis.

36. The rotation control and stabilization system of claim 32, further comprising means to drive the gyro rotor about the gyro rotor axis of rotation including a pin-and-slot universal drive mechanism having a pin extending radially from a drive shaft, and a drive yolk with a slot receptive to said pin, the pin being engageable within the slot to transfer rotational motion between the drive shaft and said drive yolk through a range of engagement angles between the drive shaft and drive yolk.

37. The rotation control and stabilization system of claim 32, further comprising means to drive the gyro rotor about the gyro rotor axis of rotation including a hexagonal-type universal drive mechanism having a drive portion with a multitude of curved drive faces and a universal housing with a multifaceted interior receptive to said drive faces, said drive portion being engageable within said universal housing to transfer rotational motion between said drive portion and said universal housing through a range of engagement angles between said drive portion and drive housing.

38. The rotation control and stabilization system of claim 32, wherein the gyro rotor means is adapted to produce a thrust force.

39. The rotation control and stabilization system of claim 32, wherein the thrust producing means and gyro rotor means are combined into a single thrust-producing gyro rotor means.

40. The rotation control and stabilization system of claim 32, wherein the aircraft further includes a flight control system for varying the thrust of the thrust producing means, and the gyro rotor means is linked to sensor means responsive to pivotal displacement of the gyro rotor means, said sensor means being linked to the flight control system to cause said flight control system to automatically vary the thrust of the thrust producing means in response to pivotal displacement of the gyro rotor means about the gyro rotor pivot axis.

41. A rotation control and stabilization system for a rotary wing aircraft having a power plant and an aircraft axis of rotation, the rotation control and stabilization system comprising thrust producing means spatially offset from the aircraft axis of rotation and capable of directing a thrust force along a thrust axis substantially perpendicular to the aircraft axis of rotation;

gyro rotor means mounted to rotate about a gyro rotor axis of rotation in a gyro rotor plane of rotation and to pivot about a gyro rotor pivot axis in response to angular motion of the aircraft about the aircraft axis of rotation, said gyro rotor means being linked to the thrust producing means to vary the thrust of the thrust producing means; and gyro spindle means mounted to pivot about a gyro spindle pivot axis, said gyro spindle means being responsive to pivoting of said gyro rotor means and said gyro spindle pivot axis being situated in fixed relation to the power plant and proximately intersecting the gyro rotor axis of rotation; and gyro control means responsive to tilt of said gyro spindle means and connected to the gyro spindle means to transmit gyro control commands away from the gyro spindle means.

42. The rotation control and stabilization system of claim 41 further comprising pilot control means responsive to pilot control commands and linked to the thrust producing means to vary the thrust of the thrust producing means.

43. The rotation control and stabilization system of claim 42 further comprising means to combine pilot control commands with gyro control commands, and the combining means includes a three-point mixing arm having a first input point, a second input point and an output point and the pilot control means is linked to the first input point, the gyro control means is linked to the second input point and the thrust producing means is linked to the output point.

44. The rotation control and stabilization system of claim 42 wherein the gyro rotor pivot axis is substantially co-planer with the gyro rotor plane of rotation and the gyro rotor and thrust producing means are combined into a single thrust producing gyro rotor.

45. On a rotation control and stabilization system for a rotary wing aircraft having an aircraft axis of rotation and a gyroscopic mechanism mounted to pivot from a nominal orientation to a tilted orientation in response to rotation of the aircraft about the aircraft axis of rotation, means for restoring the gyroscopic mechanism from the tilted orientation to the nominal orientation comprising weighted restoring means linked to the gyroscopic mechanism and capable of generating centrifugal restoring forces by action of the weighted restoring means rotating about a restoring-means axis of rotation, said centrifugal restoring forces being in a condition of equilibrium when the gyroscopic mechanism is in the nominal orientation and being out of equilibrium when the gyroscopic mechanism pivots to a tilted orientation, said weighted restoring means tending to move toward the condition of equilibrium thereby restoring the gyroscopic mechanism toward the nominal orientation.

46. The rotation control and stabilization system of claim 45, wherein the gyroscopic mechanism includes a gyro rotor rotatable about a gyro rotor axis of rotation within a nominal gyro rotor plane of rotation, and the gyro rotor includes a gyro rotor arm hinged to flap about a flapping axis which is substantially perpendicular to the gyro rotor axis of rotation, and flapping displacement of the gyro rotor arm out of the nominal plane of rotation generates centrifugal forces relative to the gyro rotor axis of rotation tending to return the gyro arm to the nominal plane of rotation.

47. On a rotation control and stabilization system for a rotary winged aircraft having a main rotor and a power plant for driving the main rotor, an aircraft axis of rotation, a pilot control system responsive to pilot control commands to operate a pilot control linkage, a rotation stabilization system driven by the power plant and responsive to rotation of the aircraft about the aircraft axis of rotation to operate a rotation stabilization linkage, and a rotation control system capable of affecting the rotation of the aircraft about the aircraft axis of rotation through operation of a rotation control linkage, a three-point mixing linkage having a first input point linked to the pilot control linkage and a second input point linked to the rotation stabilization linkage and an output point offset from both of the first input point and second input point and linked to the rotation control linkage so that operation of the pilot control linkage causes said three-point mixing arm to pivot about the second input point and displace the output point and the connected rotation control linkage thereby affecting the rotation of the aircraft about the aircraft axis of rotation, and operation of the rotation stabilization linkage causes said three-point mixing arm to pivot about the first input point and displace the output point and the connected rotation control linkage thereby affecting the rotation of the aircraft about the aircraft axis of rotation.

* * * * *